United States Patent
Watano et al.

(10) Patent No.: US 12,529,554 B2
(45) Date of Patent: Jan. 20, 2026

(54) SENSOR AND BAND PASS FILTER

(71) Applicant: FUJIFILM Corporation, Tokyo (JP)

(72) Inventors: Akiko Watano, Minamiashigara (JP); Yukito Saitoh, Minamiashigara (JP); Takao Taguchi, Minamiashigara (JP); Keisuke Kodama, Minamiashigara (JP); Shunya Katoh, Minamiashigara (JP); Yujiro Yanai, Minamiashigara (JP)

(73) Assignee: FUJIFILM Corporation, Tokyo (JP)

(*) Notice: Subject to any disclaimer, the term of this patent is extended or adjusted under 35 U.S.C. 154(b) by 312 days.

(21) Appl. No.: 18/148,616

(22) Filed: Dec. 30, 2022

(65) Prior Publication Data

US 2023/0141025 A1    May 11, 2023

Related U.S. Application Data

(63) Continuation of application No. PCT/JP2021/023649, filed on Jun. 22, 2021.

(30) Foreign Application Priority Data

Jul. 1, 2020 (JP) .................................. 2020-113977
Sep. 9, 2020 (JP) .................................. 2020-151104

(51) Int. Cl.
   *G01B 11/25*    (2006.01)

(52) U.S. Cl.
   CPC .................................. *G01B 11/25* (2013.01)

(58) Field of Classification Search
   CPC .......... G02B 5/3016; G02B 5/30; G02B 5/20; G02B 5/26; G02B 6/0056; G02B 5/3033;
   (Continued)

(56) References Cited

U.S. PATENT DOCUMENTS

2002/0137618 A1* 9/2002 Goto .................... C03C 10/0027
                                                               501/4
2007/0097691 A1* 5/2007 Wu ........................ G02B 5/285
                                                               362/293
(Continued)

FOREIGN PATENT DOCUMENTS

CN     111308599 A    6/2020
CN     112114394 A    12/2020
(Continued)

OTHER PUBLICATIONS

Japanese Notice of Reasons for Refusal for Japanese Application No. 2022-533894, dated Oct. 3, 2023, with an English translation.
International Preliminary Report on Patentability and Written Opinion of the International Searching Authority for International Application No. PCT/JP2021/023649, dated Jan. 12, 2023, with an English translation.
(Continued)

*Primary Examiner* — Michael P Stafira
(74) *Attorney, Agent, or Firm* — Birch, Stewart, Kolasch & Birch, LLP

(57) ABSTRACT

Provided are: a sensor that is used as a distance-measuring sensor or the like and where a high SN ratio can be obtained and high-accuracy measurement can be performed even in a case where an environmental temperature changes; and a band pass filter that is used for the sensor. The sensor includes: a light source; a band pass filter; and a light-receiving element, in which the band pass filter includes a band pass layer and a support that supports the band pass layer, and in a case where a thermal expansion coefficient of the band pass layer is represented by $\alpha 1$, an elastic modulus of the band pass layer is represented by $E1$, a thermal expansion coefficient of the support is represented by $\alpha 2$, and an elastic modulus of the support is represented by $E2$, $\alpha 1 > \alpha 2$ and $E1 < E2$ are satisfied.

16 Claims, 7 Drawing Sheets

(58) Field of Classification Search
CPC ............... G02B 5/3083; G02B 6/0055; G02B 27/0172; G02B 26/0825; G02B 27/283; G02B 6/0026; G02B 6/0076; G02B 6/0088; G02B 27/288; G02B 30/00; G02B 5/201; G02B 1/11; G02B 27/286; G02B 6/005; G02B 27/14; G02B 5/208; G02B 5/305; G02B 1/08; G02B 27/28; G02B 5/22; G02B 5/3041; G02B 6/0068; G02B 5/283; G02B 5/288; G02B 5/3025; G02B 27/285; G02B 3/005; G02B 5/045; G02B 5/287; G02B 6/0053; G02B 6/0073; G02B 6/0091; G02B 17/006; G02B 5/223; G02B 5/285; G02B 6/0001; G02B 6/002; G02B 6/0036; G02B 7/008; G02B 27/02; G02B 5/0242; G02B 5/18; G02B 6/0018; G02B 6/0031; G02B 6/0038; G02B 6/0051; G02B 2207/101; G02B 26/02; G02B 27/0018; G02B 3/0006; G02B 3/14; G02B 5/008; G02B 5/0808; G02B 5/0816; G02B 5/3066; G02B 6/0058; G02B 6/27; G02B 6/2706; G02B 6/2773; G02B 6/293; G02B 6/29367; G02B 6/32; G02B 6/42; G02B 6/4208; G02B 6/4215; G02B 2027/0118; G02B 2027/012; G02B 27/01; G02B 27/0101; G02B 3/00; G02B 5/00; G02B 5/02; G02B 6/0015; G02B 6/0043
See application file for complete search history.

(56) References Cited

U.S. PATENT DOCUMENTS

| | | | |
|---|---|---|---|
| 2010/0118123 A1 | 5/2010 | Freedman et al. | |
| 2019/0204614 A1* | 7/2019 | Saitoh | G02B 27/285 |
| 2019/0235084 A1* | 8/2019 | Heussner | G01S 17/931 |
| 2020/0326462 A1* | 10/2020 | Yanai | G01S 17/10 |
| 2022/0066264 A1* | 3/2022 | Saitoh | C09K 19/586 |

FOREIGN PATENT DOCUMENTS

| | | | | | |
|---|---|---|---|---|---|
| EP | 1719988 A1 | * | 11/2006 | | G01J 5/10 |
| JP | 4-211203 A | | 8/1992 | | |
| JP | 2004317701 A | * | 11/2004 | | G02B 5/285 |
| JP | 2007-279534 A | | 10/2007 | | |
| JP | 2008-46593 A | | 2/2008 | | |
| JP | 4585091 B2 | * | 11/2010 | | G02B 6/124 |
| JP | 2019139243 A | * | 8/2019 | | |
| KR | 100784072 B1 | * | 12/2007 | | |
| KR | 20180037043 A | * | 4/2018 | | C09K 19/322 |
| WO | WO-2005040869 A1 | * | 5/2005 | | G02F 1/1335 |
| WO | WO-2018042924 A1 | * | 3/2018 | | G02B 5/20 |
| WO | WO-2019059308 A1 | * | 3/2019 | | G02B 5/20 |
| WO | WO-2020230698 A1 | * | 11/2020 | | G01S 17/08 |

OTHER PUBLICATIONS

International Search Report for International Application No. PCT/JP2021/023649, dated Jul. 27, 2021, with an English translation.

* cited by examiner

SENSOR AND BAND PASS FILTER

CROSS-REFERENCE TO RELATED APPLICATIONS

This application is a Continuation of PCT International Application No. PCT/JP2021/023649 filed on Jun. 22, 2021, which claims priority under 35 U.S.C. § 119(a) to Japanese Patent Application No. 2020-113977 filed on Jul. 1, 2020 and Japanese Patent Application No. 2020-151104 filed on Sep. 9, 2020. The above applications are hereby expressly incorporated by reference, in their entirety, into the present application.

BACKGROUND OF THE INVENTION

1. Field of the Invention

The present invention relates to a sensor that is used for a distance measurement device or the like and a band pass filter.

2. Description of the Related Art

A distance-measuring sensor (depth sensor) for measuring the distance to an object is used for motion capture, automated driving of a vehicle, automatic control of a robot, and the like.

For example, US2010/0118123A describes a so-called time-of-flight type distance-measuring sensor (optical distance sensor), in which the distance to a measurement target object is calculated based on a retardation between blinking infrared light and light reflected from the measurement target object.

Specifically, US2010/0118123A describes that infrared light is emitted to the measurement target object as blinking light corresponding to a light emitting signal, infrared light reflected from the measurement target object is received to generate a light-receiving signal, a time difference, that is, a retardation between waveforms (for example, pulse waveforms) of the light emitting signal and the light-receiving signal is obtained, and the distance between the optical distance sensor and the measurement target object is obtained based on this retardation.

SUMMARY OF THE INVENTION

In addition to the distance-measuring sensor, a sensor that performs optical measurement performs various types of measurement, for example, by emitting measurement light from a light source, measuring the measurement light reflected from an object with a light-receiving element, and analyzing the measurement result.

Incidentally, in a space where the sensor performs the measurement, various light components such as sunlight or a lighting are present, and these light components are incident into the light-receiving element as so-called external light. There are also many cases where the external light includes light in a wavelength range emitted from a light source and light for which the light-receiving element has sensitivity. In a case where the external light is incident into the light-receiving element of the sensor, the external light becomes noise such that the signal-noise ratio (SN ratio) of the sensor decreases and the measurement accuracy of the sensor decreases. Therefore, using a narrow band pass filter, light having a luminescence wavelength of the light source is extracted, and light having the other wavelengths is cut to cut the external light incident into the light-receiving element. As a result, noise is suppressed. As the half-width of a transmission peak of the band pass filter is narrowed, the incidence of the external light into the light-receiving element can be more effectively suppressed, and thus the SN ratio can be further improved.

Here, the luminescence wavelength of the light source changes depending on a change in environmental temperature. Specifically, as the temperature increases, the luminescence wavelength of the light source increases. On the other hand, in a general narrow band pass filter formed of an inorganic material, a change in transmission wavelength relative to a temperature change is not likely to occur. Therefore, in a case where a band pass filter having a narrow half-width is used, during a change in environmental temperature, there is a deviation between the luminescence wavelength of the light source and the transmission wavelength of the band pass filter, and the amount of light having the transmission wavelength of the light source incident into the light-receiving element is small. Therefore, the SN ratio decreases. By using a band pass filter having a wide half-width of a transmission peak, even in a case where the environmental temperature changes, a deviation between the luminescence wavelength of the light source and the transmission wavelength of the band pass filter can be suppressed. However, in a case where the half-width of the band pass filter is wide, the amount of external light that cannot be cut increases. Therefore, noise cannot be sufficiently suppressed, and the SN ratio decreases.

In particular, in a case where a light source, such as a laser light source or a light emitting diode (LED), having a narrow half-width of a luminescence peak wavelength that is used as a distance-measuring sensor is used, the influence of a deviation in luminescence wavelength caused by a change in environmental temperature increases. Therefore, in a case where the environmental temperature changes, a decrease in SN ratio is large.

An object of the present invention is to solve the above-described problem of the related art and to provide: a sensor that is used as a distance-measuring sensor or the like and where a high SN ratio can be obtained and high-accuracy measurement can be performed even in a case where an environmental temperature changes; and a band pass filter that is used for the sensor.

In order to achieve the object, the present invention has the following configurations.

[1] A sensor comprising:
  a light source;
  a band pass filter that extracts light having a luminescence peak wavelength of the light source; and
  a light-receiving element that receives the light extracted by the band pass filter,
  in which the band pass filter includes a band pass layer and a support that supports the band pass layer, and
  in a case where a thermal expansion coefficient of the band pass layer is represented by $\alpha 1$, an elastic modulus of the band pass layer is represented by $E1$, a thermal expansion coefficient of the support is represented by $\alpha 2$, and an elastic modulus of the support is represented by $E2$,
  $\alpha 1 > \alpha 2$ and
  $E1 < E2$
  are satisfied.

[2] The sensor according to [1],
  in which a half-width of the luminescence peak of the light source is 30 nm or less.

[3] The sensor according to [1] or [2],
in which the light source is a laser or a light emitting diode.

[4] The sensor according to any one of [1] to [3],
in which the band pass layer includes an organic material.

[5] The sensor according to any one of [1] to [4],
in which the band pass filter allows transmission of the light having the luminescence peak wavelength of the light source to extract the light having the luminescence peak wavelength of the light source, and
a half-width of a transmission peak of the band pass layer is 20 nm or less.

[6] The sensor according to any one of [1] to [4],
in which the band pass filter reflects the light having the luminescence peak wavelength of the light source to extract the light having the luminescence peak wavelength of the light source, and
a half-width of a reflection peak of the band pass layer is 20 nm or less.

[7] The sensor according to any one of [1] to [6], in which a difference between the thermal expansion coefficient α1 of the band pass layer and the thermal expansion coefficient α2 of the support is 30 (ppm/° C.) or more.

[8] The sensor according to any one of [1] to [7],
in which the thermal expansion coefficient α2 of the support is less than 0 ppm/° C.

[9] The sensor according to any one of [1] to [8],
in which the elastic modulus E1 of the band pass layer is less than 10 GPa.

[10] The sensor according to any one of [1] to [9],
in which the band pass layer is an organic dielectric multi-layer film.

[11] The sensor according to any one of [1] to [10],
in which the band pass layer includes a cholesteric liquid crystal layer that is a layer obtained by immobilizing a cholesteric liquid crystalline phase,
the cholesteric liquid crystal layer has a region where a refractive index nx in an in-plane slow axis direction and a refractive index ny in an in-plane fast axis direction satisfy nx>ny, and
in a case where a selective reflection center wavelength of the cholesteric liquid crystal layer is represented by λ, the cholesteric liquid crystal layer has a second selective reflection peak at a wavelength λ/2 and a half-width of the second selective reflection peak at λ/2 is 20 nm or less.

[12] A band pass filter comprising:
a band pass layer; and
a support that supports the band pass layer,
in which a thermal expansion coefficient α2 of the support is less than 0 ppm/° C.

[13] The sensor according to any one of [1] to [9],
in which the band pass layer includes a cholesteric liquid crystal layer that is a layer obtained by immobilizing a cholesteric liquid crystalline phase, and
a half-width of a selective reflection peak of the cholesteric liquid crystal layer is 45 nm or less.

[14] The sensor according to any one of [1] to [9] and [13],
in which the band pass layer includes a cholesteric liquid crystal layer that is a layer obtained by immobilizing a cholesteric liquid crystalline phase, and
the cholesteric liquid crystal layer is obtained by immobilizing a cholesteric liquid crystalline phase having Δn of 0.06 or less.

[15] The sensor according to any one of [1] to [9], [11], [13], and [14],
in which the band pass layer includes a cholesteric liquid crystal layer that is a layer obtained by immobilizing a cholesteric liquid crystalline phase, and
a film thickness of the cholesteric liquid crystal layer is 10 μm or more.

[16] The sensor according to any one of [1] to [9], [11], and [13] to [15],
in which the band pass layer includes a cholesteric liquid crystal layer that is a layer obtained by immobilizing a cholesteric liquid crystalline phase, and
in the cholesteric liquid crystal layer, a cholesteric liquid crystal layer having a right-handed helical structure and a cholesteric liquid crystal layer having a left-handed helical structure are laminated.

According to the present invention, it is possible to provide: a sensor that is used as a distance-measuring sensor or the like and where a high SN ratio can be obtained and high-accuracy measurement can be performed even in a case where an environmental temperature changes; and a band pass filter that is used for the sensor.

DESCRIPTION OF THE PREFERRED EMBODIMENTS

Hereinafter, a sensor and a band pass filter according to an embodiment of the present invention will be described in detail based on a preferable embodiment shown in the accompanying drawings.

In the present specification, numerical ranges represented by "to" include numerical values before and after "to" as lower limit values and upper limit values.

In the present specification, "(meth)acrylate" represents "either or both of acrylate and methacrylate".

In the present specification, the meaning of "the same" and "equal" includes a case where an error range is generally allowable in the technical field.

In the present specification, a selective reflection center wavelength refers to an average value of two wavelengths at which, in a case where a minimum value of a transmittance of a target object (member) is represented by Tmin (%), a half value transmittance: T1/2(%) represented by the following expression is exhibited.

Expression for obtaining Half Value Transmittance:
$T1/2=100-(100-T\min)\div 2$

Sensor

The sensor according to the embodiment of the present invention comprises:
a light source;
a band pass filter that extracts light having a luminescence peak wavelength of the light source; and
a light-receiving element that receives the light extracted by the band pass filter,
in which the band pass filter includes a band pass layer and a support that supports the band pass layer, and
in a case where a thermal expansion coefficient of the band pass layer is represented by $\alpha 1$, an elastic modulus of the band pass layer is represented by E1, a thermal expansion coefficient of the support is represented by $\alpha 2$, and an elastic modulus of the support is represented by E2,
$\alpha 1 > \alpha 2$ and
$E1 < E2$
are satisfied.

Figure 1:
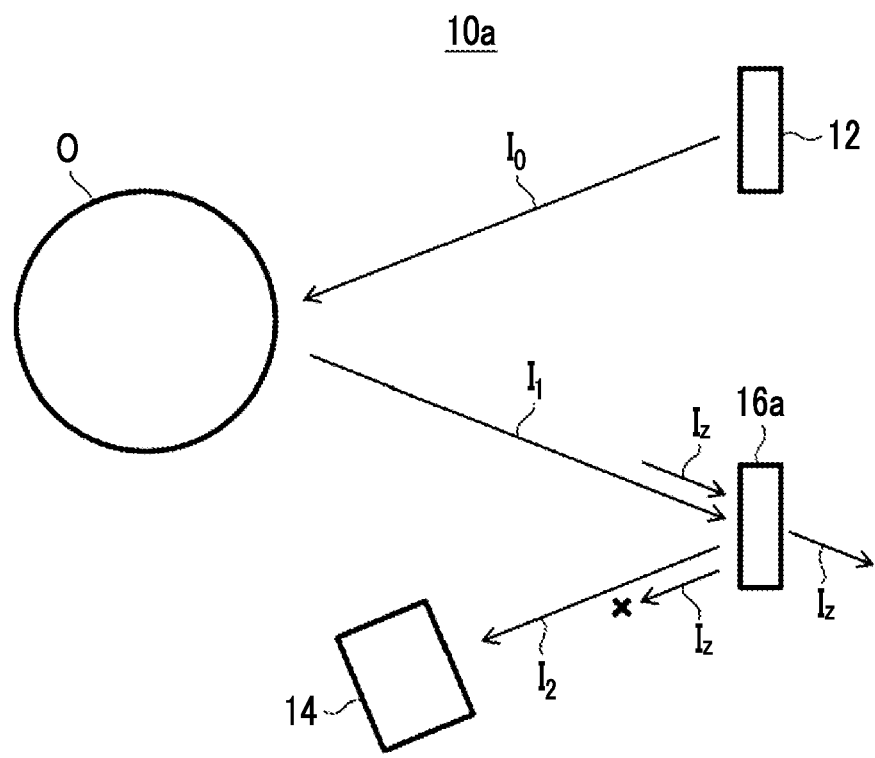
FIG. 1 is a diagram conceptually showing an example of a sensor according to the present invention.

FIG. 1 is a diagram conceptually showing an example of the sensor according to the present invention.

A sensor 10a shown in FIG. 1 includes a light source 12, a light-receiving element 14, and a band pass filter 16a. In the sensor 10a shown in FIG. 1, the band pass filter 16a is a reflective band pass filter that reflects only light in a predetermined wavelength range to extract the light in this wavelength range. Specifically, the band pass filter 16a reflects light in a wavelength range including light having a luminescence peak wavelength of the light source and allows transmission of light in the other wavelength range to extract the light having the luminescence peak wavelength of the light source.

As shown in FIG. 1, the light source 12 is disposed such that measurement light Jo is emitted to the outside (object O). The band pass filter 16a is disposed such that measurement light $I_1$ incident at a predetermined angle in the measurement light $I_1$ reflected from the object O is reflected to the light-receiving element 14. The light-receiving element 14 is disposed at a position where measurement light 12 reflected from the band pass filter 16a is received.

The measurement of the object O by the sensor 10 according to the embodiment of the present invention can be applied to various well-known measurements that are performed by an optical sensor. Accordingly, the object O is not particularly limited and may be a person, an animal, or a thing.

Examples of the measurement of the object O include measurement of the distance to the object O (distance measurement), measurement of the shape of the object O, measurement of the movement of the object O, and identification of the object O.

All of these measurements may be performed using a well-known method. For example, the sensor 10 measures the distance to the object O using a time of flight (ToF) method.

The sensor 10a performs photometry on measurement light that is emitted from the light source 12 and reflected from the object O using the light-receiving element 14 through the band pass filter 16a and analyzes the photometry result to measure the distance to the object O and the like (hereinafter, also simply referred to as "measurement of the object"). In this case, external light $I_z$ such as sunlight or lighting that is incident into the sensor is reflected from the band pass filter 16a. Therefore, the external light $I_z$ incident into the light-receiving element 14 can be cut, and noise can be suppressed. In this case, the external light $I_z$ in a reflection wavelength range (hereinafter, also referred to as "transmission range") of the band pass filter 16a is incident into the light-receiving element 14 without being cut by the band pass filter 16a. Accordingly, in a case where the transmission range of the band pass filter 16a is wide, the amount of the external light $I_z$ incident into the light-receiving element 14 increases, and the SN ratio cannot be sufficiently improved. Therefore, in the band pass filter 16a, the transmission range is required to be narrow (narrow band).

Here, as described above, the luminescence wavelength of the light source changes depending on a change in environmental temperature. Specifically, as the temperature increases, the luminescence wavelength of the light source increases. On the other hand, in a general narrow band pass filter formed of an inorganic material, a change in transmission wavelength relative to a temperature change is not likely to occur. Therefore, in a case where a narrow band pass filter is used, during a change in environmental temperature, there is a deviation between the luminescence wavelength of the light source and the transmission wavelength of the band pass filter, and the amount of light having the luminescence wavelength of the light source incident into the light-receiving element decreases. Therefore, the SN ratio decreases. By using a band pass filter having a wide half-width of a transmission peak, even in a case where the environmental temperature changes, a deviation between the luminescence wavelength of the light source and the transmission wavelength of the band pass filter can be suppressed. However, in a case where the half-width of the band pass filter is wide, the amount of external light that cannot be cut increases. Therefore, noise cannot be sufficiently suppressed, and the SN ratio decreases.

On the other hand, in the sensor according to the embodiment of the present invention, the band pass filter includes a band pass layer and a support that supports the band pass layer, and in a case where a thermal expansion coefficient of the band pass layer is represented by $\alpha 1$, an elastic modulus of the band pass layer is represented by E1, a thermal expansion coefficient of the support is represented by $\alpha 2$, and an elastic modulus of the support is represented by E2, $\alpha 1 > \alpha 2$ and $E1 < E2$ are satisfied.

By the band pass filter having the above-described configuration, the transmission wavelength of the band pass filter changes in a case where the environmental temperature changes. Specifically, as the environmental temperature increases, the transmission wavelength of the band pass filter is shifted to a longer wavelength side. Therefore, in a case where the luminescence wavelength of the light source changes depending on a change in environmental temperature, the transmission wavelength of the band pass filter also changes. Therefore, in a case where the luminescence wavelength of the light source increases due to an increase in environmental temperature, the transmission wavelength of the band pass filter also increases. Therefore, even in a narrow band pass filter, in a case where the environmental temperature changes, the luminescence wavelength of the light source and the transmission wavelength of the band pass filter change in the same manner. Accordingly, the light having the luminescence wavelength of the light source can transmit through the band pass filter, the amount of light having a transmission wavelength of the light source incident into the light-receiving element can be prevented from decreasing, and the SN ratio can be prevented from decreasing. As a result, in the sensor, even in a case where the environmental temperature changes, a high SN ratio can be obtained and high-accuracy measurement can be performed.

The point that the transmission wavelength of the band pass filter changes in a case where the environmental temperature changes will be described below in detail.

Here, in the sensor $10a$ shown in FIG. 1, the band pass filter $16a$ is a reflective band pass filter. However, the present invention is not limited to this configuration.

Figure 2:
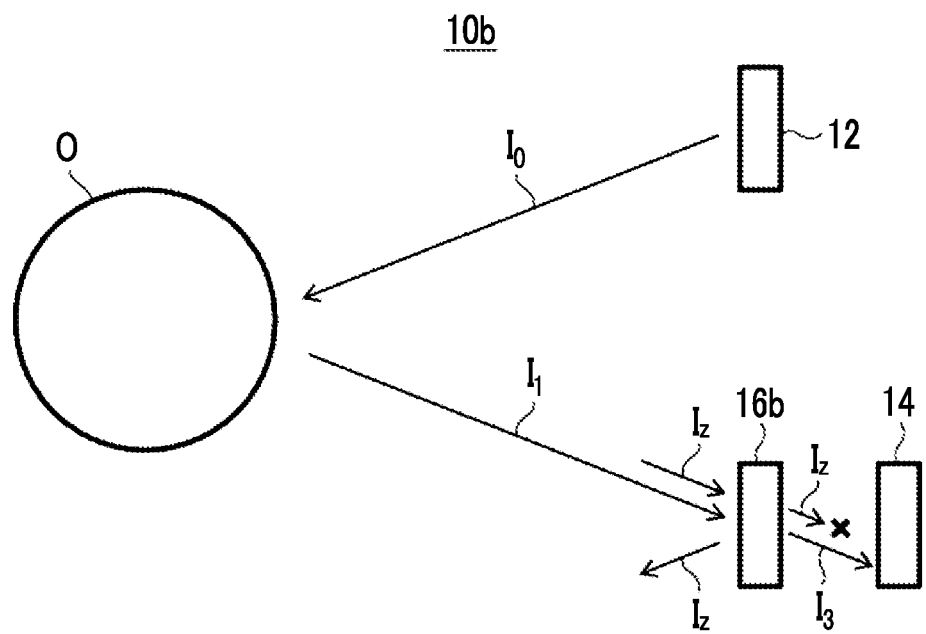
FIG. 2 is a diagram conceptually showing another example of the sensor according to the present invention.

FIG. 2 is a diagram conceptually showing another example of the sensor according to the embodiment of the present invention.

A sensor $10b$ shown in FIG. 2 includes the light source 12, the light-receiving element 14, and a band pass filter $16b$. In the sensor $10b$ shown in FIG. 2, the band pass filter $16b$ is a transmissive band pass filter that allows transmission of only light in a predetermined wavelength range to extract the light in this wavelength range. Specifically, the band pass filter $16b$ allows transmission of light in a wavelength range including light having a luminescence peak wavelength of the light source and absorbs and/or reflects light in the other wavelength range to extract the light having the luminescence peak wavelength of the light source.

As shown in FIG. 2, the light source 12 is disposed such that measurement light $I_0$ is emitted to the outside (object O). The band pass filter $16b$ is disposed such that measurement light $I_1$ reflected from the object O transmits through the band pass filter $16b$ toward the light-receiving element 14. The light-receiving element 14 is disposed at a position where measurement light $I_3$ transmitted through the band pass filter $16a$ is received.

The sensor $10b$ performs photometry on measurement light that is emitted from the light source 12 and reflected from the object O using the light-receiving element 14 through the band pass filter $16b$ and analyzes the photometry result to measure the distance to the object O and the like (hereinafter, also simply referred to as "measurement of the object"). In this case, external light $I_z$ such as sunlight or lighting that is incident into the sensor does not transmit through the band pass filter $16b$. Therefore, the external light $I_z$ incident into the light-receiving element 14 can be cut, and noise can be suppressed.

Even in the transmissive band pass filter, in a case where a narrow band pass filter is used, during a change in environmental temperature, there is a deviation between the luminescence wavelength of the light source and the transmission wavelength range (hereinafter, also referred to as "transmission range") of the band pass filter, and the amount of light having the luminescence wavelength of the light source incident into the light-receiving element is small. Therefore, there is a problem in that the SN ratio decreases.

On the other hand, in the sensor according to the embodiment of the present invention, even the transmissive band pass filter includes a band pass layer and a support that supports the band pass layer, and in a case where a thermal expansion coefficient of the band pass layer is represented by $\alpha 1$, an elastic modulus of the band pass layer is represented by E1, a thermal expansion coefficient of the support is represented by $\alpha 2$, and an elastic modulus of the support is represented by E2, $\alpha 1 > \alpha 2$ and E1<E2 are satisfied.

By the band pass filter having the above-described configuration, the transmission wavelength of the band pass filter changes in a case where the environmental temperature changes. Therefore, even in a narrow band pass filter, in a case where the environmental temperature changes, the luminescence wavelength of the light source and the transmission wavelength of the band pass filter change in the same manner. Accordingly, the light having the luminescence wavelength of the light source can transmit through the band pass filter, the amount of light having a transmission wavelength of the light source incident into the light-receiving element can be prevented from decreasing, and the SN ratio can be prevented from decreasing. As a result, in the sensor, even in a case where the environmental temperature changes, a high SN ratio can be obtained and high-accuracy measurement can be performed.

In the following description, in a case where it is not necessary to distinguish between the reflective band pass filter $16a$ and the transmissive band pass filter $16b$, the reflective band pass filter $16a$ and the transmissive band pass filter $16b$ will be collectively referred to as "band pass filter 16".

Light Source

The light source 12 is not particularly limited and all of the various well-known light sources that are used as a light source in an optical sensor can be used.

Examples of the light source include an electric lamp such as a mercury lamp, a fluorescent lamp, a halogen lamp, a light emitting diode (LED), and a laser such as a semiconductor laser.

The light emitted from the light source 12 may be either diffused light or parallel light such as a collimated light beam. In addition, in the sensor 10, optionally, light emitted from the light source 12 may be scanned one-dimensionally or two-dimensionally.

From the viewpoint of improving the SN ratio of the sensor, a laser such as a light emitting diode (LED) or a semiconductor laser that can emit light in a narrow wavelength range is preferably used as the light source 12.

In addition, from the viewpoint of improving the SN ratio of the sensor, a half-width of the luminescence peak of the light source 12 is preferably 30 nm or less, more preferably 15 nm or less, and still more preferably 10 nm or less.

Here, in a case where the light source 12 is a laser such as a light emitting diode (LED) or a semiconductor laser, the proportion of the change in luminescence wavelength (peak wavelength) depending on the temperature is about 0.1 nm/° C. to 0.7 nm/° C.

The wavelength of light emitted from the light source 12 is not particularly limited and may be visible light or invisible light such as infrared light or ultraviolet light. In particular, the infrared light as the invisible light is suitably used as the light emitted from the light source 12.

Further, the light emitted from the light source 12 may be unpolarized light or polarized light. In a case where polarized light is emitted from the light source 12, the emitted light may be linearly polarized light or circularly polarized light.

Light-Receiving Element

The light-receiving element 14 is not particularly limited and all of the various well-known light-receiving elements (photodetectors (elements)) that are used as a light-receiving element in an optical sensor can be used.

Examples of the light-receiving element 14 include a complementary metal oxide semiconductor (CMOS) sensor and a charge-coupled device (CCD) sensor.

The light-receiving element 14 does not need to have spatial resolution. A line sensor that detects light in a line shape or an area sensor that two-dimensionally detects light is preferable, and an area sensor is more preferable.

The light-receiving element 14 measures the measurement light that is emitted from the light source 12 and is reflected from the object O through the band pass filter 16.

Band Pass Filter

The band pass filter is not particularly limited as long as it includes a band pass layer and a support that supports the band pass layer and, in a case where a thermal expansion coefficient of the band pass layer is represented by $\alpha_1$, an elastic modulus of the band pass layer is represented by $E_1$, a thermal expansion coefficient of the support is represented by $\alpha_2$, and an elastic modulus of the support is represented by $E_2$, $\alpha_1 > \alpha_2$ and $E_1 < E_2$ are satisfied.

Band Pass Layer

As the band pass layer in which the thermal expansion coefficient and the elastic modulus satisfy the above-described expression with respect to the support, a band pass layer including an organic material is suitably used.

Specific examples of the band pass layer include an organic dielectric multi-layer film and a cholesteric liquid crystal layer.

As is well-known, the dielectric multi-layer film has a configuration in which a transparent film having a high refractive index and a transparent film having a low refractive index are alternately laminated. By adjusting the thicknesses, the refractive indices, and the like of the layer of high refractive index and the layer of low refractive index, reflection or transmission of light in a desired wavelength range can be allowed, and light in the other wavelength range can be reflected. That is, in the dielectric multi-layer film, the transmission wavelength depends on the thicknesses of the layer of high refractive index and the layer of low refractive index.

In a case where each of the layers in the dielectric multi-layer film is formed of an organic material (polymer), the thermal expansion coefficient $\alpha_1$ of the band pass layer can be made to be more than the thermal expansion coefficient $\alpha_2$ of the support, and the elastic modulus $E_1$ of the band pass layer can be made to be less than the elastic modulus $E_2$ of the support.

As is well-known, the cholesteric liquid crystal layer is obtained by immobilizing a cholesteric liquid crystalline phase obtained by helically cholesteric alignment of a liquid crystal compound. The cholesteric liquid crystal layer has a selective reflection center wavelength that is determined depending on a helical pitch of a cholesteric liquid crystalline phase, reflects light in a wavelength range including the selective reflection center wavelength, and allows transmission of light in the other wavelength range. That is, in the cholesteric liquid crystal layer, the transmission wavelength depends on the helical pitch of the cholesteric liquid crystalline phase.

This way, in all of the dielectric multi-layer film, the cholesteric liquid crystal layer, and the like that form the band pass layer, the transmission wavelength depends on the dimension of a structure that is formed in a thickness direction in the layer.

The thickness of the band pass layer is not particularly limited as long as it is less than the thickness of the support. In a case where the band pass layer is a reflective type, the thickness of the band pass layer is not particularly limited as long as it is a thickness where the light having the transmission wavelength can be sufficiently reflected and light in the other wavelength range is not reflected. In a case where the band pass layer is a transmissive type, the thickness of the band pass layer is not particularly limited as long as it is a thickness where transmission of the light having the transmission wavelength is sufficiently allowed and transmission of light in the other wavelength range is not allowed.

For example, the thickness of the band pass layer is preferably 0.5 to 100 μm, more preferably 1 to 50 μm, and still more preferably 5 to 30 μm.

Support

The support supports the band pass layer.

As the support, various well-known sheet-shaped materials (film or plate-shaped material) can be used as long as they can support the band pass layer and the thermal expansion coefficient, the elastic modulus, and the thickness thereof can satisfy the above-described expression with respect to the band pass layer.

In a case where the band pass filter is a reflective type, it is preferable that a support that does not reflect light in a wavelength range other than the reflection wavelength range of the band pass layer is used as the support. In a case where the band pass filter is a transmissive type, it is preferable that a support having a sufficient transmittance in the transmission wavelength range of the band pass layer is used as the support.

The thickness of the support is not particularly limited as long as it is a thickness where the band pass layer can be supported, and may appropriately set depending on the use of the band pass filter, a material for forming the support, and the like in a range where the band pass layer can be supported.

The thickness of the support is preferably 1 to 2000 μm, more preferably 3 to 500 μm, and still more preferably 5 to 250 μm.

The support may have a monolayer structure or a multi-layer structure.

In a case where the support has a monolayer structure, examples thereof include supports formed of glass, triacetyl cellulose (TAC), polyethylene terephthalate (PET), polycarbonates, polyvinyl chloride, acryl, polyolefin, and the like. In a case where the support has a multi-layer structure, examples thereof include a support including: one of the above-described supports having a monolayer structure that is provided as a substrate; and another layer that is provided on a surface of the substrate.

In addition, as the support, a support formed of a material having a thermal expansion coefficient of a negative value may be used. That is, as the material of the support, a material of which the length decreases in response to an increase in temperature may also be used.

As the material that causes the thermal expansion coefficient to be a negative value, materials derived from various physical origins such as a transverse oscillation mode, a rigid unit mode, or a phase transition, for example, cubic zirconium tungstate, a rubbery elastomer, quartz, zeolite, high-purity silicon, cubic scandium fluoride, high-strength polyethylene fiber, bismuth-nickel-iron oxide, or the like is known, and the materials are also described in detail in Sci. Technol. Adv. Mater. 13 (2012) 013001.

Hereinafter, the action in which the transmission wavelength of the band pass filter changes in a case where the environmental temperature changes will be described below using FIGS. 3 to 6.

Figure 3:
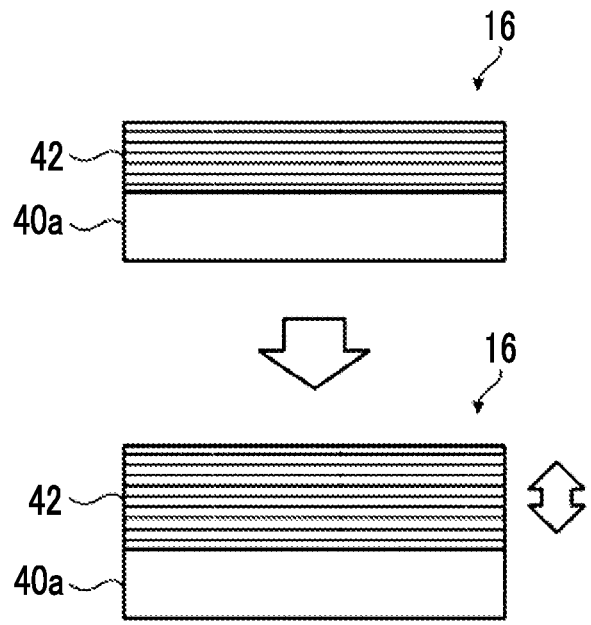
FIG. 3 is a diagram conceptually showing an action of one example of a band pass filter in the sensor according to the present invention.

FIG. 3 is a conceptual diagram showing an action of one example of the band pass filter used in the sensor according to the embodiment of the present invention. In the example shown in the drawing, the thickness, size, and the like of each of the layers and the regions are appropriately adjusted in order to clearly show the configuration of the present invention and are different from the actual ones of the band pass filter according to the embodiment of the present invention.

The band pass filter 16 shown in FIG. 3 includes a band pass layer 42 and a support 40a that supports the band pass layer 42. In the example shown in FIG. 3, the support 40a is glass or the like where the thermal expansion coefficient $\alpha 2$ is substantially 0.

The thermal expansion coefficient $\alpha 1$ of the band pass layer 42 is more than the thermal expansion coefficient $\alpha 2$ of the support 40a. This implies that, during thermal expansion, a change in dimension of the band pass layer 42 is more than a change in dimension of the support 40a. In addition, the elastic modulus E1 of the band pass layer 42 is less than the elastic modulus E2 of the support 40a. In general, the support 40a is thicker than the band pass layer 42. Therefore, the elastic modulus E1 of the band pass layer 42 being less than the elastic modulus E2 of the support 40a represents that the support 40a has higher stiffness than the band pass layer 42.

In the band pass filter 16 shown in FIG. 3, in a case where the environmental temperature is high, the support 40a does not substantially expand because the thermal expansion coefficient $\alpha 2$ is substantially 0. However, the band pass layer 42 expands. In this case, the support 40a has higher stiffness than the band pass layer 42. Therefore, the band pass layer 42 is restricted in a plane direction (in FIG. 3, the left-right direction) by the support 40a, and the elongation thereof is suppressed. Therefore, the band pass layer 42 extends in the thickness direction and changes from a state shown in the upper side of FIG. 3 to a state shown in the lower side of FIG. 3.

Here, as described above, in the band pass layer 42, the transmission wavelength depends on the dimension of the structure that is formed in the thickness direction. Therefore, in a case where the band pass layer 42 extends in the thickness direction, the dimension of the structure formed in the thickness direction extends, and the transmission wavelength increases accordingly. Specifically, for example, in a case where the band pass layer 42 is a cholesteric liquid crystal layer and the band pass layer 42 extends in the thickness direction, a change occurs in a direction in which the helical pitch of the cholesteric liquid crystal layer increases. In a case where the helical pitch of the cholesteric liquid crystal layer increases, the selective reflection wavelength increases. In addition, in a case where the band pass layer 42 is a dielectric multi-layer film and the band pass layer 42 extends in the thickness direction, a change occurs in a direction in which the thickness of each of the layer of high refractive index and the layer of low refractive index in the dielectric multi-layer film increases. In a case where the thickness of each of the layer of high refractive index and the layer of low refractive index in the dielectric multi-layer film increases, the transmission wavelength (the reflection wavelength or the transmission wavelength) increases.

Figure 4:
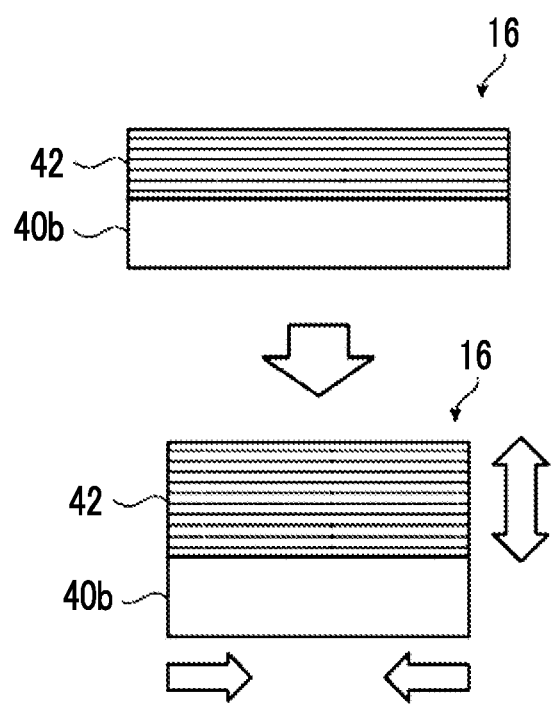
FIG. 4 is a diagram conceptually showing an action of another example of the band pass filter in the sensor according to the present invention.

FIG. 4 is a conceptual diagram showing an action of another example of the band pass filter used in the sensor according to the embodiment of the present invention.

The band pass filter 16 shown in FIG. 4 includes the band pass layer 42 and a support 40b that supports the band pass layer 42. In the example shown in FIG. 4, the support 40b is formed of a material having a negative thermal expansion coefficient.

In the band pass filter 16 shown in FIG. 4, in a case where the environmental temperature is high, the support 40b contracts because the thermal expansion coefficient $\alpha 2$ is negative. On the other hand, the band pass layer 42 expands. In this case, the support 40b has higher stiffness than the band pass layer 42. Therefore, the band pass layer 42 is restricted in a plane direction (in FIG. 4, the left-right direction) by the support 40b, the elongation thereof is suppressed, and contraction occurs. Therefore, the band pass layer 42 extends in the thickness direction and changes from a state shown in the upper side of FIG. 4 to a state shown in the lower side of FIG. 4. In a case where the band pass layer 42 extends in the thickness direction, the dimension of the structure formed in the thickness direction extends, and the transmission wavelength increases accordingly.

This way, in a case where the support 40b is formed of a material having a negative thermal expansion coefficient, the amount of the band pass layer 42 extending in the thickness direction further increases. Therefore, the transmission wavelength of the band pass filter can be more largely changed.

On the other hand, a case where the thermal expansion coefficient $\alpha 2$ of the support is more than the thermal expansion coefficient $\alpha 1$ of the band pass layer will be described using FIG. 5.

Figure 5:
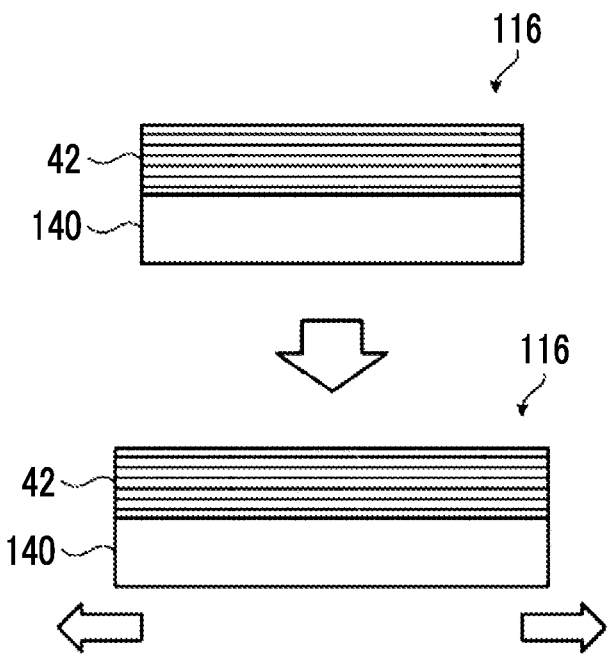
FIG. 5 is a diagram conceptually showing an action of a band pass filter in the related art.

In a band pass filter 116 shown in FIG. 5, in a case where the environmental temperature is high, a support 140 extends in a plane direction (in FIG. 5, the left-right direction) depending on the thermal expansion coefficient $\alpha 2$. On the other hand, the band pass layer 42 also expands. In this case, the thermal expansion coefficient $\alpha 1$ of the band pass layer 42 is less than the thermal expansion coefficient $\alpha 2$ of the support 140. Although the amount of the band pass layer 42 extending in the plane direction is small, the band pass layer 42 is restricted in the plane direction by the support 140, and thus is stretched in response to the extension of the support 140. Therefore, the band pass layer 42 does not substantially extend in the thickness direction and changes from a state shown in the upper side of FIG. 5 to a state shown in the lower side of FIG. 5. Since the band pass layer 42 does not extend in the thickness direction, the transmission wavelength of the band pass layer 42 does not change.

In addition, in the general narrow band pass filter formed of an inorganic material in the related art, the band pass layer does not substantially thermally expand. Therefore, the band pass layer does not also extend in the thickness direction, and the transmission wavelength of the band pass layer does not change.

Figure 6:
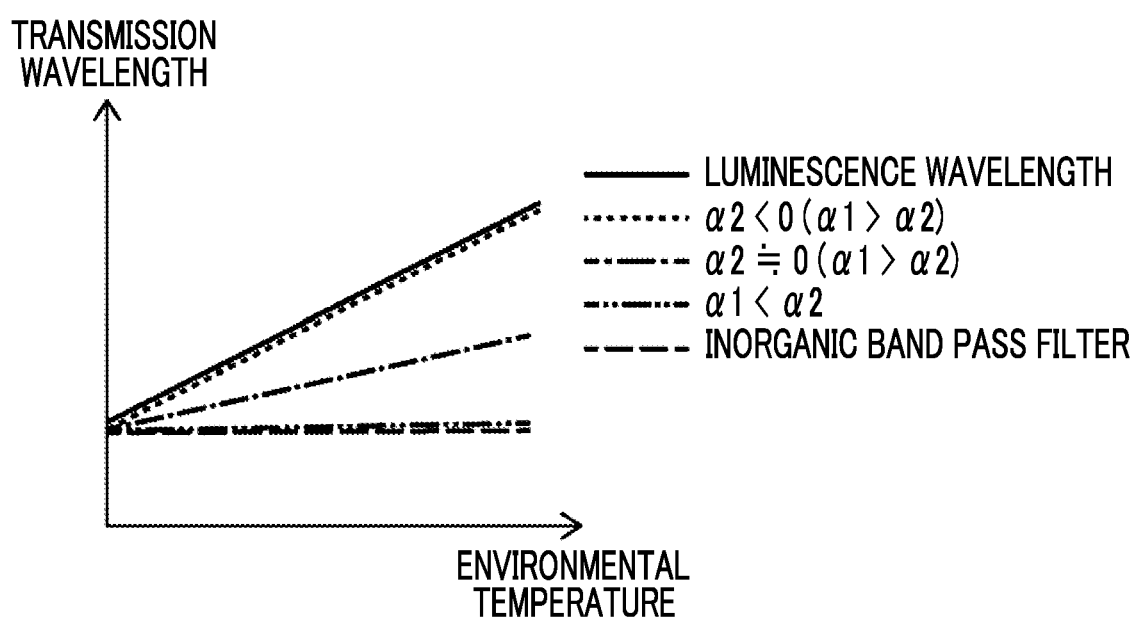
FIG. 6 is a graph showing a relationship between a temperature and a wavelength.

FIG. 6 is a graph conceptually showing a relationship between the environmental temperature and the transmission wavelength of the band pass filter described above. In addition, FIG. 6 also shows a relationship between the luminescence wavelength of the light source and the environmental temperature.

As shown in FIG. 6, the luminescence wavelength of the light source increases as the environmental temperature increases.

On the other hand, in the inorganic band pass filter in the related art, in a case where the thermal expansion coefficient $\alpha 1$ of the band pass layer is less than the thermal expansion coefficient $\alpha 2$ of the support ($\alpha 1 < \alpha 2$), even in a case where the environmental temperature is high, the transmission wavelength of the band pass filter does not change. Therefore, in a case where the environmental temperature is high as shown in FIG. 6, there is a deviation between the luminescence wavelength of the light source and the transmission wavelength of the band pass filter, and the amount of light having the luminescence wavelength of the light source incident into the light-receiving element is small. Therefore, the SN ratio decreases.

On the other hand, as shown in FIG. 6, in a case where the thermal expansion coefficient $\alpha 1$ of the band pass layer is more than the thermal expansion coefficient $\alpha 2$ of the support ($\alpha 1 > \alpha 2$), As the environmental temperature increases, the transmission wavelength of the band pass filter increases. Therefore, even in a narrow band pass filter, in a case where the environmental temperature changes, the luminescence wavelength of the light source and the transmission wavelength of the band pass filter change in the same manner. Accordingly, the light having the luminescence wavelength of the light source can transmit through the band pass filter, the amount of light having a transmission wavelength of the light source incident into the light-receiving element can be prevented from decreasing, and the SN ratio can be prevented from decreasing.

It is assumed that the thermal expansion coefficient of the support is substantially 0 in the example shown in FIG. 3 and the thermal expansion coefficient of the support is negative in the example shown in FIG. 4. However, the present invention is not limited to this configuration, and the thermal expansion coefficient of the support may be a positive value. A case where the thermal expansion coefficient of the support is a positive value but the thermal expansion coefficient $\alpha 1$ of the band pass layer is more than the thermal expansion coefficient $\alpha 2$ of the support is assumed. In this case, in a case where the environmental temperature is high, the amount of the band pass layer extending in the plane direction is more than the amount of the support extending in the plane direction. However, since the band pass layer is restricted in the plane direction by the support, the elongation in the plane direction is suppressed. Therefore, the band pass layer extends in the thickness direction.

Here, from the viewpoint that the transmission wavelength of the band pass filter changes more suitably with respect to a change in environmental temperature, the thermal expansion coefficient $\alpha 1$ of the band pass layer is preferably 20 to 200 ppm/° C., more preferably 30 to 150 ppm/° C., and still more preferably 40 to 100 ppm/° C.

In addition, from the viewpoint that the transmission wavelength of the band pass filter changes more suitably with respect to a change in environmental temperature, the thermal expansion coefficient $\alpha 2$ of the support is preferably −500 to 20 ppm/° C., more preferably −300 to 10 ppm/° C., and still more preferably −200 to 5 ppm/° C.

In addition, it is also preferable that the thermal expansion coefficient $\alpha 2$ of the support is less than 0 ppm/° C., that is, a negative thermal expansion coefficient.

In addition, from the viewpoint that the transmission wavelength of the band pass filter changes more suitably with respect to a change in environmental temperature, a difference between the thermal expansion coefficient $\alpha 1$ of the band pass layer and the thermal expansion coefficient $\alpha 2$ of the support is preferably 30 ppm/° C. or higher, more preferably 35 to 200 ppm/° C., and still more preferably 40 to 200 ppm/° C.

Here, the thermal expansion coefficient is measured as follows.

For example, the thermal expansion coefficient can be measured using a well-known method such as JIS K 7197.

For example, the thermal expansion coefficient is obtained by thermomechanical property measurement using a thermomechanical analysis apparatus (TMA4000SE, manufactured by NETZSCH Japan K. K.). As measurement conditions, for example, the sample size is 5 mm×20 mm, the chuck-to-chuck distance is 15 mm, the lengths of both of upper and lower chuck portions are 2.5±0.5 mm. Under the conditions, while changing the temperature at 5° C./min in a range of −20° C. to 60° C., the displacement of the chuck-to-chuck distance is measured. In addition, regarding the load, the measurement is measured under a constant load of 3 g on the sample. Next, a slope of an approximate straight line of data regarding the displacement in the range of −20° C. to 60° C. is obtained to obtain the displacement per temperature of 1° C. Further, by dividing the slope by 15 mm that is the chuck-to-chuck distance when the sample is set, the thermal expansion coefficient can be calculated.

In addition, from the viewpoint that the transmission wavelength of the band pass filter changes more suitably with respect to a change in environmental temperature, the elastic modulus E1 of the band pass layer is preferably less than 10 GPa, more preferably 1 to 8 GPa, and still more preferably 2 to 6 GPa.

In addition, from the viewpoint that the transmission wavelength of the band pass filter changes more suitably with respect to a change in environmental temperature, the elastic modulus E2 of the support is preferably 10 to 200 GPa, more preferably 20 to 150 GPa, and still more preferably 40 to 100 GPa.

In addition, from the viewpoint that the transmission wavelength of the band pass filter changes more suitably with respect to a change in environmental temperature, a ratio of the elastic modulus E2 of the support to the elastic modulus E1 of the band pass layer is preferably 2 or more, more preferably 5 or more, and still more preferably 10 or more.

Here, the elastic modulus is measured as follows. Unless specified otherwise, the elastic modulus is an elastic modulus at normal temperature (25°).

For example, the elastic modulus can be measured using a well-known method such as JIS K 7127.

Here, the half-width of the peak of the transmission wavelength of the band pass filter is preferably 20 nm or less. That is, in a case where the band pass filter is a transmissive band pass filter, the half-width of the transmission peak of the band pass layer is preferably 20 nm or less, more preferably 1 to 18 nm, and still more preferably 2 to 15 nm. In addition, in a case where the band pass filter is a reflective band pass filter, the half-width of the reflection peak of the band pass layer is preferably 20 nm or less, more preferably 1 to 18 nm, and still more preferably 2 to 15 nm.

By setting the half-width of the peak of the transmission wavelength of the band pass filter to be 20 nm or less, external light incident into the sensor can be more suitably cut, and the SN ratio can be further improved. In addition, in the present invention, the transmission wavelength of the band pass filter changes depending on a change in environmental temperature. Therefore, even in a case where the half-width of the band pass filter is small, during a change in environmental temperature, a deviation between the luminescence wavelength of the light source and the transmission wavelength of the band pass filter can be suitably suppressed.

Here, it is preferable that the band pass layer includes a cholesteric liquid crystal layer that is a layer obtained by immobilizing a cholesteric liquid crystalline phase, the cholesteric liquid crystal layer has a region where a refractive index nx in an in-plane slow axis direction and a refractive index ny in an in-plane fast axis direction satisfy nx>ny, and in a case where a selective reflection center wavelength of the cholesteric liquid crystal layer is represented by $\lambda$, the cholesteric liquid crystal layer has a second selective reflection peak at a wavelength $\pi/2$ and a half-width of the second selective reflection peak at $\lambda/2$ is 20 nm or less.

The cholesteric liquid crystal layer is configured to have a region where a refractive index nx in an in-plane slow axis direction and a refractive index ny in an in-plane fast axis direction satisfy nx>ny. As a result, the cholesteric liquid crystal layer can be configured to have the second selective reflection peak having a narrow half-width at a wavelength that is ½ of the selective reflection center wavelength. By using the second selective reflection peak having a narrow half-width in the cholesteric liquid crystal layer, a narrow band pass filter that allows transmission of only light in a narrow wavelength range can be realized. By using this band pass filter, the sensor according to the embodiment of the present invention can further reduce the influence of external light such that high-accuracy measurement can be performed at a high SN ratio.

Hereinafter, the cholesteric liquid crystal layer having the region where nx>ny is satisfied and having the second selective reflection peak at the wavelength $\lambda/2$ will be described.

Figure 7:
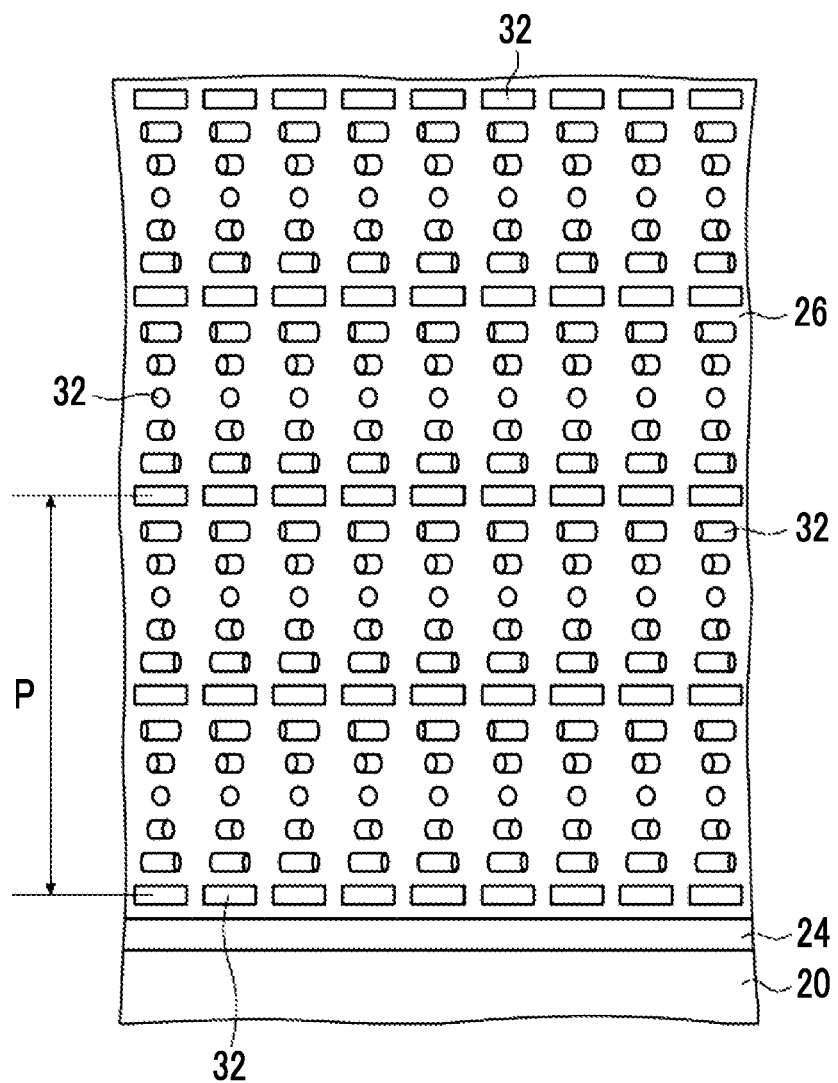
FIG. 7 is a diagram conceptually showing a cholesteric liquid crystal layer of the band pass filter in the sensor shown in FIG. 1.

FIG. 7 conceptually shows an example of the cholesteric liquid crystal layer.

A cholesteric liquid crystal layer 26 shown in FIG. 7 is formed on an alignment film 24 that is formed on a support 20.

In the following description, the support 20 side will also be referred to as "lower side", and the cholesteric liquid crystal layer 26 side will also be referred to as "upper side". Accordingly, in the support 20, the cholesteric liquid crystal layer 26 side will be referred to as "upper surface", and a side opposite to the cholesteric liquid crystal layer 26 side will be referred to as "lower surface". In addition, in the alignment film 24 and the cholesteric liquid crystal layer 26, a surface on the support 20 side will be referred to as "lower surface", and a surface opposite to the support 20 side will be referred to as "upper surface".

Support

The support 20 supports the cholesteric liquid crystal layer during the formation of the cholesteric liquid crystal layer 26.

In a case where the cholesteric liquid crystal layer 26 is used as the band pass layer, the cholesteric liquid crystal layer 26 may be transferred to the support of the band pass filter and used after peeling off the support 20 and the alignment film 24. That is, the support 20 may be a temporary support. Alternatively, the support 20 may be used as the support of the band pass filter. That is, the cholesteric liquid crystal layer 26 may be formed on the support of the band pass filter.

In a case where the support 20 is used as the support of the band pass filter, the above-described support may be used as the support 20.

In addition, in a case where the support 20 is the temporary support, for example, various temporary supports that are used for preparing a cholesteric liquid crystal layer can be used. Examples of the temporary support include film-shaped members formed of glass, triacetyl cellulose (TAC), polyethylene terephthalate (PET), polycarbonates, polyvinyl chloride, acryl, polyolefin, and the like. In addition, the temporary support may be a multi-layer support including a plurality of layers formed of the above-described materials.

Alignment Film

The alignment film 24 is formed on the surface (upper surface) of the support 20.

The alignment film 24 is an alignment film for aligning the liquid crystal compound 32 to a predetermined alignment state during the formation of the cholesteric liquid crystal layer 26.

As the alignment film 24, various well-known films can be used.

Examples of the alignment film 24 include a rubbed film formed of an organic compound such as a polymer, an obliquely deposited film formed of an inorganic compound, a film having a microgroove, a film formed by lamination of Langmuir-Blodgett (LB) films formed with the Langmuir-Blodgett technique using an organic compound such as w-tricosanoic acid, dioctadecylmethylammonium chloride, or methyl stearate, and a photo-alignment film that emits polarized light or non-polarized light to a photo-alignment material.

The alignment film 24 may be formed using a well-known method corresponding to a material for forming the alignment film.

For example, the alignment film formed by a rubbing treatment can be formed by rubbing a surface of a polymer layer with paper or fabric in a given direction multiple times.

As the material used for the alignment film, for example, a material for forming polyimide, polyvinyl alcohol, a polymer having a polymerizable group described in JP1997-152509A (JP-H9-152509A), or an alignment film such as JP2005-97377A, JP2005-99228A, and JP2005-128503A is preferable.

In addition, the support 20 may also function as an alignment film by performing a treatment such as a rubbing treatment or laser processing on the support 20 instead of forming the alignment film 24.

The alignment film 24 can also be suitably used as a so-called photo-alignment film obtained by irradiating a photo-alignment material with polarized light or non-polarized light. That is, a photo-alignment film that is formed by applying a photo-alignment material to the support 20 is suitably used as the alignment film 24.

The irradiation of polarized light can be performed in a direction perpendicular or oblique to the photo-alignment film, and the irradiation of non-polarized light can be performed in a direction oblique to the photo-alignment film.

Preferable examples of the photo-alignment material used in the alignment film that can be used in the present invention include: an azo compound described in JP2006-285197A, JP2007-76839A, JP2007-138138A, JP2007-94071A, JP2007-121721A, JP2007-140465A, JP2007-156439A, JP2007-133184A, JP2009-109831A, JP3883848B, and JP4151746B; an aromatic ester compound described in JP2002-229039A; a maleimide- and/or alkenyl-substituted nadiimide compound having a photo-alignable unit described in JP2002-265541A and JP2002-317013A; a photocrosslinking silane derivative described in JP4205195B and JP4205198B, a photocrosslinking polyimide, a photocrosslinking polyamide, or a photocrosslinking polyester described in JP2003-520878A, JP2004-529220A, and JP4162850B; and a photodimerizable compound, in particular, a cinnamate compound, a chalcone compound, or a coumarin compound described in JP1997-118717A (JP-H9-118717A), JP1998-506420A (JP-H10-506420A), JP2003-505561A, WO2010/150748A, JP2013-177561A, and JP2014-012823A.

Among these, an azo compound, a photocrosslinking polyimide, a photocrosslinking polyamide, a photocrosslinking polyester, a cinnamate compound, or a chalcone compound is suitably used.

The thickness of the alignment film 24 is not particularly limited. The thickness with which a required alignment function can be obtained may be appropriately set depending on the material for forming the alignment film.

The thickness of the alignment film is preferably 0.01 to 5 μm and more preferably 0.05 to 2 μm.

Cholesteric Liquid Crystal Layer

The cholesteric liquid crystal layer 26 is formed on a surface of the alignment film 24.

In FIG. 7, in order to simplify the drawing to clarify a configuration of the cholesteric liquid crystal layer 26, only a portion of the cholesteric liquid crystal layer 26 corresponding to two rotations (720° rotation) in the twisted alignment of the liquid crystal compound 32 in the cholesteric liquid crystalline phase is conceptually shown. That is, FIG. 7 shows only two pitches of the helical structure of the cholesteric liquid crystalline phase.

However, the cholesteric liquid crystal layer 26 has a helical structure in which the liquid crystal compound 32 is helically turned and laminated along the helical axis in the thickness direction as in a cholesteric liquid crystal layer obtained by immobilizing a typical cholesteric liquid crystalline phase. In the helical structure, a configuration in which the liquid crystal compound 32 is helically rotated once (rotated by 360°) and laminated is set as one helical pitch, and one or more pitches of the helically turned liquid crystal compound 32 are laminated.

That is, in the present invention, the cholesteric liquid crystalline phase (cholesteric liquid crystal layer) refers to a structure in which one or more pitches of the helical structures are laminated. In the cholesteric liquid crystal layer, by laminating one or more pitches of the helical structure formed of the liquid crystal compound 32, reflectivity having wavelength selectivity described below is exhibited.

Accordingly, in the present invention, regarding a layer having a helical structure in which the liquid crystal compound 32 is helically turned and laminated along the helical axis in the thickness direction, in a case where the helical pitch of the layer is less than one pitch, this layer is not a cholesteric liquid crystal layer.

The cholesteric liquid crystal layer 26 is obtained by immobilizing a cholesteric liquid crystalline phase. That is, the cholesteric liquid crystal layer 26 is a layer obtained by cholesteric alignment of the liquid crystal compound 32 (liquid crystal material).

As is well-known, the cholesteric liquid crystal layer obtained by immobilizing a cholesteric liquid crystalline phase has Wavelength-selective reflectivity.

Although described below in detail, the selective reflection wavelength range of the cholesteric liquid crystal layer depends on the length (pitch P shown in FIG. 7) of one helical pitch described above in the thickness direction.

In a first embodiment of the present invention where the band pass layer includes a cholesteric liquid crystal layer that is a layer obtained by immobilizing a cholesteric liquid crystalline phase, the cholesteric liquid crystal layer has a region where a refractive index nx in an in-plane slow axis direction and a refractive index ny in an in-plane fast axis direction satisfy nx>ny, and in a case where a selective reflection center wavelength of the cholesteric liquid crystal layer is represented by λ, the cholesteric liquid crystal layer has a second selective reflection peak at a wavelength λ/2 and a half-width of the second selective reflection peak at λ/2 is 20 nm or less.

In this case, the second selective reflection peak at λ/2 is used as a band pass.

In a second embodiment of the present invention where the band pass layer includes a cholesteric liquid crystal layer that is a layer obtained by immobilizing a cholesteric liquid crystalline phase, a half-width of a selective reflection peak of the cholesteric liquid crystal layer is 45 nm or less.

In this case, the first selective reflection peak is used as a band pass without providing the second selective reflection peak.

Here, in the first embodiment of the present invention where the band pass layer includes a cholesteric liquid crystal layer that is a layer obtained by immobilizing a cholesteric liquid crystalline phase, the cholesteric liquid crystal layer 26 has a configuration where a refractive index nx in the in-plane slow axis direction and a refractive index ny in the in-plane fast axis direction satisfy nx>ny.

Figure 8:
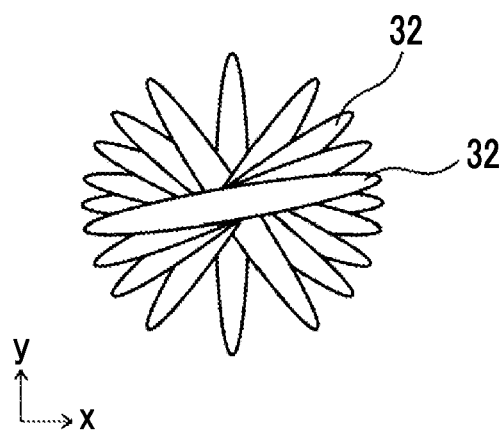
FIG. 8 is a diagram showing a part of a liquid crystal compound of the cholesteric liquid crystal layer in the band pass filter shown in FIG. 7 in case of being seen from a helical axis direction.

In the present invention, the cholesteric liquid crystal layer 26 has a configuration in which, in a case where the arrangement of the liquid crystal compound 32 is seen from the helical axis direction, an angle between the molecular axes of the liquid crystal compounds 32 adjacent to each other gradually changes as shown in FIG. 8. In other words, in a case where the arrangement of the liquid crystal compound 32 is seen from the helical axis direction, the existence probability of the liquid crystal compound 32 varies. As a result, the cholesteric liquid crystal layer 26 has a configuration where a refractive index nx in the in-plane slow axis direction and a refractive index ny in the in-plane fast axis direction satisfy nx>ny.

In the following description, the cholesteric liquid crystal layer 26 having a configuration in which, in a case where the arrangement of the liquid crystal compound 32 is seen from the helical axis direction, an angle between the molecular axes of the liquid crystal compounds 32 adjacent to each other gradually changes as shown in FIG. 8 will also be referred to as the cholesteric liquid crystal layer 26 having a refractive index ellipsoid.

The cholesteric liquid crystal layer 26 has the configuration in which the refractive index nx in the in-plane slow axis direction and the refractive index ny in the in-plane fast axis direction satisfy nx>ny. As a result, as reflected light to be reflected from the cholesteric liquid crystal layer 26, primary light and secondary light are obtained. At this time, the secondary light is obtained as light in a very narrower wavelength range than that of the primary light. The selective central reflection wavelength of the secondary light is half of the selective central reflection wavelength of the primary light. An action of the cholesteric liquid crystal layer 26 (band pass filter) will be described below in detail. The primary light refers to light corresponding to the selective reflection peak (hereinafter, also referred to as "first selective reflection peak") at the selective reflection center wavelength of the cholesteric liquid crystal layer. The secondary light refers to light corresponding to the second selective reflection peak in the present invention.

Cholesteric Liquid Crystalline Phase

It is known that the cholesteric liquid crystalline phase exhibits selective reflectivity at a specific wavelength.

A center wavelength of selective reflection (selective reflection center wavelength) $\lambda$ of a general cholesteric liquid crystalline phase depends on a helical pitch P in the cholesteric liquid crystalline phase and complies with a relationship of $\lambda=n \times P$ with an average refractive index n of the cholesteric liquid crystalline phase. Therefore, the selective reflection center wavelength can be adjusted by adjusting the helical pitch. In the present invention, light having a wavelength to be reflected according to the relationship of $\lambda=n \times P$ is primary light.

The selective reflection center wavelength of the cholesteric liquid crystalline phase increases as the pitch P increases.

As described above, the helical pitch P refers to one pitch (helical period) of the helical structure of the cholesteric liquid crystalline phase, in other words, one helical turn. That is, the helical pitch refers to the length in a helical axis direction in which a director (in the case of a rod-like liquid crystal, a major axis direction) of the liquid crystal compound constituting the cholesteric liquid crystalline phase rotates by 360°.

In a case where a cross-section of the cholesteric liquid crystal layer is observed with a scanning electron microscope (SEM), a stripe pattern in which bright lines (bright portions) and dark lines (dark portions) derived from a cholesteric liquid crystalline phase are alternately laminated in the thickness direction is observed. The helical pitch, that is, the pitch P is equal to the length corresponding to two bright lines and two dark lines in the thickness direction, that is, the length corresponding to two dark lines and two bright lines in the thickness direction.

The helical pitch of the cholesteric liquid crystalline phase depends on the kind of the chiral agent used together with the liquid crystal compound and the concentration of the chiral agent added during the formation of the cholesteric liquid crystal layer. Therefore, a desired helical pitch can be obtained by adjusting these conditions.

The details of the adjustment of the pitch can be found in "Fuji Film Research & Development" No. 50 (2005), pp. 60 to 63. As a method of measuring a sense of helix and a helical pitch, a method described in "Introduction to Experimental Liquid Crystal Chemistry", (the Japanese Liquid Crystal Society, 2007, Sigma Publishing Co., Ltd.), p. 46, and "Liquid Crystal Handbook" (the Editing Committee of Liquid Crystal Handbook, Maruzen Publishing Co., Ltd.), p. 196 can be used.

The cholesteric liquid crystalline phase exhibits selective reflectivity with respect to left or right circularly polarized light at a specific wavelength. Whether or not the reflected light is right circularly polarized light or left circularly polarized light is determined depending on a helical twisted direction (sense) of the cholesteric liquid crystalline phase. Regarding the selective reflection of the circularly polarized light by the cholesteric liquid crystalline phase, in a case where the helical twisted direction of the cholesteric liquid crystal layer is right, right circularly polarized light is reflected, and in a case where the helical twisted direction of the cholesteric liquid crystal layer is left, left circularly polarized light is reflected. Accordingly, the helical twisted direction in the cholesteric liquid crystalline phase can be verified by causing right circularly polarized light and/or left circularly polarized light to be incident into the cholesteric liquid crystal layer.

A twisted direction of the cholesteric liquid crystalline phase can be adjusted by adjusting the kind of the liquid crystal compound that forms the cholesteric liquid crystal layer and/or the kind of the chiral agent to be added.

In addition, a half-width $\Delta\lambda$ (nm) of a selective reflection wavelength range (circularly polarized light reflection wavelength range) where selective reflection is exhibited, that is, the half-width of the primary light depends on $\Delta n$ of the cholesteric liquid crystalline phase and the helical pitch P and complies with a relationship of $\Delta\lambda=\Delta n \times P$. Therefore, the width of the selective reflection wavelength range of the primary light can be controlled by adjusting $\Delta n$. $\Delta n$ can be adjusted by adjusting a kind of a liquid crystal compound for forming the cholesteric liquid crystal layer and a mixing ratio thereof, and a temperature during alignment immobilization.

The half-width of the primary light may be adjusted depending on the use of the band pass filter. The half-width of the primary light may be, for example, 30 nm or more.

The selective reflection center wavelength in the cholesteric liquid crystal layer is not particularly limited, and may be appropriately set depending on the use of the sensor using the band pass filter.

Specifically, in the cholesteric liquid crystal layer, the selective reflection center wavelength may be appropriately set depending on the wavelength of the measurement light used in the sensor. Although described below, in the embodiment, the sensor receives the light in the wavelength range of the second selective reflection peak of the band pass filter with the light-receiving element. The wavelength of the second selective reflection peak refers to a ½ wavelength of the selective reflection center wavelength $\lambda$ of the cholesteric liquid crystal layer. Accordingly, the selective reflection center wavelength of the cholesteric liquid crystal layer is set such that the wavelength of the second selective reflection peak is included in the wavelength range of the measurement light.

As described above, the selective reflection center wavelength of the cholesteric liquid crystal layer depends on the pitch P of the helical structure. Accordingly, the pitch P of the helical structure may be set such that the wavelength of the second selective reflection peak is included in the wavelength range of the measurement light. The pitch P of the helical structure can be verified by analyzing the stripe pattern in which bright lines and dark lines derived from a cholesteric liquid crystalline phase are alternately laminated in the thickness direction in a case where a cross-section of the cholesteric liquid crystal layer is observed with a SEM.

Method of Forming Cholesteric Liquid Crystal Layer

The cholesteric liquid crystal layer can be formed by immobilizing a cholesteric liquid crystalline phase in a layer shape.

The structure in which a cholesteric liquid crystalline phase is immobilized may be a structure in which the alignment of the liquid crystal compound as a cholesteric liquid crystalline phase is immobilized. Typically, the structure in which a cholesteric liquid crystalline phase is immobilized is preferably a structure which is obtained by making the polymerizable liquid crystal compound to be in a state where a cholesteric liquid crystalline phase is aligned, polymerizing and curing the polymerizable liquid crystal compound with ultraviolet irradiation, heating, or the like to form a layer having no fluidity, and concurrently changing the state of the polymerizable liquid crystal compound into a state where the alignment state is not changed by an external field or an external force.

The structure in which a cholesteric liquid crystalline phase is immobilized is not particularly limited as long as the optical characteristics of the cholesteric liquid crystalline phase are maintained, and the liquid crystal compound in the cholesteric liquid crystal layer does not necessarily exhibit liquid crystallinity. For example, the molecular weight of the polymerizable liquid crystal compound may be increased by a curing reaction such that the liquid crystallinity thereof is lost.

Examples of a material used for forming the cholesteric liquid crystal layer obtained by immobilizing a cholesteric liquid crystalline phase include a liquid crystal composition including a liquid crystal compound. It is preferable that the liquid crystal compound is a polymerizable liquid crystal compound.

In addition, the liquid crystal composition used for forming the cholesteric liquid crystal layer may further include a surfactant and a chiral agent.

Polymerizable Liquid Crystal Compound (Rod-Like Liquid Crystal Compound

The polymerizable liquid crystal compound may be a rod-like liquid crystal compound or a disk-like liquid crystal compound.

Examples of the rod-like polymerizable liquid crystal compound for forming the cholesteric liquid crystalline phase include a rod-like nematic liquid crystal compound. As the rod-like nematic liquid crystal compound, an azomethine compound, an azoxy compound, a cyanobiphenyl compound, a cyanophenyl ester compound, a benzoate compound, a phenyl cyclohexanecarboxylate compound, a cyanophenylcyclohexane compound, a cyano-substituted phenylpyrimidine compound, an alkoxy-substituted phenylpyrimidine compound, a phenyldioxane compound, a tolan compound, or an alkenylcyclohexylbenzonitrile compound is preferably used. Not only a low-molecular-weight liquid crystal compound but also a polymer liquid crystal compound can be used.

The polymerizable liquid crystal compound can be obtained by introducing a polymerizable group into the liquid crystal compound. Examples of the polymerizable group include an unsaturated polymerizable group, an epoxy group, and an aziridinyl group. Among these, an unsaturated polymerizable group is preferable, and an ethylenically unsaturated polymerizable group is more preferable. The polymerizable group can be introduced into the molecules of the liquid crystal compound using various methods. The number of polymerizable groups in the polymerizable liquid crystal compound is preferably 1 to 6 and more preferably 1 to 3.

Examples of the polymerizable liquid crystal compound include compounds described in Makromol. Chem., (1989), Vol. 190, p. 2255, Advanced Materials (1993), Vol. 5, p. 107, U.S. Pat. Nos. 4,683,327A, 5,622,648A, 5,770,107A, WO95/22586A, WO95/24455A, WO97/00600A, WO98/23580A, WO98/52905A, JP1989-272551A (JP-H1-272551A), JP1994-16616A (JP-H6-16616A), JP1995-110469A (JP-H7-110469A), JP1999-080081A (JP-H11-080081A), and JP2001-328973A. Two or more polymerizable liquid crystal compounds may be used in combination. In a case where two or more polymerizable liquid crystal compounds are used in combination, the alignment temperature can be decreased.

In addition, as a polymerizable liquid crystal compound other than the above-described examples, for example, a cyclic organopolysiloxane compound having a cholesteric phase described in JP1982-165480A (JP-S57-165480A) can be used. Further, as the above-described polymer liquid crystal compound, for example, a polymer in which a liquid crystal mesogenic group is introduced into a main chain, a side chain, or both a main chain and a side chain, a polymer cholesteric liquid crystal in which a cholesteryl group is introduced into a side chain, a liquid crystal polymer described in JP1997-133810A (JP-H9-133810A), and a liquid crystal polymer described in JP1999-293252A (JP-H11-293252A) can be used.

Disk-Like Liquid Crystal Compound

As the disk-like liquid crystal compound, for example, compounds described in JP2007-108732A and JP2010-244038A can be preferably used.

In addition, the addition amount of the polymerizable liquid crystal compound in the liquid crystal composition is preferably 75% to 99.9 mass %, more preferably 80% to 99 mass %, and still more preferably 85% to 90 mass % with respect to the solid content mass (mass excluding a solvent) of the liquid crystal composition.

Surfactant

The liquid crystal composition used for forming the cholesteric liquid crystal layer may include a surfactant.

It is preferable that the surfactant is a compound that can function as an alignment control agent contributing to the stable or rapid alignment of a cholesteric liquid crystalline phase. Examples of the surfactant include a silicone-based surfactant and a fluorine-based surfactant. Among these, a fluorine-based surfactant is preferable.

Specific examples of the surfactant include compounds described in paragraphs "0082" to "0090" of JP2014-119605A, compounds described in paragraphs "0031" to "0034" of JP2012-203237A, exemplary compounds described in paragraphs "0092" and "0093" of JP2005-099248A, exemplary compounds described in paragraphs "0076" to "0078" and "0082" to "0085" of JP2002-129162A, and fluorine (meth)acrylate polymers described in paragraphs "0018" to "0043" of JP2007-272185A.

As the surfactant, one kind may be used alone, or two or more kinds may be used in combination.

As the fluorine-based surfactant, a compound described in paragraphs "0082" to "0090" of JP2014-119605A is preferable.

The addition amount of the surfactant in the liquid crystal composition is preferably 0.01 to 10 mass %, more preferably 0.01 to 5 mass %, and still more preferably 0.02 to 1 mass % with respect to the total mass of the liquid crystal compound.

As the liquid crystal compound in the second embodiment of the present invention where the band pass layer includes a cholesteric liquid crystal layer that is a layer obtained by immobilizing a cholesteric liquid crystalline phase, a liquid crystal compound represented by Formula (I) is preferable from the viewpoint that Δn is small and the half-width of the selective reflection of the cholesteric liquid crystal layer is narrow.

In particular, in a case where the number obtained by dividing the number of trans-1,4-cyclohexylene groups which may have a substituent represented by A by m is represented by mc, a liquid crystal compound that satisfies mc >0.1 is preferable, and a liquid crystal compound that satisfies 0.4≤mc≤0.8 is more preferable.

mc represents the number represented by the following calculation expression.

$mc$=(the number obtained by dividing the number of trans-1,4-cyclohexylene groups which may have a substituent represented by $A$)÷$m$

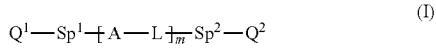
(I)

In the formula,

A represents a phenylene group which may have a substituent or a trans-1,4-cyclohexylene group which may have a substituent, at least one of A's represents a trans-1,4-cyclohexylene group which may have a substituent, L represents a single bond or a linking group selected from the group consisting of —CH$_2$O—, —OCH$_2$—, —(CH$_2$)$_2$OC(=O)—, —C(=O)O(CH$_2$)$_2$—, —C(=O)O—, —OC(=O)—, —OC(=O)O—, —CH=N—N=CH—, —CH=CH—, —NHC(=O)—, —C(=O)NH—, —CH=N—, —N=CH—, —CH=CH—C(=O)O—, and —OC(=O)—CH=CH—, m represents an integer of 3 to 12, Sp$^1$ and Sp$^2$ each independently represent a single bond or a linking group selected from the group consisting of a linear or branched alkylene group having 1 to 20 carbon atoms and a group in which one or two or more —CH$_2$—'s in the linear or branched alkylene group having 1 to 20 carbon atoms are substituted with —O—, —S—, —NH—, —N(CH$_3$)—, —C(=O)—, —OC(=O)—, or C(=O)O—, and Q$^1$ and Q$^2$ each independently represent a hydrogen atom or a polymerizable group selected from the group consisting of groups represented by Formulas (Q-1) to (Q-5), where any one of Q$^1$ or Q$^2$ represents a polymerizable group;

(Q-1)

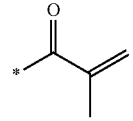
(Q-2)

(Q-3)

(Q-4)

(Q-5)

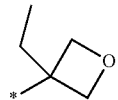

A represents a phenylene group which may have a substituent or a trans-1,4-cyclohexylene group which may have a substituent. In the present specification, it is preferable that a phenylene group is a 1,4-phenylene group.

At least one of A's represents a trans-1,4-cyclohexylene group which may have a substituent.

m A's may be the same as or different from each other.

m represents an integer of 3 to 12, preferably an integer of 3 to 9, more preferably an integer of 3 to 7, and still more preferably an integer of 3 to 5.

The substituent which may be included in the phenylene group or the trans-1,4-cyclohexylene group in Formula (I) is not particularly limited, and examples thereof include a substituent selected from the group consisting of an alkyl group, a cycloalkyl group, an alkoxy group, an alkyl ether group, an amide group, an amino group, a halogen atom, and a group formed of a combination of two or more of the above-described substituents. In addition, examples of the substituent include a substituent represented by —C(=O)—X$^3$-Sp$^3$-Q$^3$ described below. The phenylene group or the trans-1,4-cyclohexylene group may have 1 to 4 substituents. In a case where two or more substituents are included, the two or more substituents may be the same as or different from each other.

In the present specification, the alkyl group may be linear or branched. The number of carbon atoms in the alkyl group is preferably 1 to 30, more preferably 1 to 10, and still more preferably 1 to 6. Examples of the alkyl group include a methyl group, an ethyl group, an n-propyl group, an isopropyl group, an n-butyl group, an isobutyl group, a sec-butyl group, a tert-butyl group, an n-pentyl group, a isopentyl group, a neopentyl group, a 1,1-dimethylpropyl group, an n-hexyl group, an isohexyl group, a heptyl group, an octyl group, a nonyl group, a decyl group, an undecyl group, and a dodecyl group. The description of the alkyl group in the alkoxy group is the same as the above description of the alkyl group. In addition, specific examples of the alkylene group described in the present specification include divalent groups obtained by removing any one hydrogen atom from each of the above-described examples of the alkyl group. Examples of the halogen atom include a fluorine atom, a chlorine atom, a bromine atom, and an iodine atom.

In the present specification, the number of carbon atoms in the cycloalkyl group is preferably 3 or more and more preferably 5 or more and is preferably 20 or less, more preferably 10 or less, still more preferably 8 or less, and still more preferably 6 or less. Examples of the cycloalkyl group include a cyclopropyl group, a cyclobutyl group, a cyclopentyl group, a cyclohexyl group, a cycloheptyl group, and a cyclooctyl group.

As the substituent which may be included in the phenylene group or the trans-1,4-cyclohexylene group, a substituent selected from the group consisting of an alkyl group, an alkoxy group, and —C(=O)—$X^3$-$Sp^3$-$Q^3$ is preferable. Here, $X^3$ represents a single bond, —O—, —S—, or —N($Sp^4$-$Q^4$)- or represents a nitrogen atom that forms a ring structure with $Q^3$ and $Sp^3$. $Sp^3$ and $Sp^4$ each independently represent a single bond or a linking group selected from the group consisting of a linear or branched alkylene group having 1 to 20 carbon atoms and a group in which one or two or more —$CH_2$-'s in the linear or branched alkylene group having 1 to 20 carbon atoms are substituted with —O—, —S—, —NH—, —N($CH_3$)—, —C(=O)—, —OC(=O)—, or C(=O)O—.

$Q^3$ and $Q^4$ each independently represent a hydrogen atom, a cycloalkyl group, a group in which one or two or more —$CH_2$-'s in the cycloalkyl group are substituted with —O—, —S—, —NH—, —N($CH_3$)—, —C(=O)—, —OC(=O)—, or C(=O)O—, or a polymerizable group selected from the group consisting of groups represented by Formulas (Q-1) to (Q-5).

Specific examples of the group in which one or two or more —$CH_2$-'s in the cycloalkyl group are substituted with —O—, —S—, —NH—, —N($CH_3$)—, —C(=O)—, —OC(=O)—, or C(=O)O— include a tetrahydrofuranyl group, a pyrrolidinyl group, an imidazolidinyl group, a pyrazolidinyl group, a piperidyl group, a piperazinyl group, and a morpholinyl group. Among these, a tetrahydrofuranyl group is preferable, and a 2-tetrahydrofuranyl group is more preferable.

In Formula (I), L represents a single bond or a linking group selected from the group consisting of —$CH_2$O—, —O$CH_2$—, —($CH_2$)$_2$OC(=O)—, —C(=O)O($CH_2$)$_2$—, —C(=O)O—, —OC(=O)—, —OC(=O)O—, —CH=CH—C(=O)O—, and —OC(=O)—CH=CH—. It is preferable that L represents —C(=O)O— or OC(=O)—. m L's may be the same as or different from each other.

$Sp^1$ and $Sp^2$ each independently represent a single bond or a linking group selected from the group consisting of a linear or branched alkylene group having 1 to 20 carbon atoms and a group in which one or two or more —$CH_2$-'s in the linear or branched alkylene group having 1 to 20 carbon atoms are substituted with —O—, —S—, —NH—, —N($CH_3$)—, —C(=O)—, —OC(=O)—, or —C(=O)O—. Sp' and $Sp^2$ each independently represent preferably a linear alkylene group having 1 to 10 carbon atoms in which a linking group selected from the group consisting of —OC(=O)—, and —C(=O)O— is bonded to each of opposite terminals or a linking group formed of a combination of one or two or more of groups selected from the group consisting of —OC(=O)—, —C(=O)O—, —O—, and a linear alkylene group having 1 to 10 carbon atoms, and more preferably a linear alkylene group having 1 to 10 carbon atoms in which —O— is bonded to each of opposite terminals.

$Q^1$ and $Q^2$ each independently represent a hydrogen atom or a polymerizable group selected from the group consisting of groups represented by Formulas (Q-1) to (Q-5). Here, any one of $Q^1$ or $Q^2$ represents a polymerizable group.

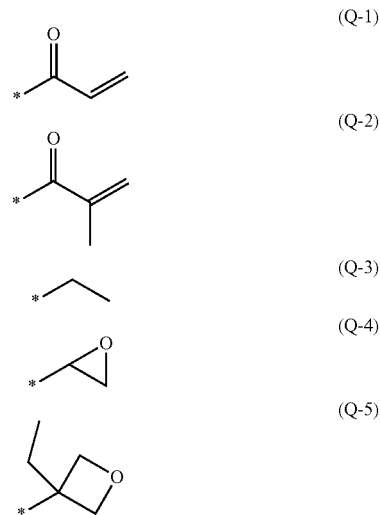

As the polymerizable group, an acryloyl group (Formula (Q-1)) or a methacryloyl group (Formula (Q-2)) is preferable.

Specific examples of the liquid crystal compound include a liquid crystal compound represented by Formula (I-11), a liquid crystal compound represented by Formula (I-21), and a liquid crystal compound represented by Formula (I-31). In addition, for example, a well-known compound such as a compound represented by Formula (I) in JP2013-112631A, a compound represented by Formula (I) in JP2010-070543A, a compound represented by Formula (I) in JP2008-291218A, a compound represented by Formula (I) in JP4725516B, a compound represented by General Formula (II) in JP2013-087109A, a compound described in paragraph "0043" of JP2007-176927A, a compound represented by Formula (1-1) in JP2009-286885A, a compound represented by General Formula (I) of WO2014/10325A, a compound represented by Formula (1) in JP2016-081035A, or compounds represented by Formula (2-1) and Formula (2-2) in JP2016-121339A can be used.

Liquid Crystal Compound represented by Formula (I-11)

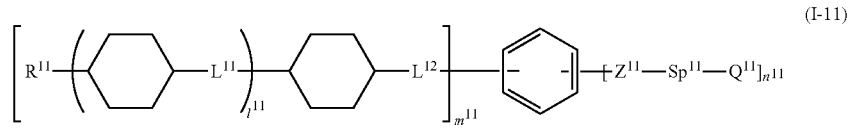

In the formula, $R^{11}$ represents a hydrogen atom, a linear or branched alkyl group having 1 to 12 carbon atoms, or —$Z^{12}$-$Sp^{12}$-$Q^{12}$.

$L^{11}$ represents a single bond, —C(=O)O—, or —O(C=O)—.

$L^{12}$ represents —C(=O)O—, —OC(=O)—, or —CON$R^2$—.

$R^2$ represents a hydrogen atom or an alkyl group having 1 to 3 carbon atoms.

$Z^{11}$ and $Z^{12}$ each independently represent a single bond, —O—, —NH—, —N(CH$_3$)—, —S—, —C(=O)O—, —OC(=O)—, —OC(=O)O—, or —C(=O)NR$^{12}$—.

$R^{12}$ represents a hydrogen atom or Sp$^{12}$-Q$^{12}$.

in which m$^{11}$ represents 2, l$^{11}$ represents 0, and both of two R$^{11}$'s represent —Z$^{12}$-Sp$^{12}$-Q$^{12}$ where Q$^{12}$ represents a polymerizable group selected from the group consisting of groups represented by Formulas (Q-1) to (Q-5).

Liquid Crystal Compound represented by Formula (I-21)

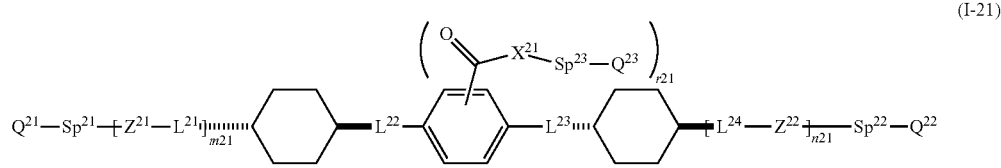

(I-21)

Sp$^{11}$ and Sp$^{12}$ each independently represent a single bond, a linear or branched alkylene group having 1 to 12 carbon atoms which may be substituted with Q$^{11}$, or a linking group where one or more —CH$_2$-'s in the linear or branched alkylene group having 1 to 12 carbon atoms which may be substituted with Q$^{11}$ are substituted with —O—, —S—, —NH—, —N(Q$^{11}$)—, or —C(=O)—.

Q$^{11}$ represent a hydrogen atom, a cycloalkyl group, a group in which one or two or more —CH$_2$-'s in the cycloalkyl group are substituted with —O—, —S—, —NH—, —N(CH$_3$)—, —C(=O)—, —OC(=O)—, or C(=O)O—, or a polymerizable group selected from the group consisting of groups represented by Formulas (Q-1) to (Q-5).

Q$^{12}$ represents a hydrogen atom or a polymerizable group selected from the group consisting of groups represented by Formulas (Q-1) to (Q-5).

l$^{11}$ represents an integer of 0 to 2.

m$^{11}$ represents an integer of 1 or 2.

n$^{11}$ represents an integer of 1 to 3.

A plurality of R$^{11}$'s, a plurality of L$^{11}$'s, a plurality of L$^{12}$'s, a plurality of l$^{11}$'s, a plurality of Z$^{11}$'s, a plurality of Sp$^{11}$'s, and a plurality of Q$^{11}$'s, may be the same as or different from each other, respectively.

In addition, the liquid crystal compound represented by Formula (I-11) includes, as R$^{11}$, at least one —Z$^{12}$-Sp$^{12}$-Q$^{12}$, where Q$^{12}$ represents a polymerizable group selected from the group consisting of groups represented by Formulas (Q-1) to (Q-5).

In addition, it is preferable that the liquid crystal compound represented by Formula (I-11) is —Z$^{11}$-Sp$^{11}$-Q$^{11}$, where Z$^{11}$ represents —C(=O)O— or C(=O)NR$^{12}$— and Q"represents a polymerizable group selected from the group consisting of groups represented by Formulas (Q-1) to (Q-5). In addition, it is preferable that the liquid crystal compound represented by Formula (I-11) includes, as R$^{11}$, —Z$^{12}$-Sp$^{12}$-Q$^{12}$, where Z$^{12}$ represents —C(=O)O— or C(=O)NR$^{12}$—and Q$^{12}$ represents a polymerizable group selected from the group consisting of groups represented by Formulas (Q-1) to (Q-5).

All of 1,4-cyclohexylene groups in the liquid crystal compound represented by Formula (I-11) are trans-1,4-cyclohexylene groups.

A preferable aspect of the liquid crystal compound represented by Formula (I-11) is, for example, a compound in which L$^{11}$ represents a single bond, l$^{11}$ represents 1 (dicyclohexyl group), and Q$^{11}$ represents a polymerizable group selected from the group consisting of groups represented by Formulas (Q-1) to (Q-5).

Another preferable aspect of the liquid crystal compound represented by Formula (I-11) is, for example, a compound In the formula, Z$^{21}$ and Z$^{22}$ each independently represent a trans-1,4-cyclohexylene group which may have a substituent or a phenylene group which may have a substituent.

All of the substituents each independently are one to four substituents selected from the group consisting of —CO—X$^{21}$-Sp$^{23}$-Q$^{23}$, an alkyl group, and an alkoxy group.

m21 represents an integer of 1 or 2, and n21 represents an integer of 0 or 1.

In a case where m21 represents 2, n21 represents 0.

In a case where m21 represents 2, two Z$^{21}$'s may be the same as or different from each other.

At least one of Z$^{21}$ or Z$^{22}$ represents a phenylene group which may have a substituent.

L$^{21}$, L$^{22}$, L$^{23}$, and L$^{24}$ each independently represent a single bond or a linking group selected from the group consisting of —CH$_2$O—, —OCH$_2$—, —(CH$_2$)$_2$OC(=O)—, —C(=O)O(CH$_2$)$_2$—, —C(=O)O—, —OC(=O)—, —OC(=O)O—, —CH=CH—C(=O)O—, and OC(=O)—CH=CH—.

X$^{21}$ represents —O—, —S—, or —N(Sp$^{25}$-Q$^{25}$)- or represents a nitrogen atom that forms a ring structure with Q$^{23}$ and Sp$^{23}$.

r$^{21}$ represents an integer of 1 to 4.

sp$^{21}$, sp$^{22}$, Sp$^{23}$, and Sp$^{25}$ each independently represent a single bond or a linking group selected from the group consisting of a linear or branched alkylene group having 1 to 20 carbon atoms and a group in which one or two or more —CH$_2$-'s in the linear or branched alkylene group having 1 to 20 carbon atoms are substituted with —O—, —S—, —NH—, —N(CH$_3$)—, —C(=O)—, —OC(=O)—, or C(=O)O—.

Q$^{21}$ and Q$^{22}$ each independently represent a polymerizable group selected from the group consisting of groups represented by Formulas (Q-1) to (Q-5).

Q$^{23}$ represent a hydrogen atom, a cycloalkyl group, a group in which one or two or more —CH$_2$-'s in the cycloalkyl group are substituted with —O—, —S—, —NH—, —N(CH$_3$)—, —C(=O)—, —OC(=O)—, or C(=O)O—, a polymerizable group selected from the group consisting of groups represented by Formulas (Q-1) to (Q-5), or in a case where X$^{21}$ represents a nitrogen atom that forms a ring structure with Q$^{23}$ and Sp$^{23}$, Q$^{23}$ represents a single bond.

Q$^{25}$ represent a hydrogen atom, a cycloalkyl group, a group in which one or two or more —CH$_2$-'s in the cycloalkyl group are substituted with —O—, —S—, —NH—, —N(CH$_3$)—, —C(=O)—, —OC(=O)—, or C(=O)O—, or a polymerizable group selected from the group consisting of groups represented by Formulas (Q-1) to (Q-5), and in a case where Sp$^{25}$ represents a single bond, Q$^{25}$ does not represent a hydrogen atom.

It is also preferable that the liquid crystal compound represented by Formula (I-21) has a structure where a 1,4-phenylene group and a trans-1,4-cyclohexylene group are alternately present. For example, it is preferable that the liquid crystal compound represented by Formula (I-21) has a structure where m21 represents 2, n21 represents 0, and $Z^{21}$'s represent a trans-1,4-cyclohexylene group which may have a substituent and an arylene group which may have a substituent from $Q^{21}$ side, respectively or has a structure where m21 represents 1, n21 represents 1, $Z^{21}$ represents an arylene group which may have a substituent, and $Z^{22}$ represents an arylene group which may have a substituent.

Liquid Crystal Compound represented by Formula (I-31)

from the group consisting of groups represented by Formulas (Q-1) to (Q-5), in a case where $Q^{33}$ forms a ring structure with $X^{31}$ and $Sp^{33}$, $Q^{33}$ represents a single bond, and in a case where $Sp^{34}$ represents a single bond, $Q^{34}$ does not represent a hydrogen atom.

Preferable examples of the liquid crystal compound represented by Formula (I-31) include a compound where $Z^{32}$ represents a phenylene group and a compound where m32 represents 0.

It is also preferable that the compound represented by Formula (I) has a partial structure represented by Formula (II).

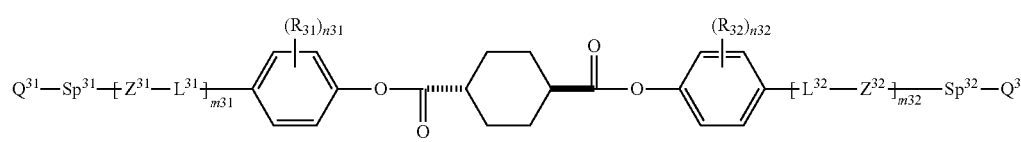

(I-31)

In the formula, $R^{31}$ and $R^{32}$ each independently represent a group selected from the group consisting of an alkyl group, an alkoxy group, and $-C(=O)-X^{31}-Sp^{33}-Q^{33}$.

n31 and n32 each independently represent an integer of 0 to 4.

$X^{31}$ represents a single bond, $-O-$, $-S-$, or $-N(Sp^{34}-Q^{34})-$ or represents a nitrogen atom that forms a ring structure with $Q^{33}$ and $Sp^{33}$.

$Z^{31}$ represents a phenylene group which may have a substituent.

$Z^{32}$ represents a trans-1,4-cyclohexylene group which may have a substituent or a phenylene group which may have a substituent.

All of the substituents each independently are one to four substituents selected from the group consisting of an alkyl group, an alkoxy group, and $-C(=O)-X^{31}-Sp^{33}-Q^{33}$.

m31 represents an integer of 1 or 2, and m32 represents an integer of 0 to 2.

In a case where m31 and m32 represent 2, two $Z^{31}$'s and two $Z^{32}$'s may be the same as or different from each other, respectively.

$L^{31}$ and $L^{32}$ each independently represent a single bond or a linking group selected from the group consisting of $-CH_2O-$, $-OCH_2-$, $-(CH_2)_2OC(=O)-$, $-C(=O)O(CH_2)_2-$, $-C(=O)O-$, $-OC(=O)-$, $-OC(=O)O-$, $-CH=CH-C(=O)O-$, and $OC(=O)-CH=CH-$.

$Sp^{31}$, $Sp^{32}$, $Sp^{33}$, and $Sp^{34}$ each independently represent a single bond or a linking group selected from the group consisting of a linear or branched alkylene group having 1 to 20 carbon atoms and a group in which one or two or more $-CH_2-$'s in the linear or branched alkylene group having 1 to 20 carbon atoms are substituted with $-O-$, $-S-$, $-NH-$, $-N(CH_3)-$, $-C(=O)-$, $-OC(=O)-$, or $C(=O)O-$.

$Q^{31}$ and $Q^{32}$ each independently represent a polymerizable group selected from the group consisting of groups represented by Formulas (Q-1) to (Q-5).

$Q^{33}$ and $Q^{34}$ each independently represent a hydrogen atom, a cycloalkyl group, a group in which one or two or more $-CH_2-$'s in the cycloalkyl group are substituted with $-O-$, $-S-$, $-NH-$, $-N(CH_3)-$, $-C(=O)-$, $-OC(=O)-$, or $C(=O)O-$, or a polymerizable group selected

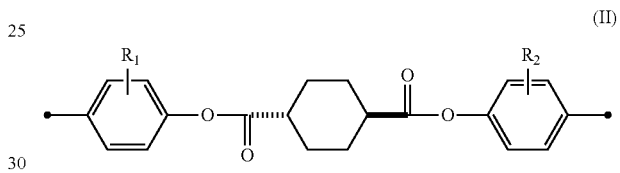

(II)

In Formula (II), a black circle represents a bonding position to another position in Formula (I). The partial structure represented by Formula (II) may be included as a part of a partial structure represented by Formula (III) in Formula (I).

(III)

In the formula, $R^1$ and $R^2$ each independently represent a group selected from the group consisting of a hydrogen atom, an alkyl group, an alkoxy group, and a group represented by $-C(=O)-X^3-Sp^3-Q^3$. Here, $X^3$ represents a single bond, $-O-$, $-S-$, or $-N(Sp^4-Q^4)-$ or represents a nitrogen atom that forms a ring structure with $Q^3$ and $Sp^3$. It is preferable that $X^3$ represents a single bond or $-O-$. It is preferable that $R^1$ and $R^2$ represent $-C(=O)-X^3-Sp^3-Q^3$. In addition, it is preferable that $R^1$ and $R^2$ are the same as each other. The bonding position of each of $R^1$ and $R^2$ to a phenylene group is not particularly limited.

$Sp^3$ and $Sp^4$ each independently represent a single bond or a linking group selected from the group consisting of a linear or branched alkylene group having 1 to 20 carbon atoms and a group in which one or two or more $-CH_2-$'s in the linear or branched alkylene group having 1 to 20 carbon atoms are substituted with $-O-$, $-S-$, $-NH-$, $-N(CH_3)-$, $-C(=O)-$, $-OC(=O)-$, or $C(=O)O-$. $Sp^3$ and $Sp^4$ each independently represent preferably a linear or branched alkylene group having 1 to 10 carbon atoms, more preferably a linear alkylene group having 1 to 5 carbon atoms, and still more preferably a linear alkylene group having 1 to 3 carbon atoms.

$Q^3$ and $Q^4$ each independently represent a hydrogen atom, a cycloalkyl group, a group in which one or two or more —CH$_2$—'s in the cycloalkyl group are substituted with —O—, —S—, —NH—, —N(CH$_3$)—, —C(=O)—, —OC(=O)—, or C(=O)O—, or a polymerizable group selected from the group consisting of groups represented by Formulas (Q-1) to (Q-5).

It is also preferable that the compound represented by Formula (I) has, for example, a structure represented by Formula (II-2).

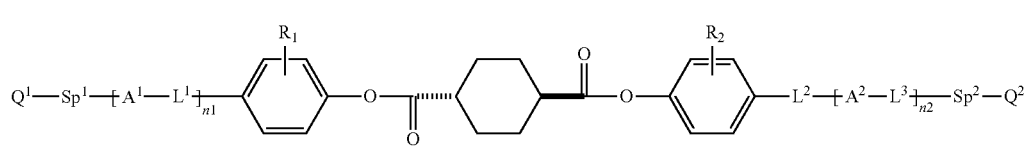

In the formula, A$^1$ and A$^2$ each independently represent a phenylene group which may have a substituent or a trans-1,4-cyclohexylene group which may have a substituent, and all of the substituents each independently are one to four substituents selected from the group consisting of an alkyl group, an alkoxy group, and —C(=O)—X$^3$-Sp$^3$-Q$^3$.

L$^1$, L$^2$, and L$^3$ each independently represent a single bond or a linking group selected from the group consisting of —CH$_2$O—, —OCH$_2$—, —(CH$_2$)$_2$OC(=O)—, —C(=O)O(CH$_2$)$_2$—, —C(=O)O—, —OC(=O)—, —OC(=O)O—, —CH=CH—C(=O)O—, and —OC(=O)—CH=CH—.

n1 and n2 each independently represent an integer of 0 to 9, and n1+n2 represents 9 or less.

The definitions of Q$^1$, Q$^2$, Sp$^1$, and Sp$^2$ are the same as the definitions of the respective groups in Formula (I). The definitions of X$^3$, Sp$^3$, Q$^3$, R$^1$, and R$^2$ are the same as the definitions of the respective groups in Formula (II).

Examples of the liquid crystal compound represented by Formula (I) and where 0.4≤mc≤0.8 is satisfied are as follows.

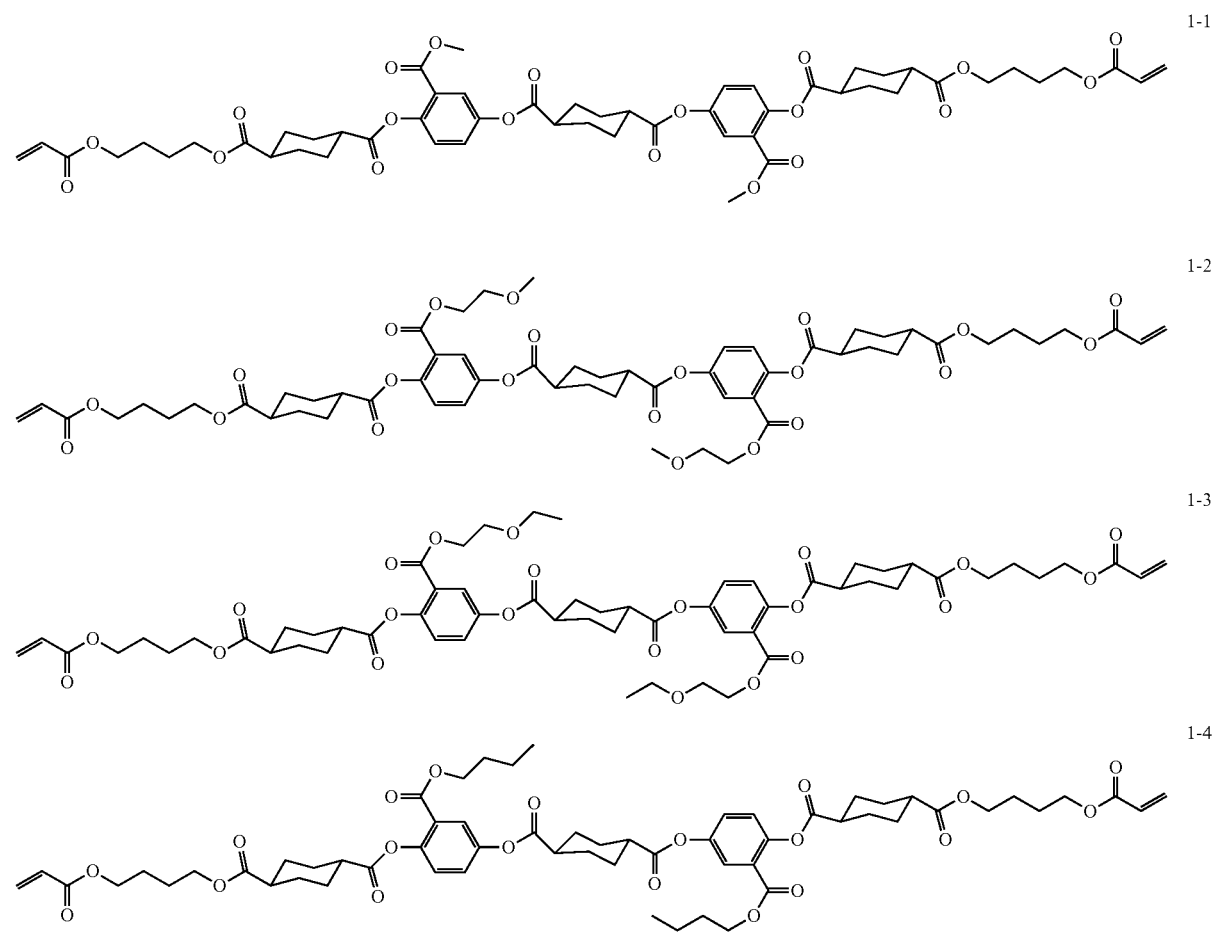

1-5
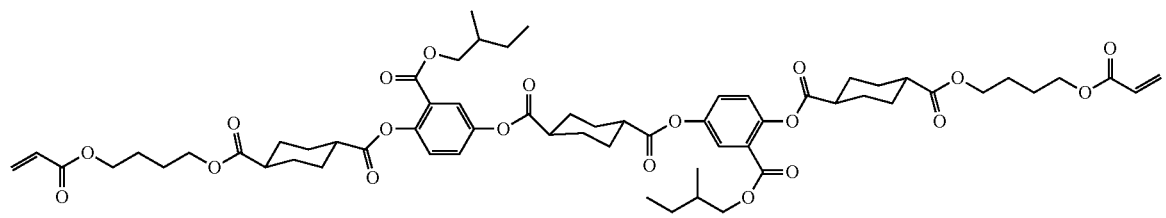
1-6
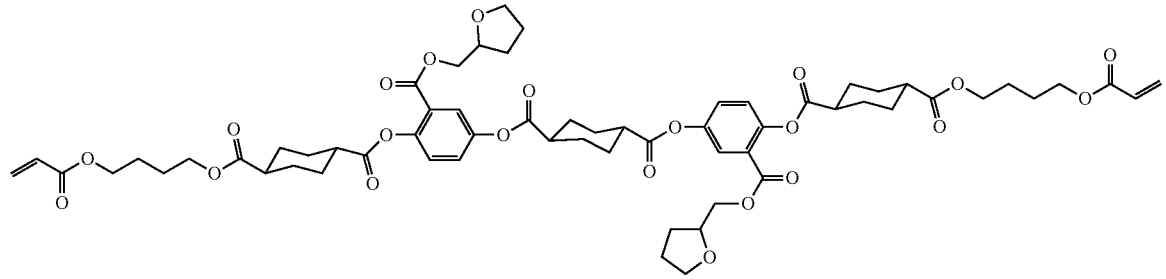
1-7
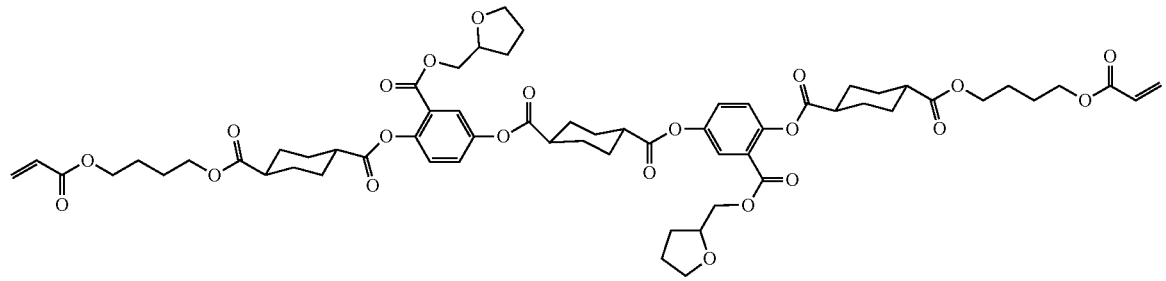
1-8
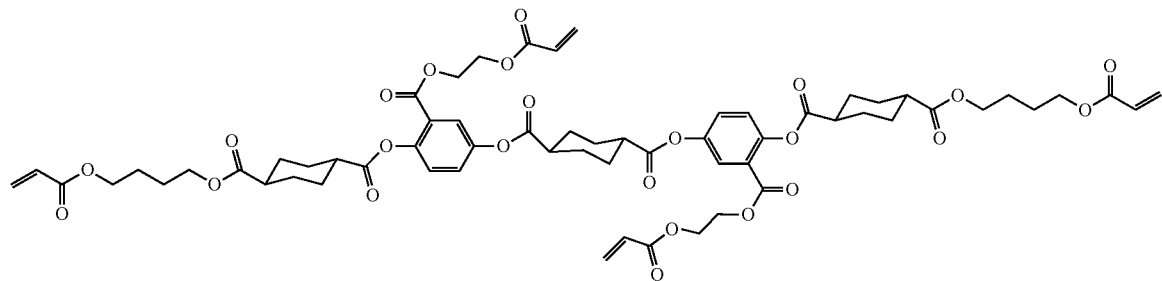
1-9
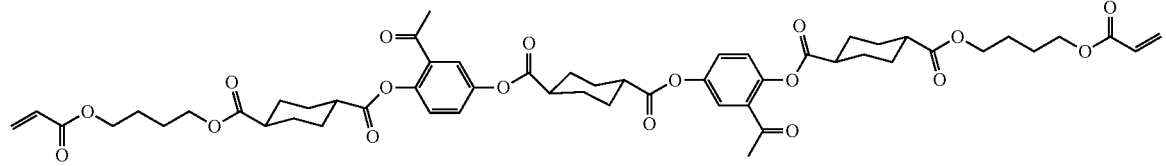
1-10
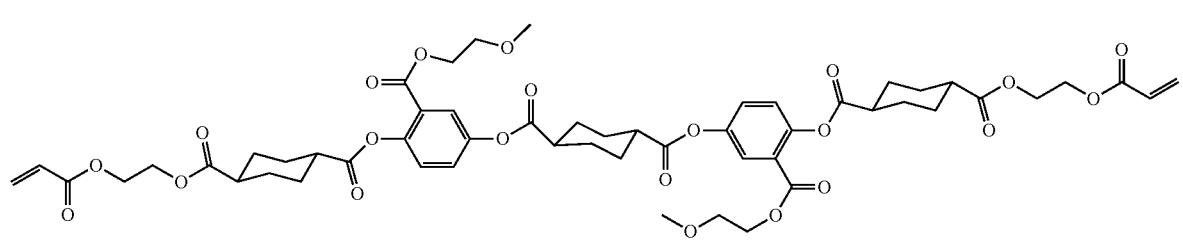

1-11
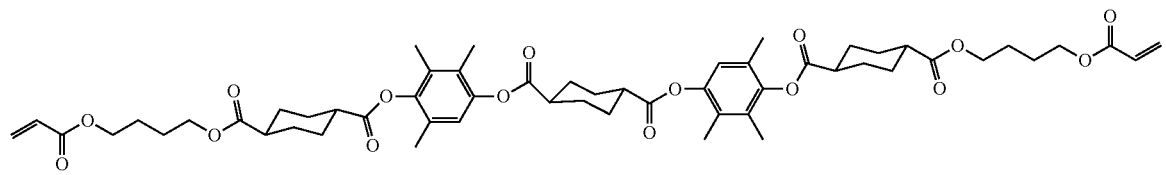
1-12
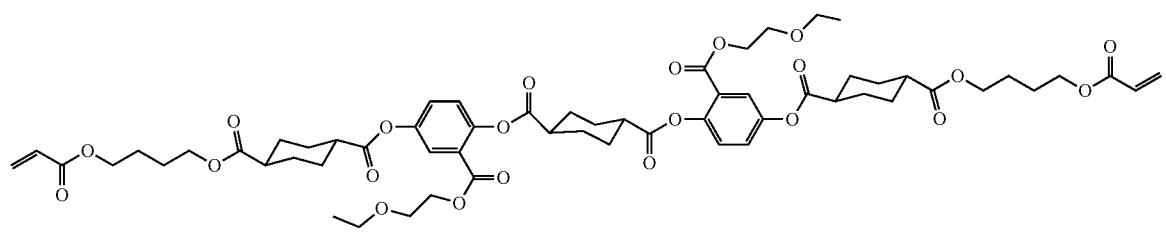
1-13
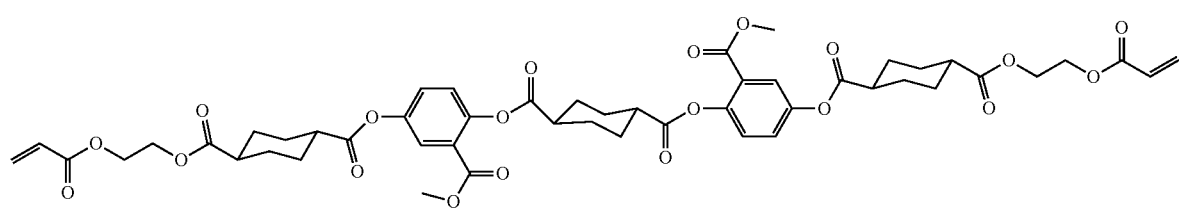
1-14
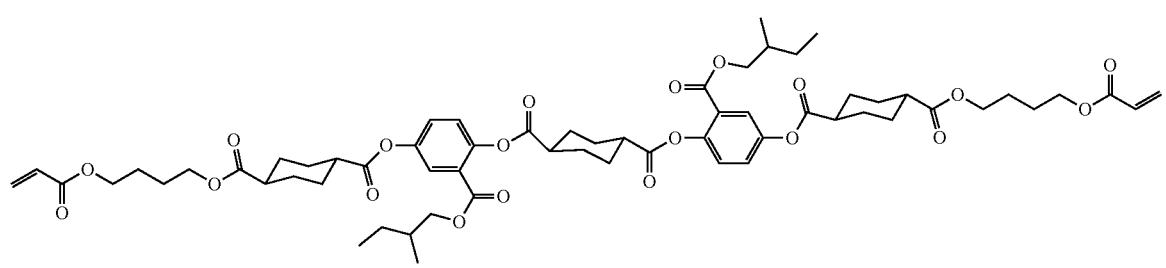
1-15
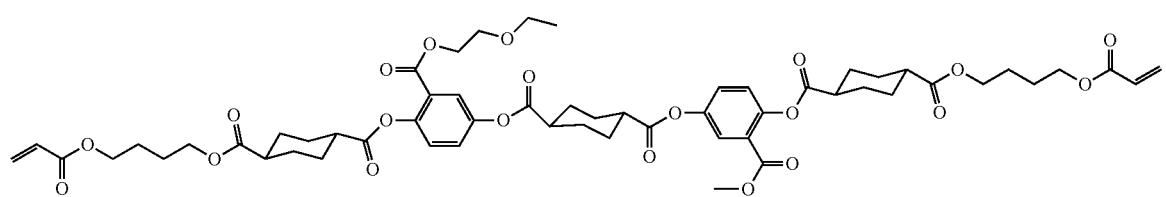
1-16
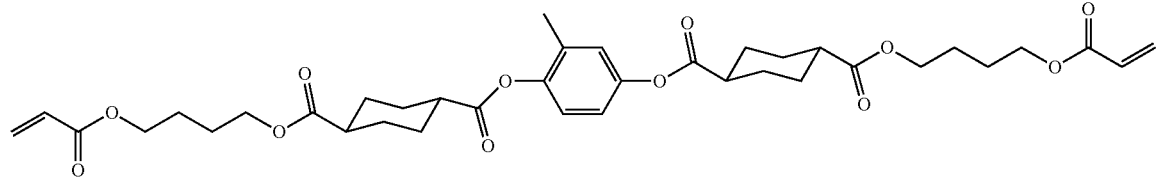
1-17
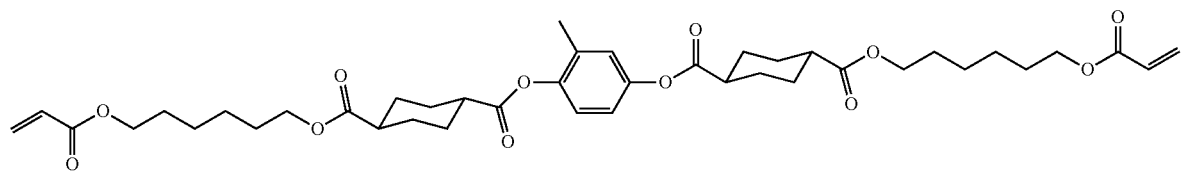

-continued
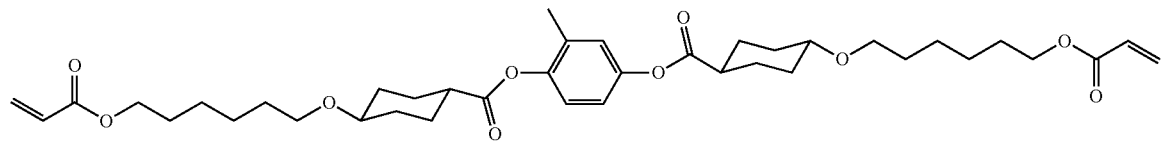
1-18
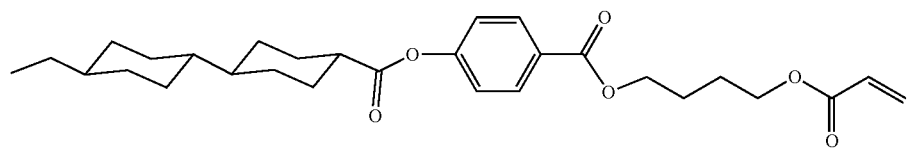
1-19
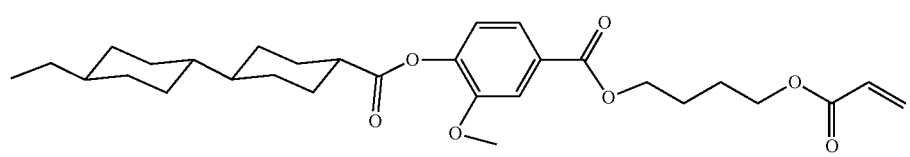
1-20
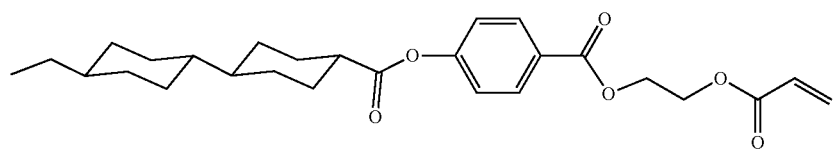
1-21
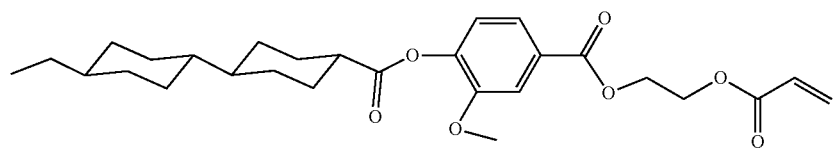
1-22
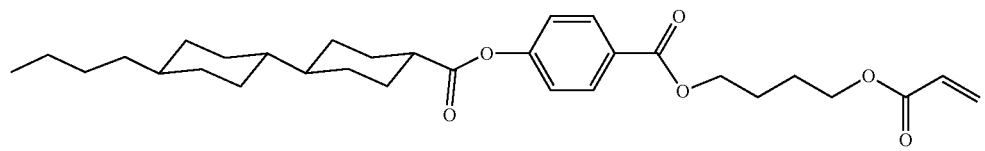
1-23
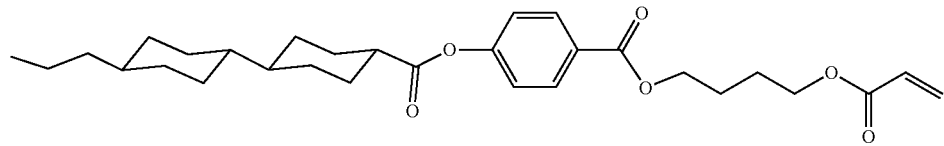
1-24
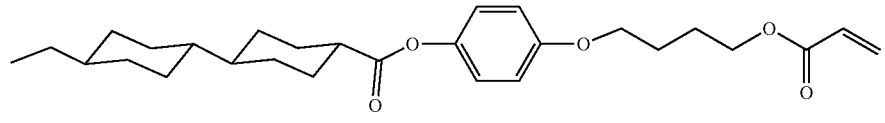
1-25
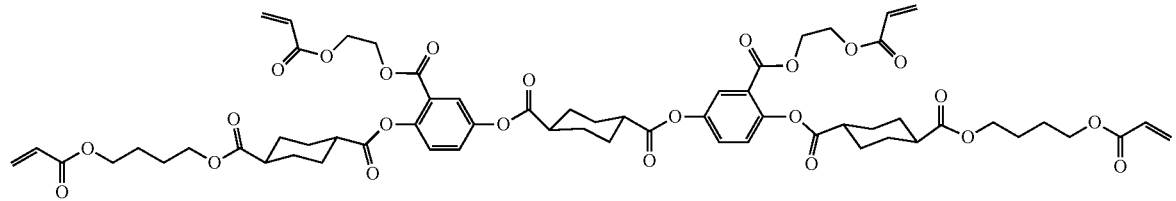
1-26

-continued
1-27
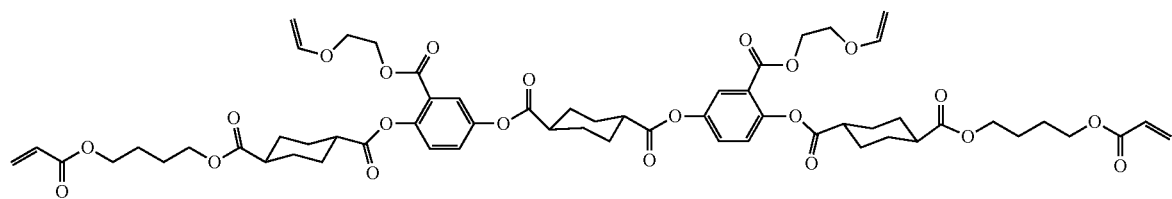
1-28
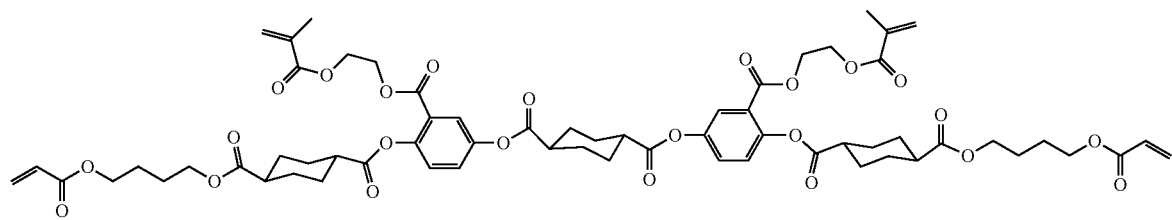
1-29
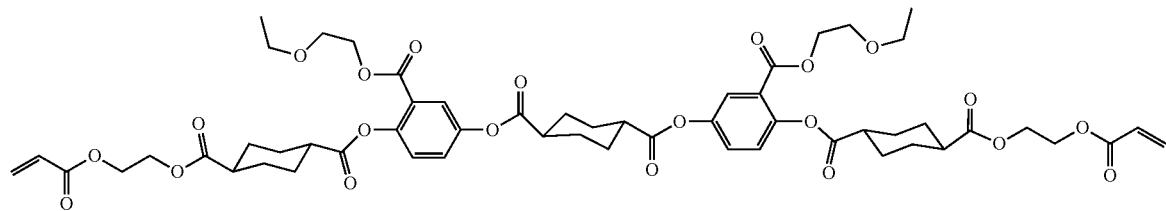
1-30
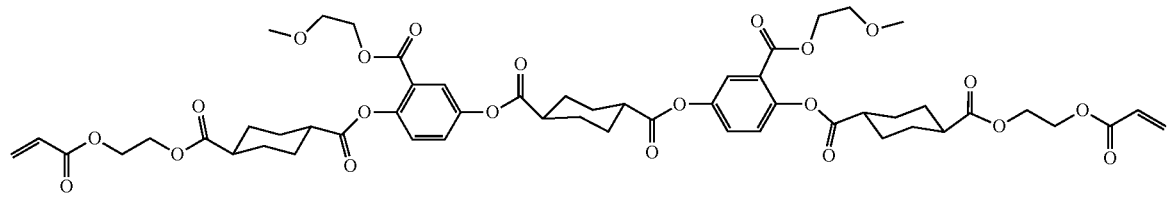
1-31
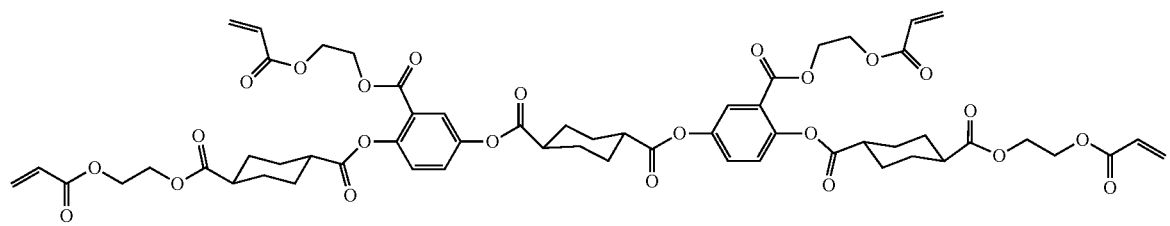
1-32
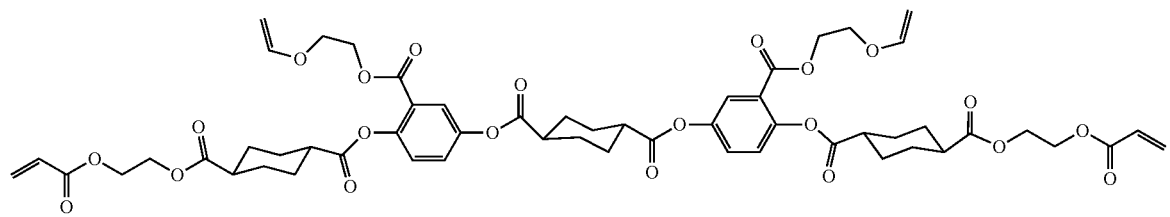

1-33
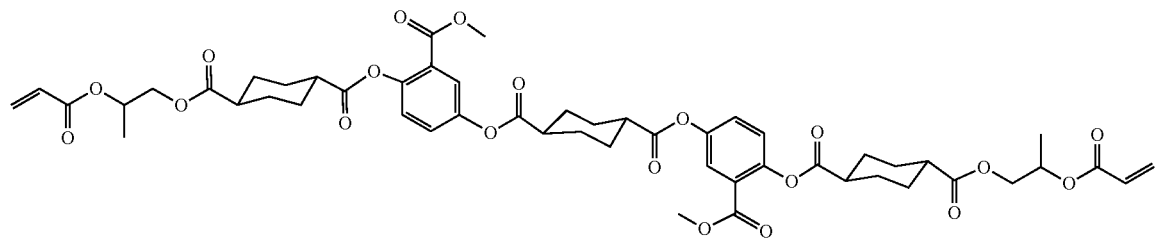
1-34
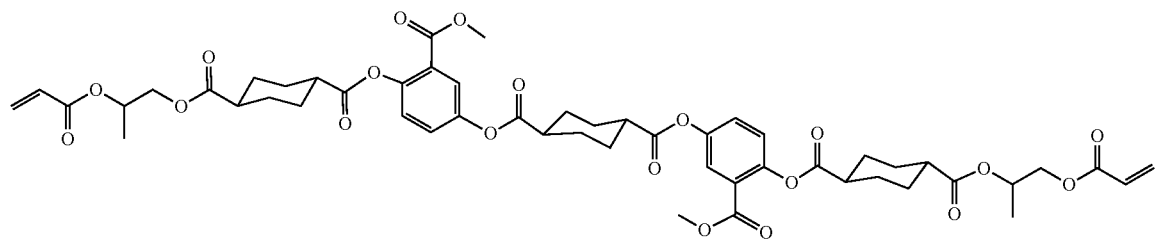
1-35
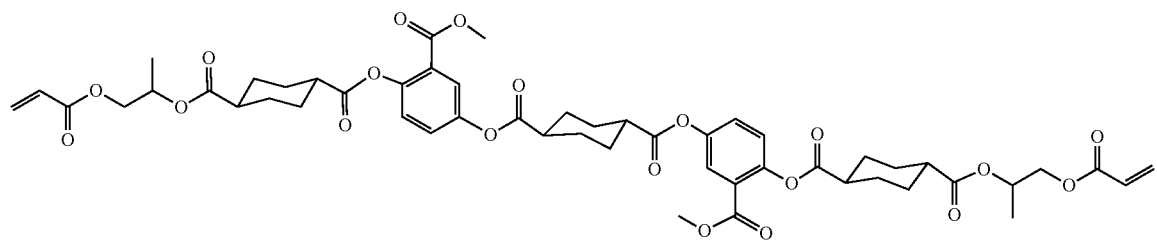
1
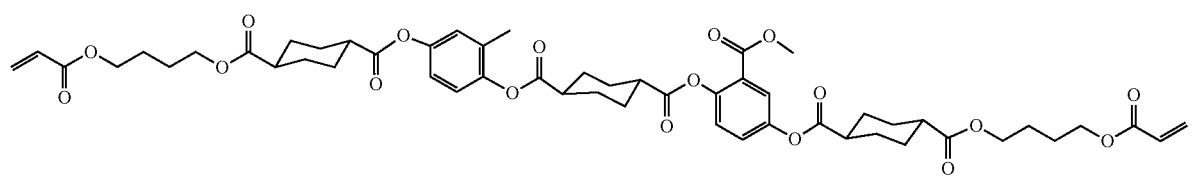
2
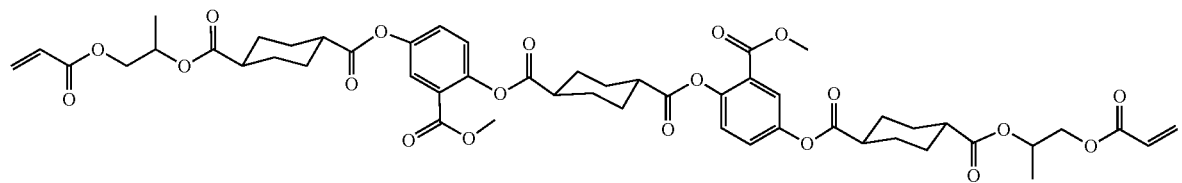
3
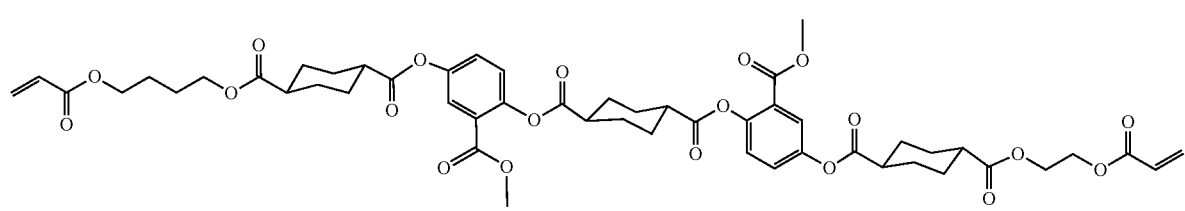
4
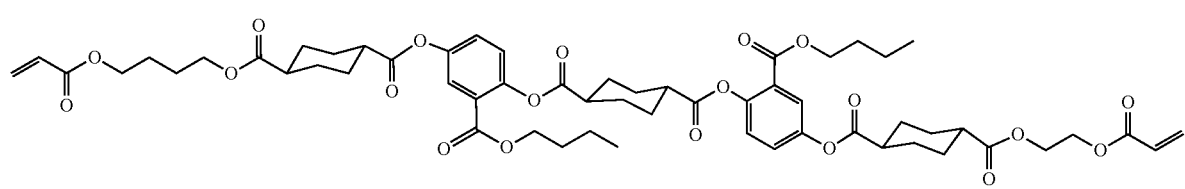

5
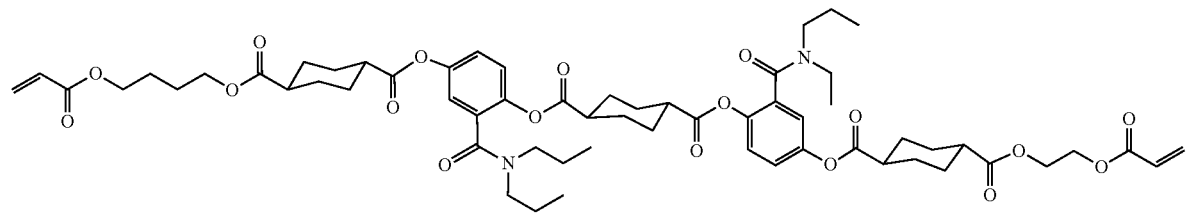
6
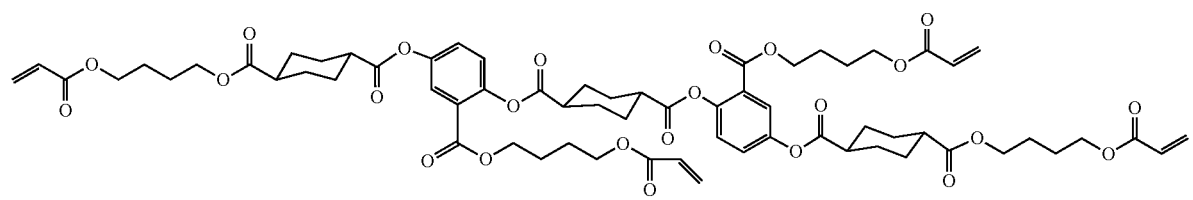
7
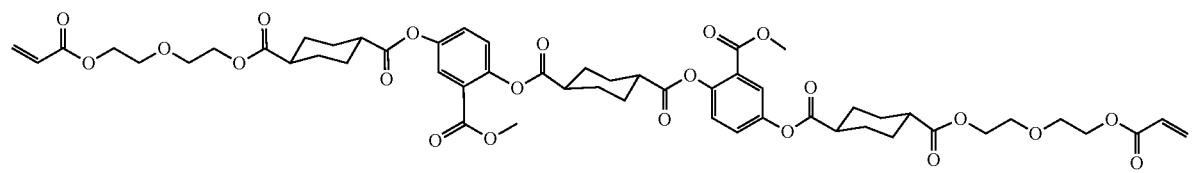
8
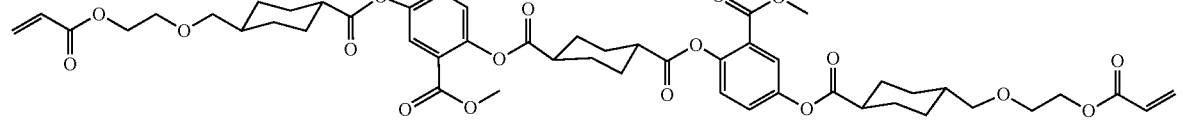
9
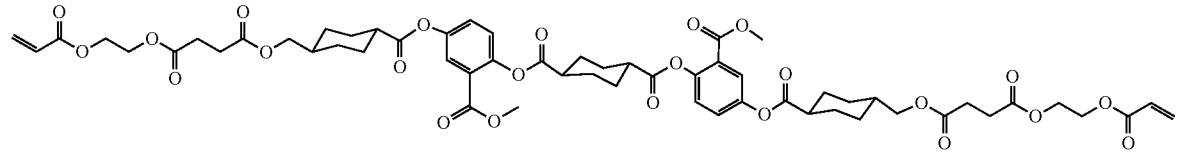
10
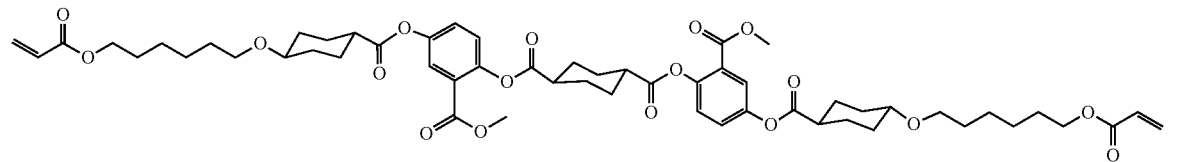
11
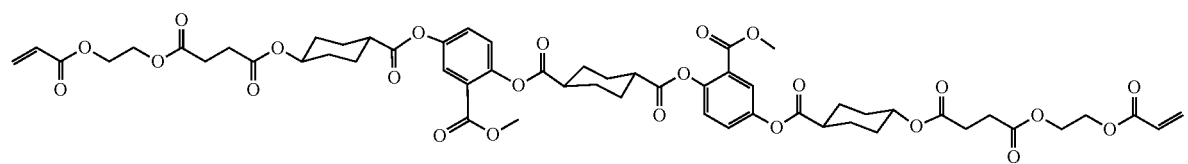
12
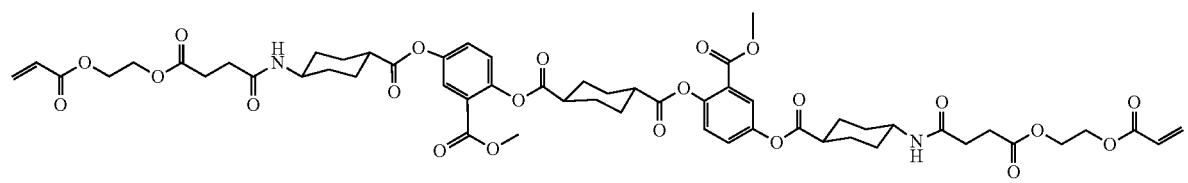

-continued
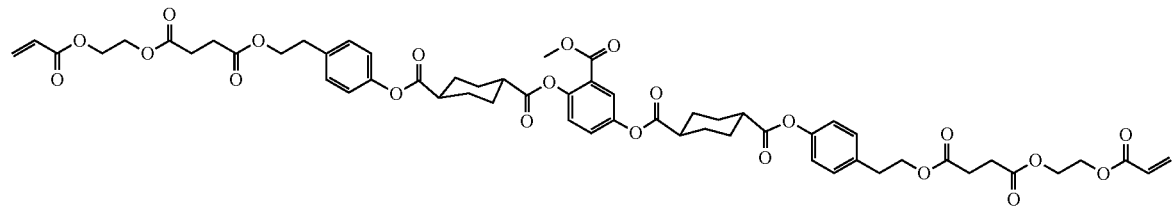
13
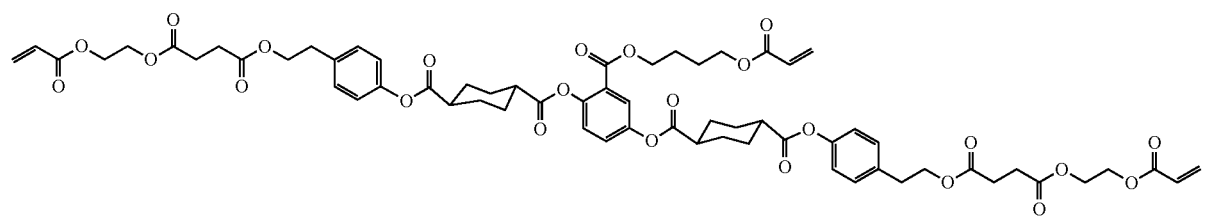
14
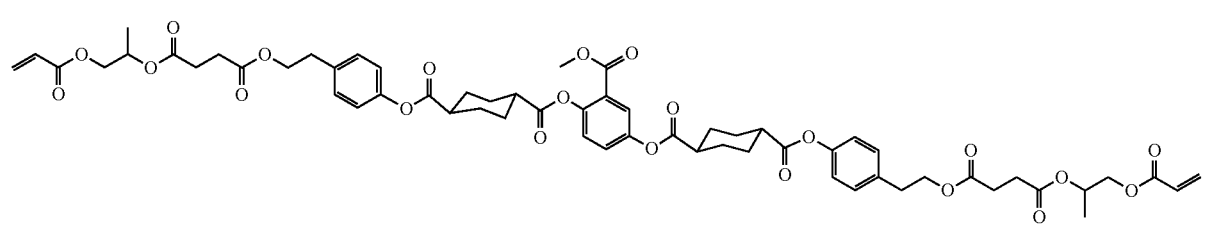
15
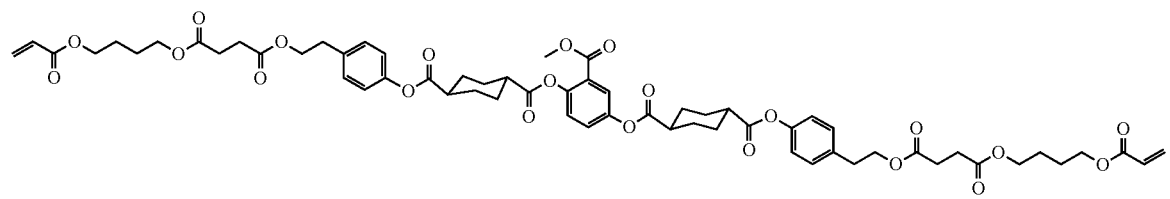
16
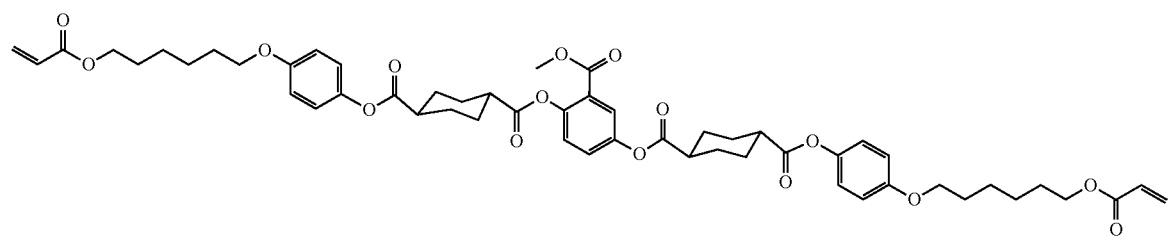
17
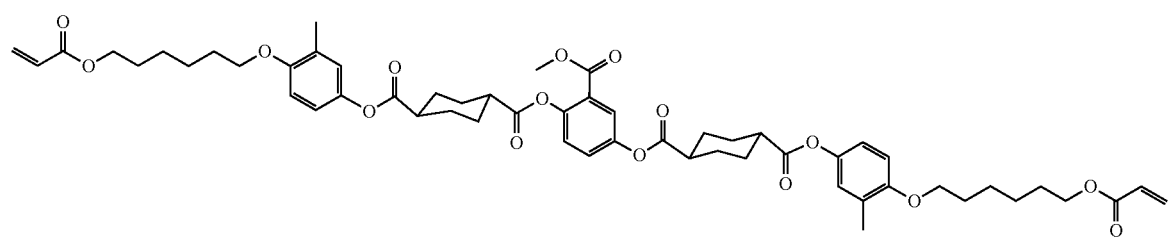
18
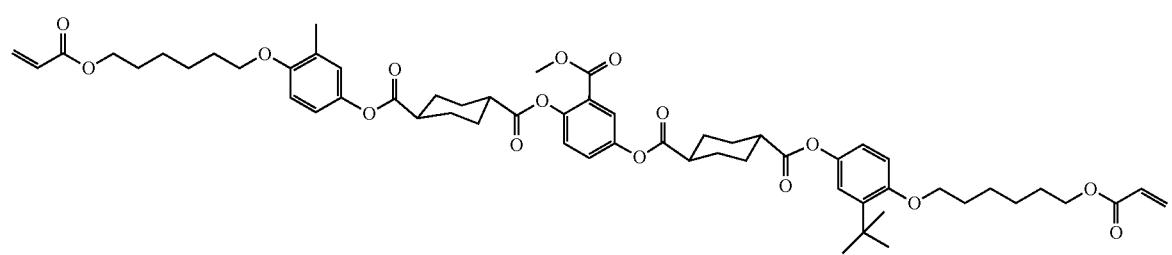
19

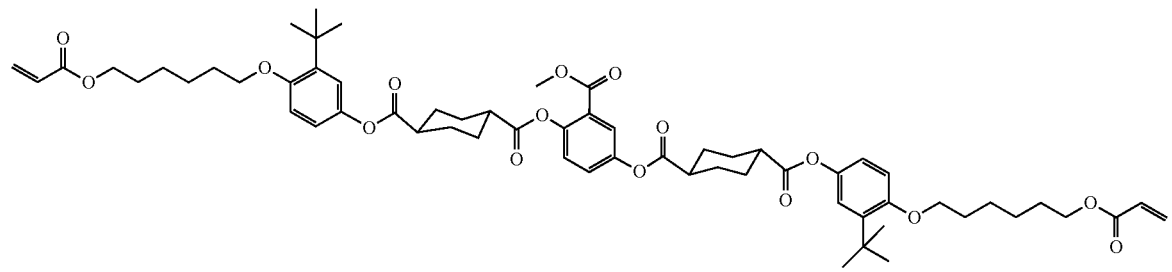
20
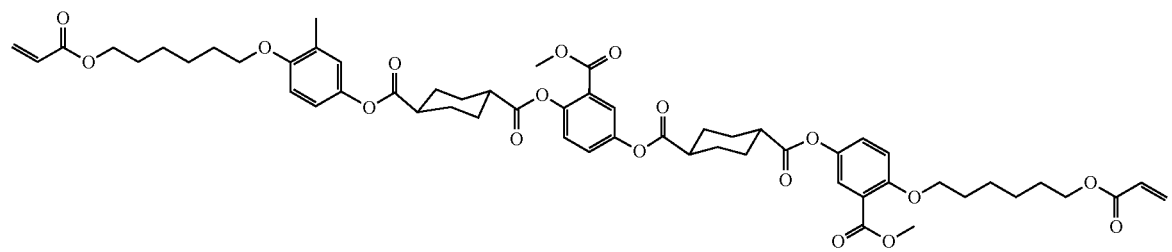
21
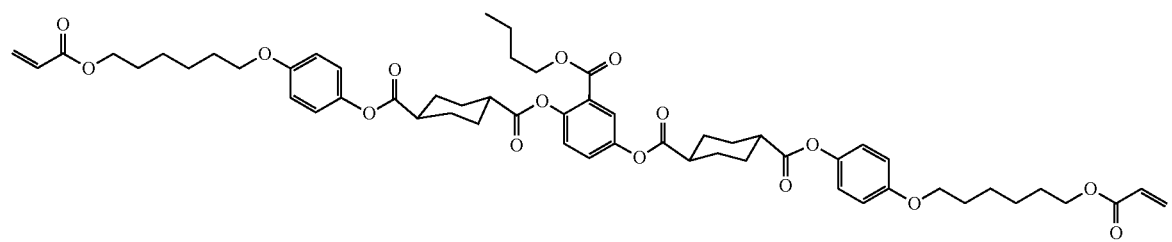
22
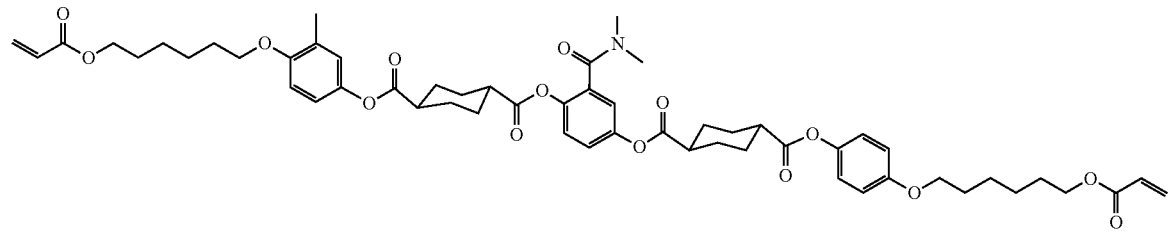
23
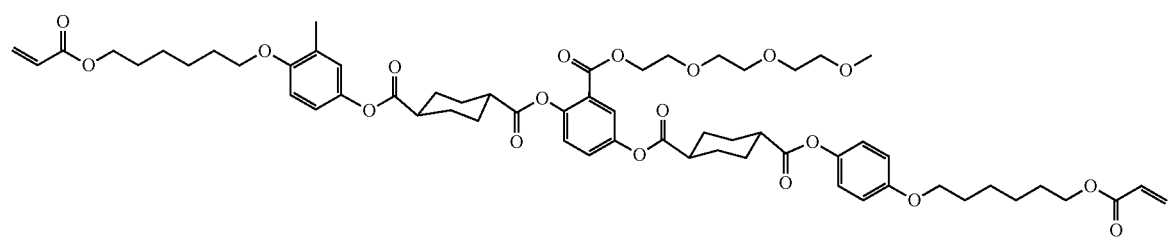
24
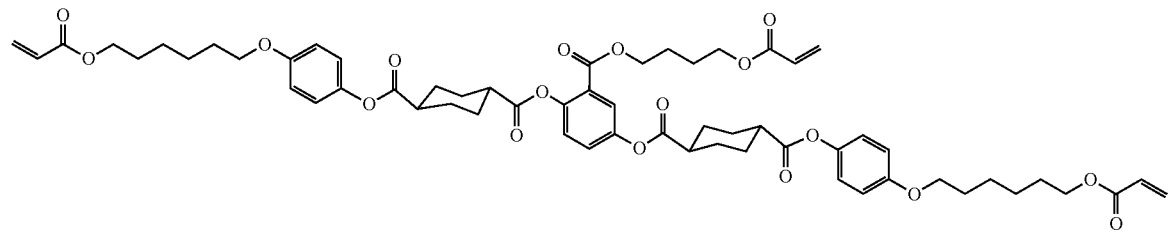
25

26
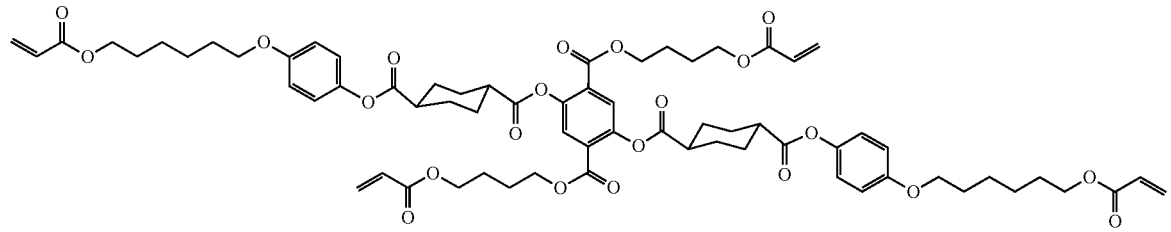
27
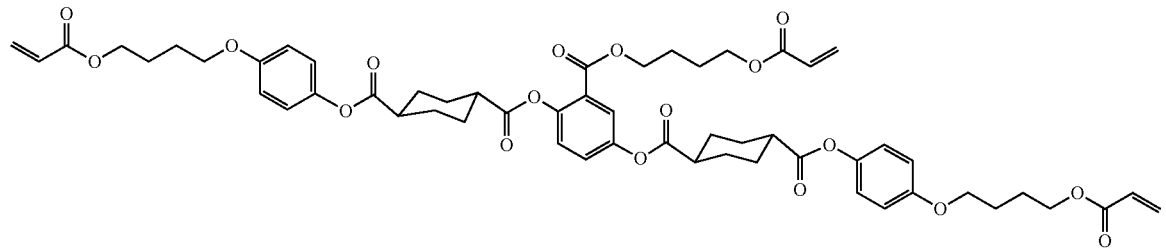
28
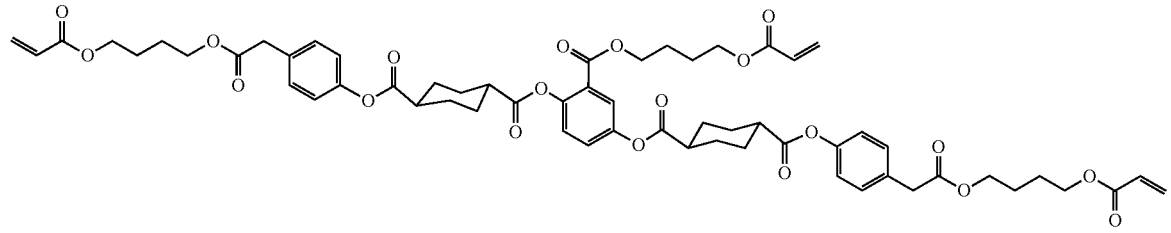
29
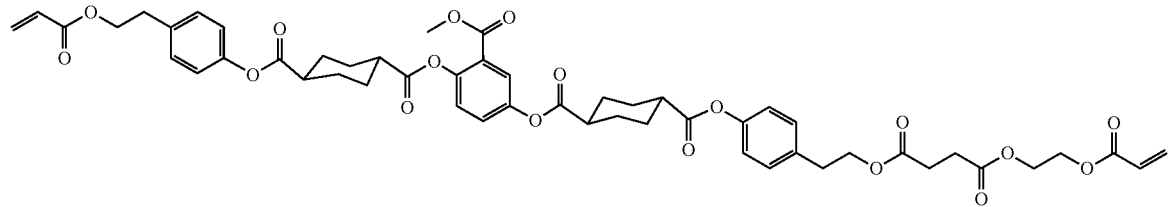
30
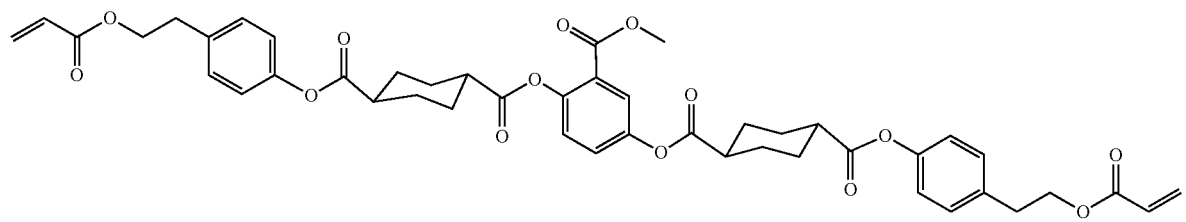
31
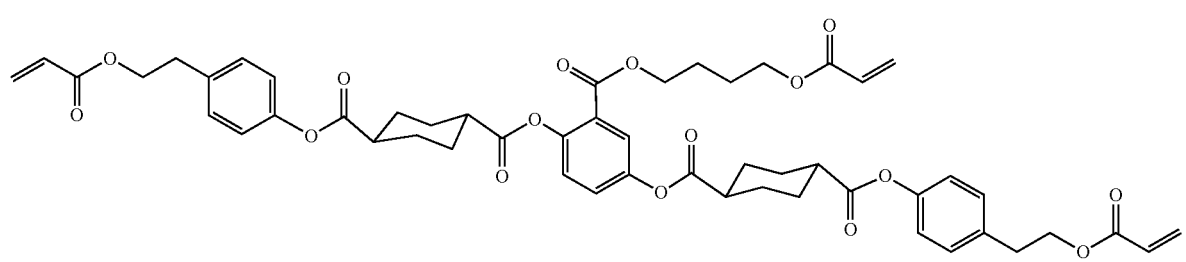

-continued
32
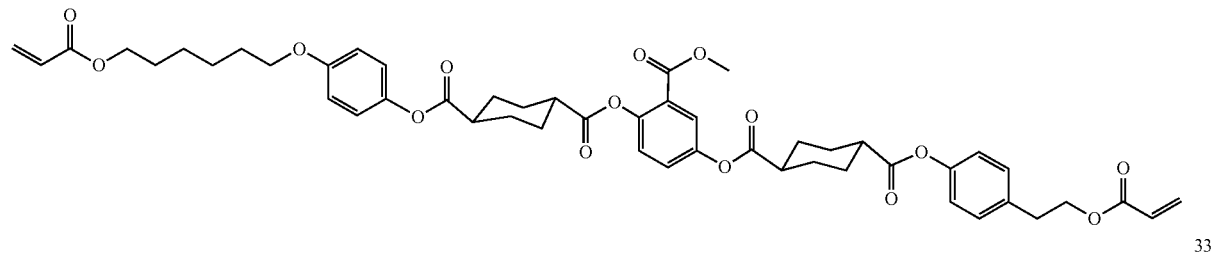
33
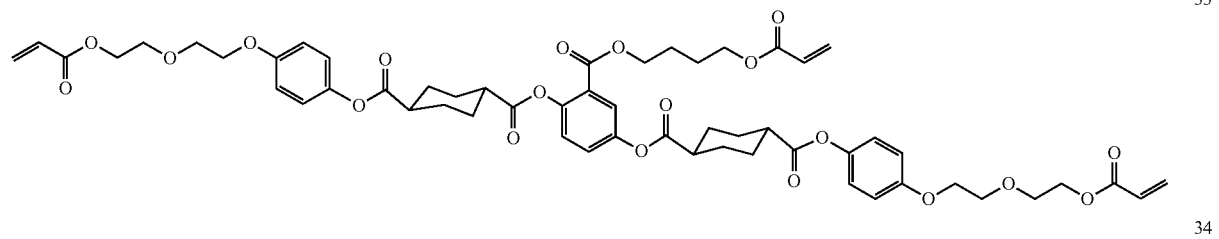
34
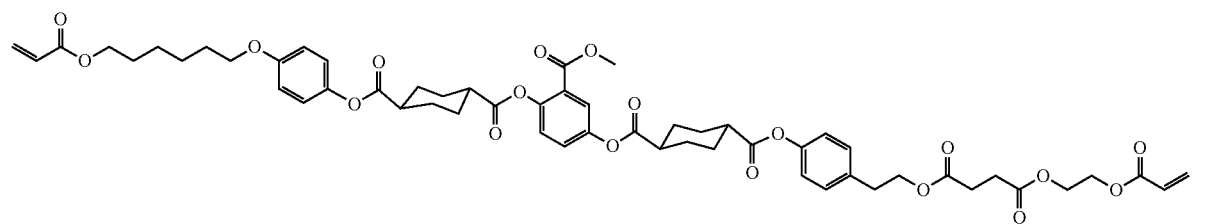
35
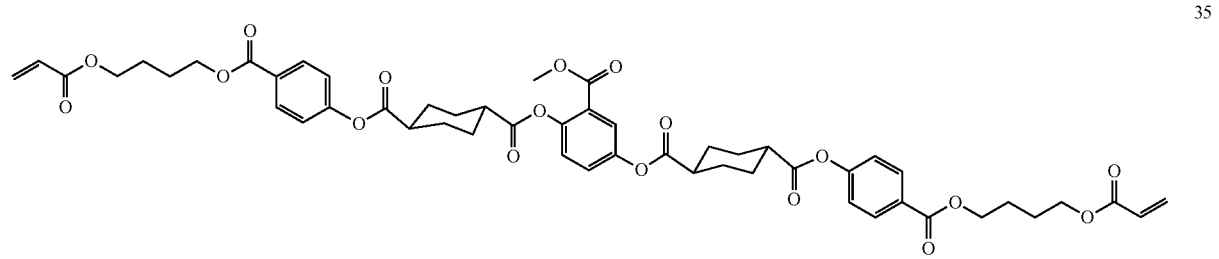
36
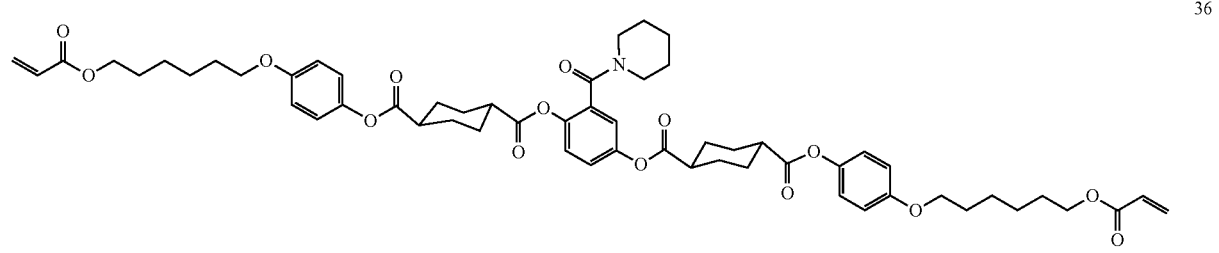
I-1-56
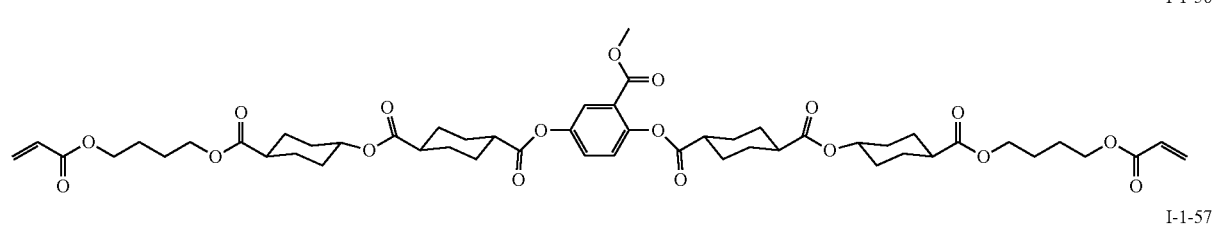
I-1-57
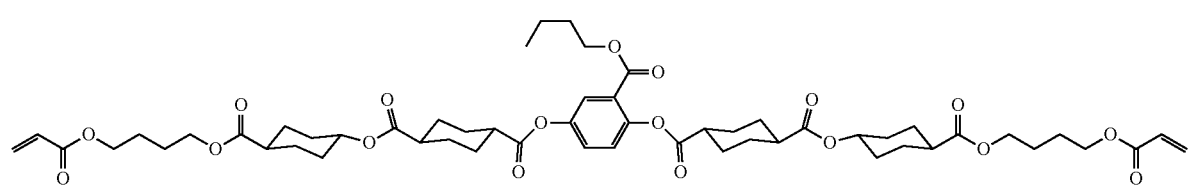

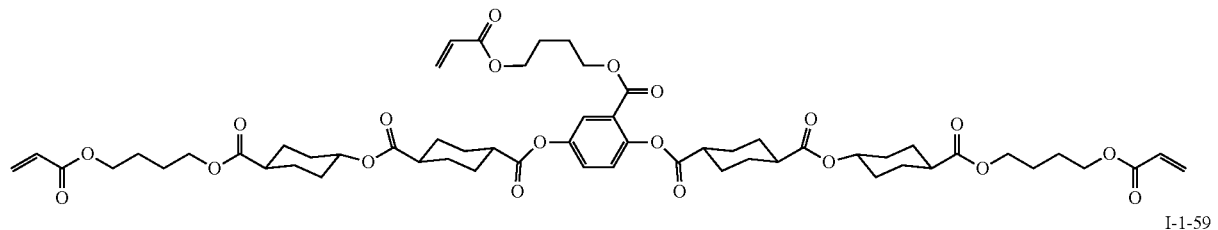

I-1-58

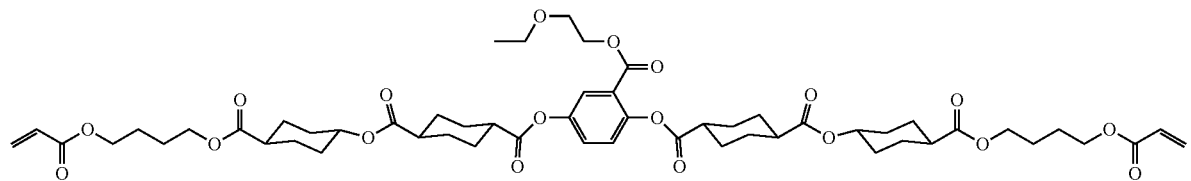

I-1-59

Two or more kinds of liquid crystal compounds may be used in combination. For example, two or more kinds of liquid crystal compounds represented by Formula (I) may also be used in combination.

In particular, it is preferable that the liquid crystal compound represented by Formula (I) and where $0.4 \leq mc \leq 0.8$ is satisfied and the liquid crystal compound represented by Formula (I) and where $0.1 < mc < 0.3$ is satisfied are used in combination.

Examples of the liquid crystal compound represented by Formula (I) and where $0.1 < mc < 0.3$ is satisfied are as follows.

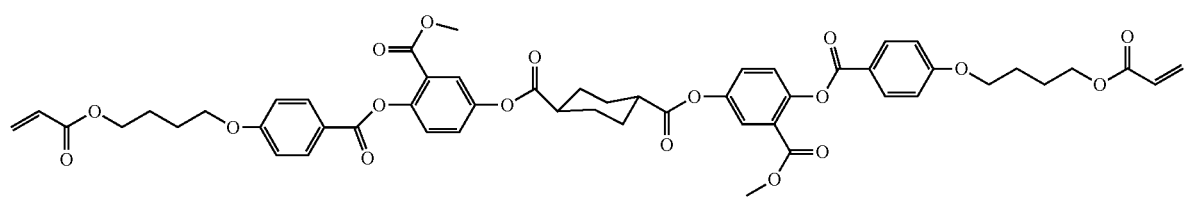

2-1

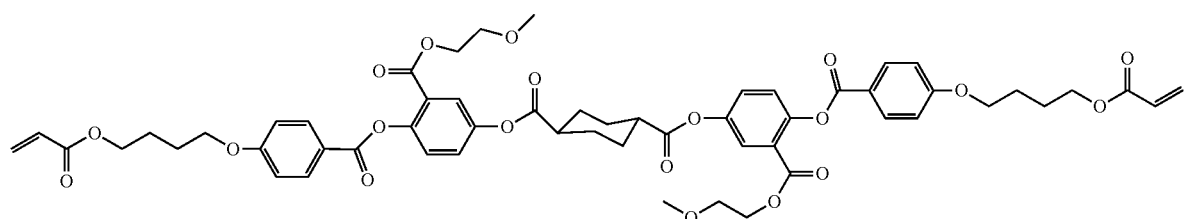

2-2

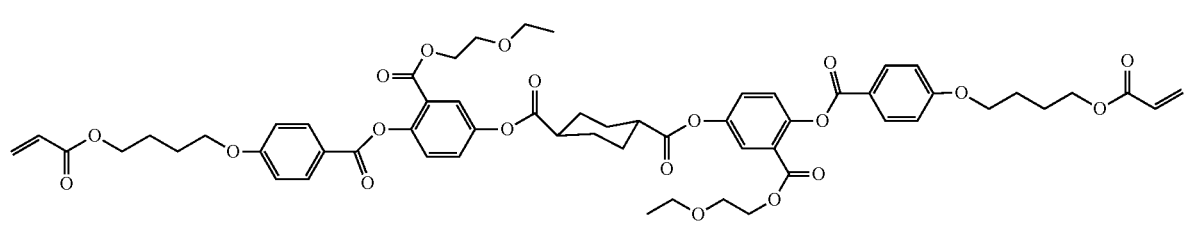

2-3

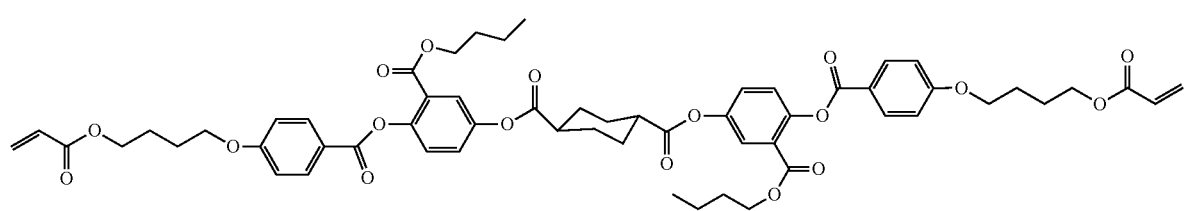

2-4

2-5
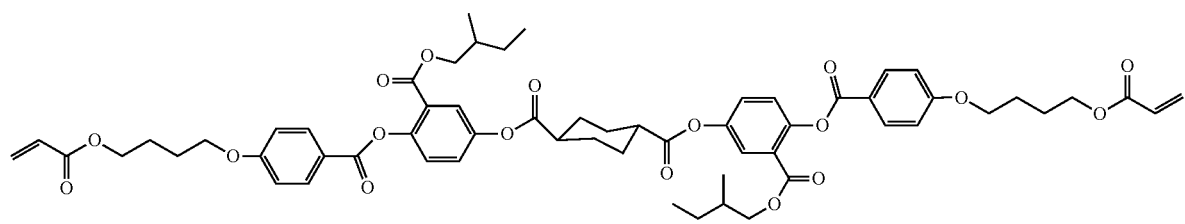
2-6
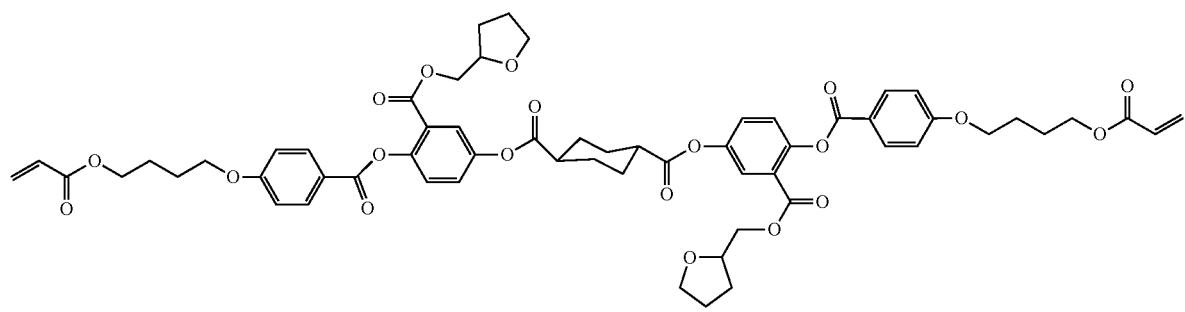
2-7
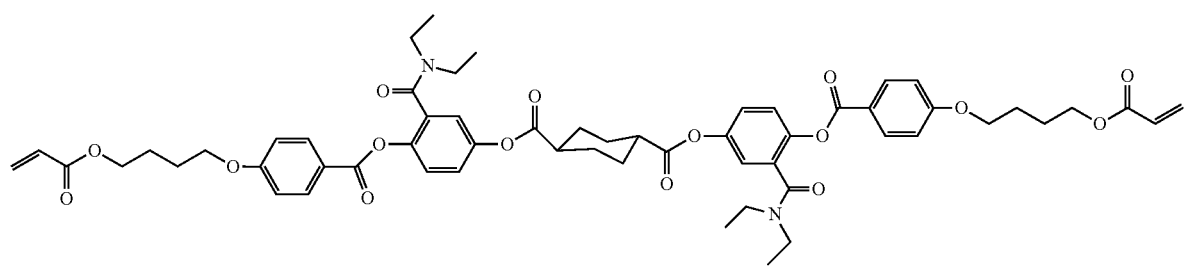
2-8
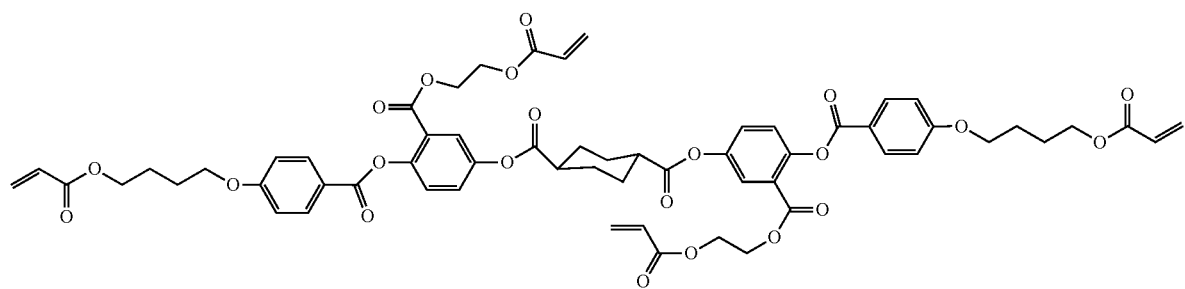
2-9
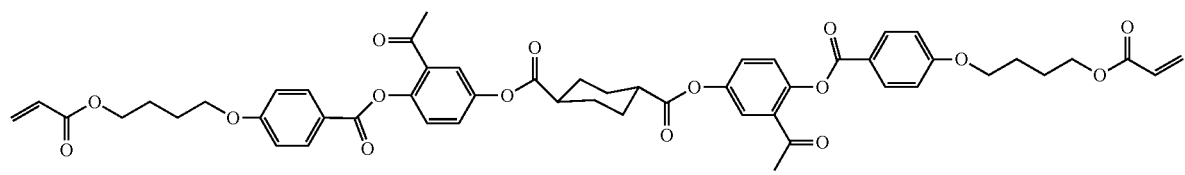
2-10
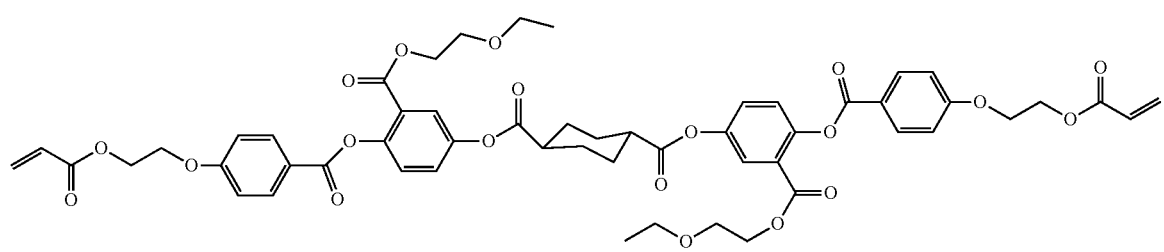

2-11
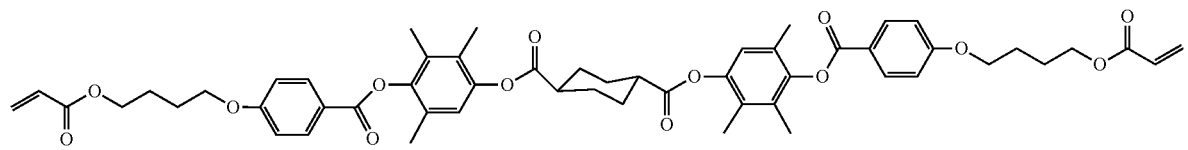
2-12
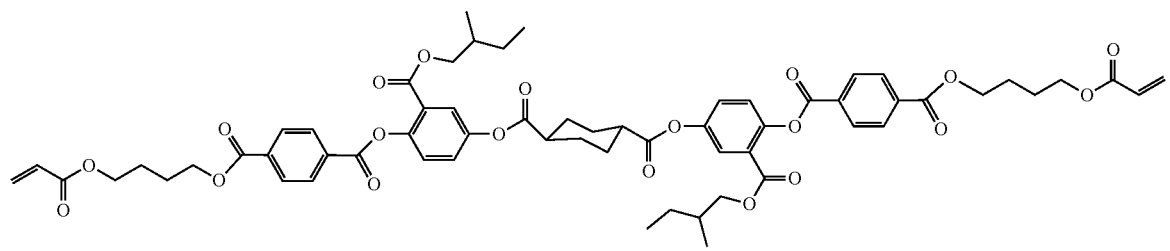
2-13
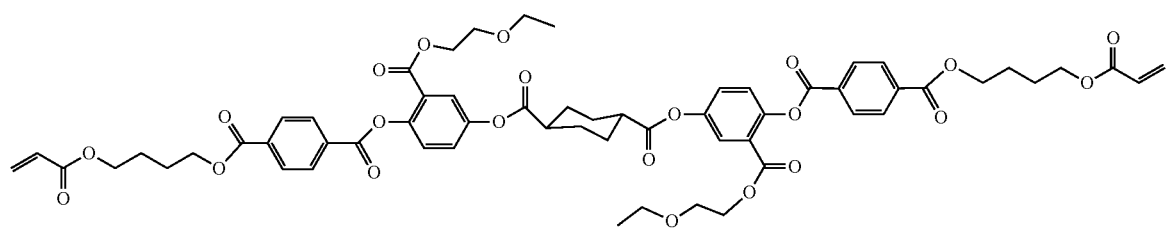
2-14
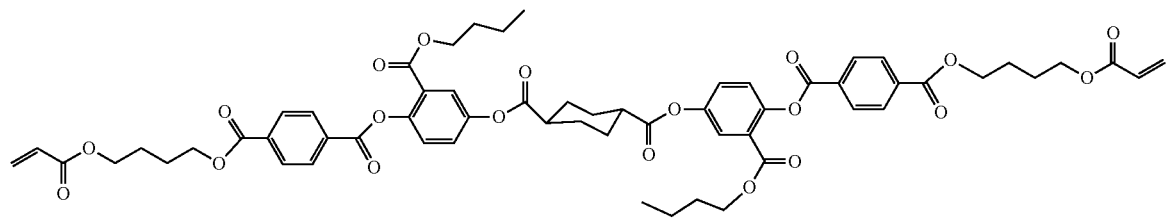
2-15
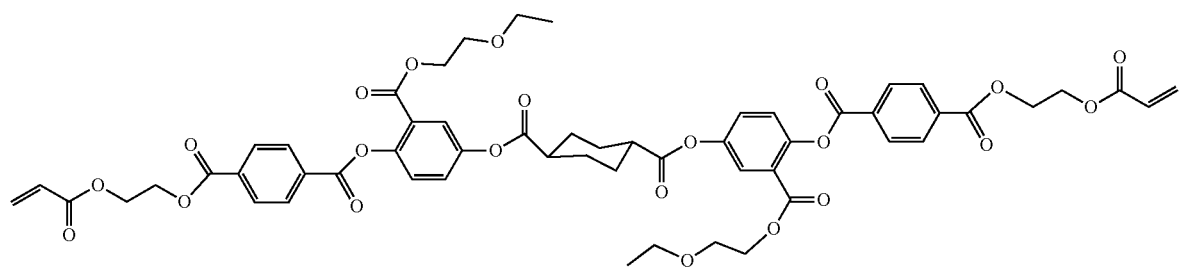
2-16
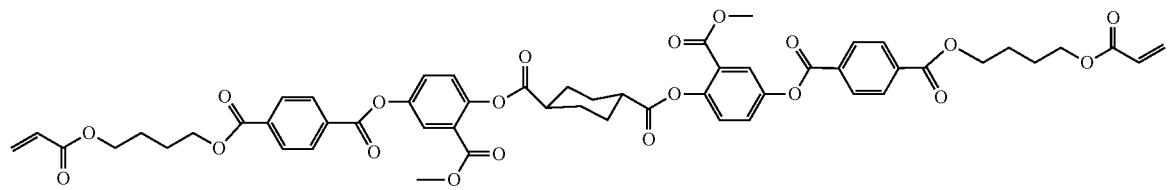

2-17
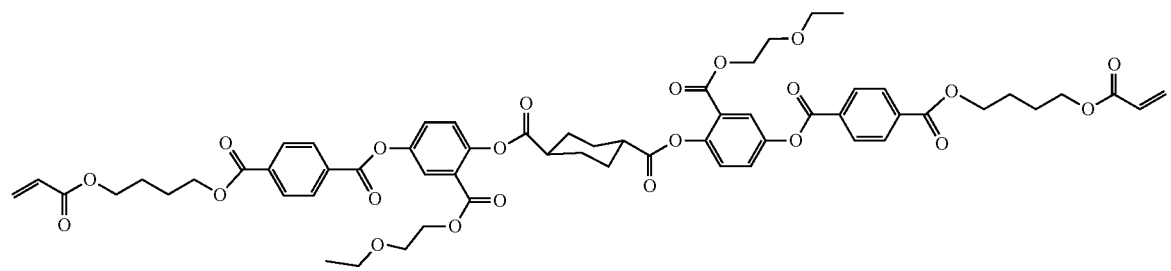
2-18
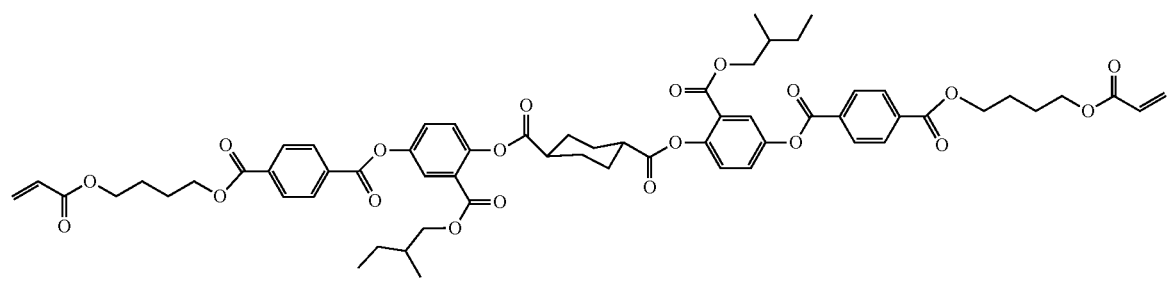
2-19
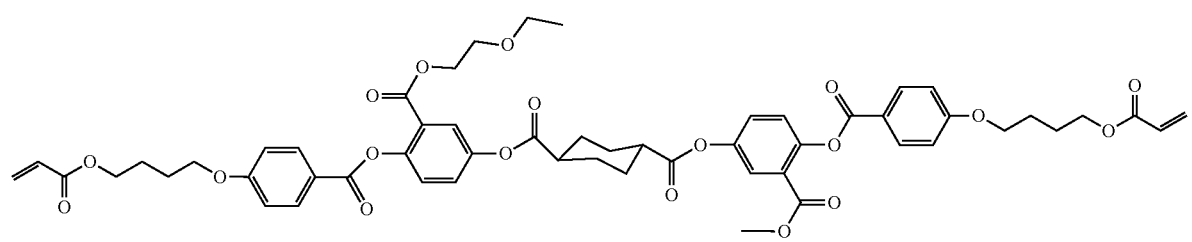
2-20
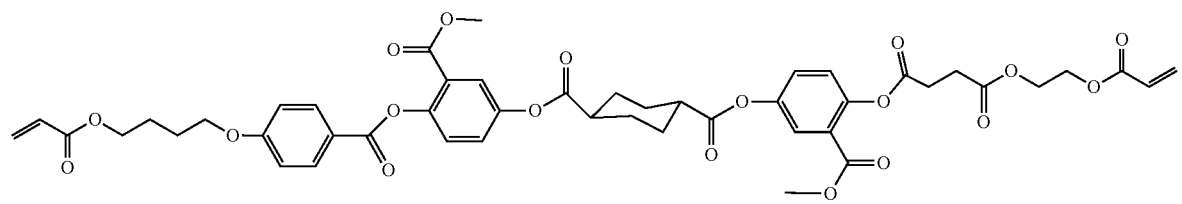
2-21
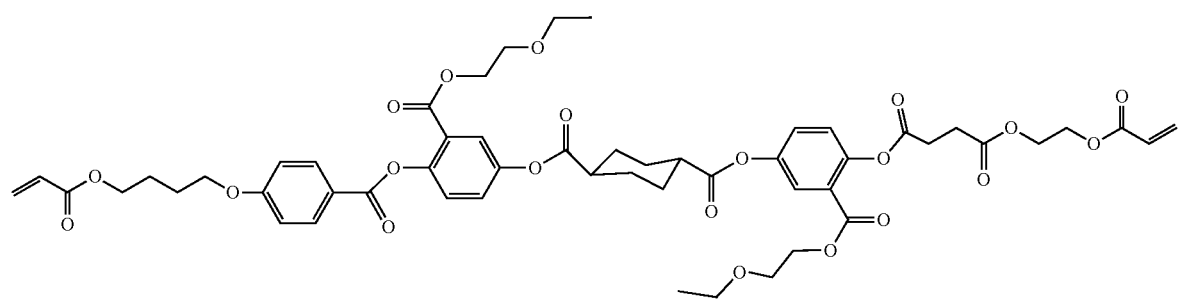
2-22
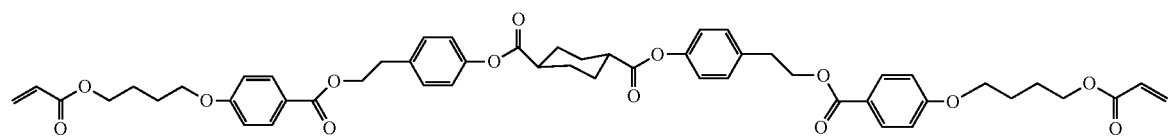

-continued
2-23
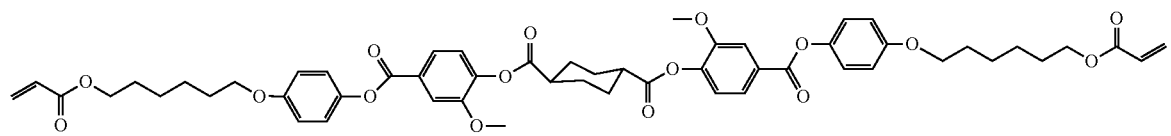
2-24
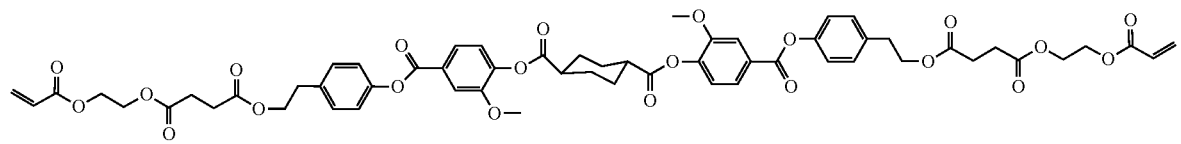
2-28
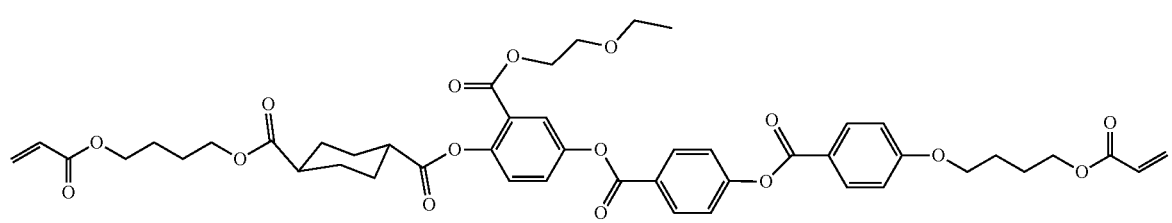
2-29
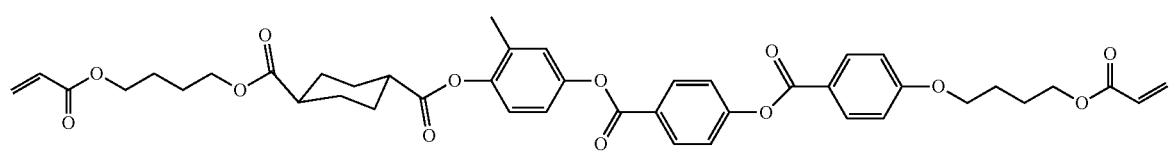
2-30
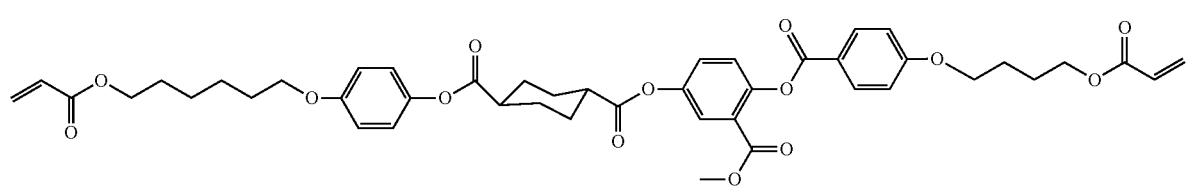
2-31
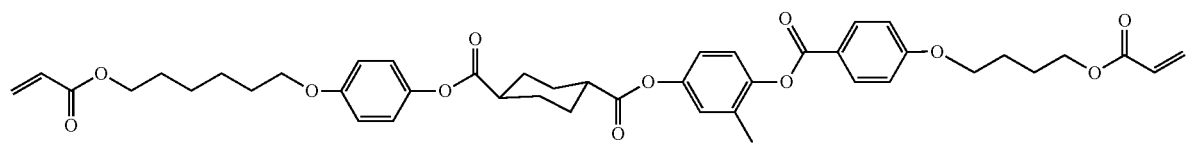
2-32
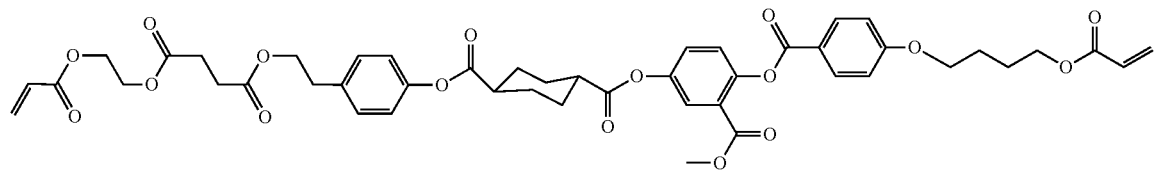
2-33
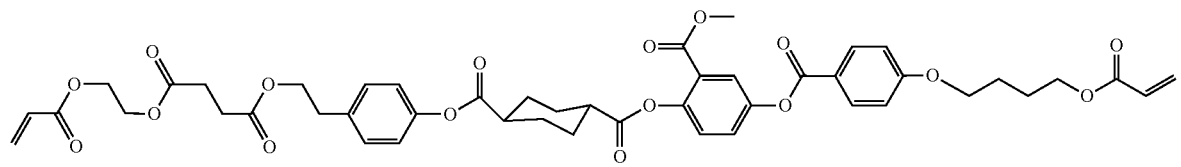

Chiral Agent (Optically Active Compound)

The chiral agent has a function of causing a helical structure of a cholesteric liquid crystalline phase to be formed. The chiral agent may be selected depending on the purpose because a helical twisted direction or a helical pitch derived from the compound varies.

The chiral agent is not particularly limited, and a well-known compound (for example, Liquid Crystal Device Handbook (No. 142 Committee of Japan Society for the Promotion of Science, 1989), Chapter 3, Article 4-3, chiral agent for twisted nematic (TN) or super twisted nematic (STN), p. 199), isosorbide, or an isomannide derivative can be used.

In general, the chiral agent includes an asymmetric carbon atom. However, an axially asymmetric compound or a planar asymmetric compound not having an asymmetric carbon atom can also be used as the chiral agent. Examples of the axially asymmetric compound or the planar asymmetric compound include binaphthyl, helicene, paracyclophane, and derivatives thereof. The chiral agent may include a polymerizable group. In a case where both the chiral agent and the liquid crystal compound have a polymerizable group, a polymer which includes a repeating unit derived from the polymerizable liquid crystal compound and a repeating unit derived from the chiral agent can be formed due to a polymerization reaction of a polymerizable chiral agent and the polymerizable liquid crystal compound. In this aspect, it is preferable that the polymerizable group in the polymerizable chiral agent is the same as the polymerizable group in the polymerizable liquid crystal compound. Accordingly, the polymerizable group of the chiral agent is preferably an unsaturated polymerizable group, an epoxy group, or an aziridinyl group, more preferably an unsaturated polymerizable group, and still more preferably an ethylenically unsaturated polymerizable group.

In addition, the chiral agent may be a liquid crystal compound.

In a case where the chiral agent includes a photoisomerization group, a pattern having a desired reflection wavelength corresponding to a luminescence wavelength can be formed by emission of an actinic ray or the like through a photomask after coating and alignment, which is preferable. As the photoisomerization group, an isomerization portion of a photochromic compound, an azo group, an azoxy group, or a cinnamoyl group is preferable. Specific examples of the compound include compounds described in JP2002-080478A, JP2002-080851A, JP2002-179668A, JP2002-179669A, JP2002-179670A, JP2002-179681A, JP2002-179682A, JP2002-338575A, JP2002-338668A, JP2003-313189A, and JP2003-313292A.

The content of the chiral agent in the liquid crystal composition is preferably 0.01% to 200 mol % and more preferably 1% to 30 mol % with respect to the content molar amount of the liquid crystal compound.

Polymerization Initiator

In a case where the liquid crystal composition includes a polymerizable compound, it is preferable that the liquid crystal composition includes a polymerization initiator. In an aspect where a polymerization reaction progresses with ultraviolet emission, it is preferable that the polymerization initiator is a photopolymerization initiator which initiates a polymerization reaction with ultraviolet emission.

Examples of the photopolymerization initiator include an α-carbonyl compound (described in US2367661A and US2367670A), an acyloin ether (described in US2448828A), an α-hydrocarbon-substituted aromatic acyloin compound (described in U.S. Pat. No. 2,722,512A), a polynuclear quinone compound (described in U.S. Pat. No. 3,046,127A and US2951758A), a combination of a triarylimidazole dimer and p-aminophenyl ketone (described in US3549367A), an acridine compound and a phenazine compound (described in JP1985-105667A (JP-S60-105667A) and US4239850A), and an oxadiazole compound (described in US4212970A).

In particular, it is preferable that the polymerization initiator is a dichroic radical polymerization initiator.

The dichroic radical polymerization initiator refers to a polymerization initiator that has absorption selectivity with respect to light in a specific polarization direction and is excited by the polarized light to generate a free radical among photopolymerization initiators. That is, the dichroic radical polymerization initiator refers to a polymerization initiator having different absorption selectivities between light in a specific polarization direction and light in a polarization direction perpendicular to the light in the specific polarization direction.

The details and specific examples are described in the pamphlet of WO2003/054111.

Specific examples of the dichroic radical polymerization initiator include polymerization initiators represented by the following chemical formulae. In addition, as the dichroic radical polymerization initiator, a polymerization initiator described in paragraphs "0046" to "0097" of JP2016-535863A.

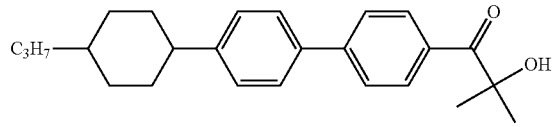

The content of the photopolymerization initiator in the liquid crystal composition is preferably 0.1 to 20 mass % and more preferably 0.5 to 12 mass % with respect to the content of the liquid crystal compound.

Crosslinking Agent

In order to improve the film hardness after curing and to improve durability, the liquid crystal composition may optionally include a crosslinking agent. As the crosslinking agent, a crosslinking agent which can perform curing with ultraviolet light, heat, moisture, or the like can be suitably used.

The crosslinking agent is not particularly limited and can be appropriately selected depending on the purpose. Examples of the crosslinking agent include: a polyfunctional acrylate compound such as trimethylol propane tri(meth)acrylate or pentaerythritol tri(meth)acrylate; an epoxy compound such as glycidyl (meth)acrylate or ethylene glycol diglycidyl ether; an aziridine compound such as 2,2-bis hydroxymethyl butanol-tris [3-(1-aziridinyl)propionate] or 4,4-bis(ethyleneiminocarbonylamino)diphenylmethane; an isocyanate compound such as hexamethylene diisocyanate or a biuret type isocyanate; a polyoxazoline compound having an oxazoline group at a side chain thereof; and an alkoxysilane compound such as vinyl trimethoxysilane or N-(2-aminoethyl)-3-aminopropyltrimethoxysilane. In addition, depending on the reactivity of the crosslinking agent, a well-known catalyst can be used, and not only film hardness and durability but also productivity can be improved. Among these crosslinking agents, one kind may be used alone, or two or more kinds may be used in combination.

The content of the crosslinking agent is preferably 3% to 20 mass % and more preferably 5% to 15 mass % with respect to the solid content mass of the liquid crystal composition. In a case where the content of the crosslinking agent is in the above-described range, an effect of improving a crosslinking density can be easily obtained, and the stability of a cholesteric liquid crystalline phase is further improved.

Other Additives

Optionally, a polymerization inhibitor, an antioxidant, an ultraviolet absorber, a light stabilizer, a coloring material, metal oxide fine particles, or the like can be added to the liquid crystal composition in a range where optical performance and the like do not deteriorate.

In a case where the cholesteric liquid crystal layer is formed, it is preferable that the liquid crystal composition is used as liquid.

The liquid crystal composition may include a solvent. The solvent is not particularly limited and can be appropriately selected depending on the purpose. An organic solvent is preferable.

The organic solvent is not particularly limited and can be appropriately selected depending on the purpose. Examples of the organic solvent include a ketone, an alkyl halide, an amide, a sulfoxide, a heterocyclic compound, a hydrocarbon, an ester, and an ether. Among these crosslinking agents, one kind may be used alone, or two or more kinds may be used in combination. Among these, a ketone is preferable in consideration of an environmental burden.

In a case where the cholesteric liquid crystal layer is formed, it is preferable that the cholesteric liquid crystal layer is formed by applying the liquid crystal composition to a surface where the cholesteric liquid crystal layer is to be formed, aligning the liquid crystal compound to a state of a cholesteric liquid crystalline phase, and curing the liquid crystal compound.

For example, in a case where the cholesteric liquid crystal layer 26 is formed on the alignment film 24, it is preferable that the cholesteric liquid crystal layer 26 obtained by immobilizing a cholesteric liquid crystalline phase is formed by applying the liquid crystal composition to the alignment film 24, aligning the liquid crystal compound to a state of a cholesteric liquid crystalline phase, and curing the liquid crystal compound.

For the application of the liquid crystal composition, a printing method such as ink jet or scroll printing or a well-known method such as spin coating, bar coating, or spray coating capable of uniformly applying liquid to a sheet-shaped material can be used.

The applied liquid crystal composition is optionally dried and/or heated and then is cured to form the cholesteric liquid crystal layer. In the drying and/or heating step, the liquid crystal compound in the liquid crystal composition only has to be aligned to a cholesteric liquid crystalline phase. In the case of heating, the heating temperature is preferably 200° C. or lower and more preferably 130° C. or lower.

The aligned liquid crystal compound is optionally further polymerized. Regarding the polymerization, thermal polymerization or photopolymerization using light emission may be performed, and photopolymerization is preferable. Regarding the light emission, ultraviolet light is preferably used. The emission energy is preferably 20 mJ/cm$^2$ to 50 J/cm$^2$ and more preferably 50 to 1500 mJ/cm$^2$. In order to promote a photopolymerization reaction, light emission may be performed under heating conditions or in a nitrogen atmosphere. The wavelength of emitted ultraviolet light is preferably 250 to 430 nm.

The thickness of the cholesteric liquid crystal layer is not particularly limited, and the thickness with which a required light reflectivity can be obtained may be appropriately set depending on the use of the band pass filter, the light reflectivity required for the cholesteric liquid crystal layer, the material for forming the cholesteric liquid crystal layer, and the like.

Liquid Crystal Elastomer

A liquid crystal elastomer may be used for the cholesteric liquid crystal layer according to the embodiment of the present invention. The liquid crystal elastomer is a hybrid material of liquid crystal and an elastomer. For example, the liquid crystal elastomer has a structure in which a liquid crystalline rigid mesogenic group is introduced into a flexible polymer network having rubber elasticity. Therefore, the liquid crystal elastomer has flexible mechanical characteristics and elasticity. In addition, the alignment state of liquid crystal and the macroscopic shape of the system strongly correlate to each other. In a state where the alignment state of liquid crystal changes depending on a temperature, an electric field, or the like, macroscopic deformation corresponding to a change in alignment degree occurs. For example, in a case where the liquid crystal elastomer is heated up to a temperature at which a nematic phase is transformed into an isotropic phase of random alignment, a sample contracts in a director direction, and the contraction amount thereof increases along with a temperature increase, that is, the alignment degree of liquid crystal decreases. The deformation is thermoreversible, and the liquid crystal elastomer returns to its original shape in a case where it is cooled to the temperature of the nematic phase again. On the other hand, in a case where the liquid crystal elastomer of the cholesteric liquid crystalline phase is heated such that the alignment degree of liquid crystal decreases, the macroscopic elongational deformation of the helical axis direction occurs. Therefore, the helical pitch length increases, and the reflection center wavelength of the selective reflection peak is shifted to a longer wavelength side. This change is also thermoreversible, and as the liquid crystal elastomer is cooled, the reflection center wavelength returns to a shorter wavelength side.

Refractive Index Ellipsoid of Cholesteric Liquid Crystal Layer

As described above, the cholesteric liquid crystal layer 26 has the refractive index ellipsoid having the configuration in which, in a case where the arrangement of the liquid crystal compound 32 is seen from the helical axis direction, an angle between the molecular axes of the liquid crystal compounds 32 adjacent to each other gradually changes.

The refractive index ellipsoid will be described using FIGS. 9 and 10.

Figure 9:
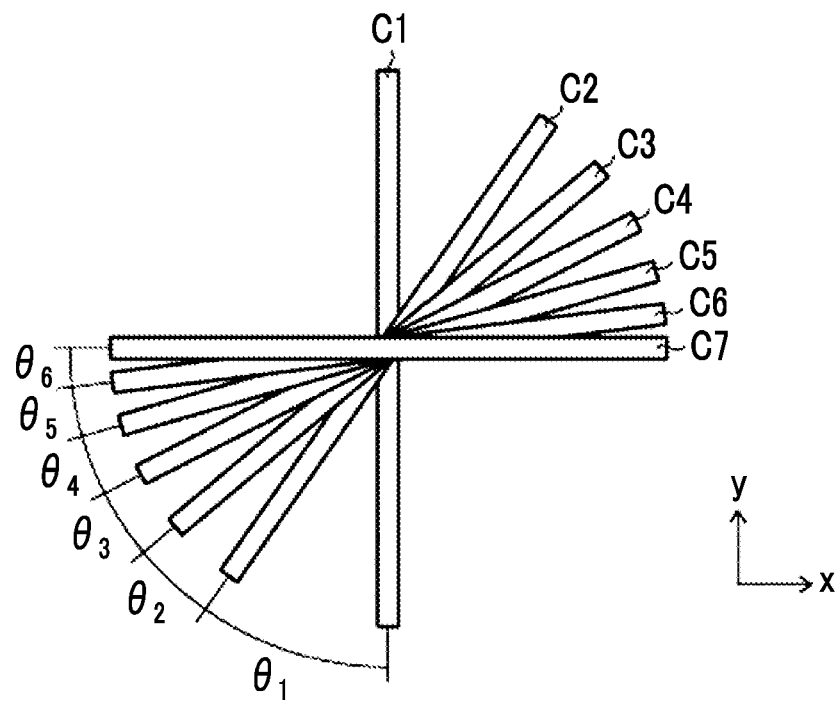
FIG. 9 is a diagram showing a part of a plurality of liquid crystal compounds that are twisted and aligned along a helical axis in case of being seen from the helical axis direction.

FIG. 9 is a diagram showing a part (¼ pitch portion) of a plurality of liquid crystal compounds that are twisted and aligned along a helical axis in case of being seen from a helical axis direction (y direction). FIG. 10 is a diagram conceptually showing an existence probability of the liquid crystal compound seen from the helical axis direction.

In FIG. 9, a liquid crystal compound having a molecular axis parallel to the y direction is represented by C1, a liquid crystal compound having a molecular axis parallel to the x direction is represented by C7, and liquid crystal compounds between C1 and C7 are represented by C2 to C6 in order from the liquid crystal compound C1 side to the liquid crystal compound C7 side. The liquid crystal compounds C1 to C7 are twisted and aligned along the helical axis, and the liquid crystal compound rotates by 90° from the liquid crystal compound C1 to the liquid crystal compound C7. In a case where the length between the liquid crystal compounds over which the angle of the liquid crystal compound that is twisted and aligned changes by 360° is set as 1 pitch ("P" in FIG. 7), the length in the helical axis direction (direction perpendicular to the paper plane in FIG. 9) between the liquid crystal compound C1 and the liquid crystal compound C7 is set as ¼ pitch.

As shown in FIG. 9, in the ¼ pitch from the liquid crystal compound C1 to the liquid crystal compound C7, the angle between the molecular axes of the liquid crystal compounds adjacent to each other in case of being seen from the z direction (helical axis direction) varies. In the example shown in FIG. 9, an angle $\theta_1$ between the liquid crystal compound C1 and the liquid crystal compound C2 is more than an angle $\theta_2$ between the liquid crystal compound C2 and the liquid crystal compound C3, the angle $\theta_2$ between the liquid crystal compound C2 and the liquid crystal compound C3 is more than an angle $\theta_3$ between the liquid crystal compound C3 and the liquid crystal compound C4, the angle $\theta_3$ between the liquid crystal compound C3 and the liquid crystal compound C4 is more than an angle $\theta_4$ between the liquid crystal compound C4 and the liquid crystal compound C5, the angle $\theta_4$ between the liquid crystal compound C4 and the liquid crystal compound C5 is more than an angle $\theta_5$ between the liquid crystal compound C5 and the liquid crystal compound C6, the angle $\theta_5$ between the liquid crystal compound C5 and the liquid crystal compound C6 is more than an angle $\theta_6$ between the liquid crystal compound C6 and the liquid crystal compound C7, and the angle $\theta_6$ between the liquid crystal compound C6 and the liquid crystal compound C7 is the smallest.

That is, the liquid crystal compounds C1 to C7 are twisted and aligned such that the angle between the molecular axes of the liquid crystal compounds adjacent to each other decreases in order from the liquid crystal compound C1 side toward the liquid crystal compound C7 side.

For example, in a case where the interval between the liquid crystal compounds (the interval in the thickness direction) is substantially regular, the rotation angle per unit length decreases in order from the liquid crystal compound C1 side to the liquid crystal compound C7 side in the ¼ pitch from the liquid crystal compound C1 to the liquid crystal compound C7.

In the cholesteric liquid crystal layer 26, the configuration in which the rotation angle per unit length changes as described above in the ¼ pitch is repeated such that the liquid crystal compound is twisted and aligned.

Here, in a case where the rotation angle per unit length is constant, the angle between the molecular axes of the liquid crystal compounds adjacent to each other is constant. Therefore, the existence probability of the liquid crystal compound in case of being seen from the helical axis direction is the same in any direction.

Figure 10:
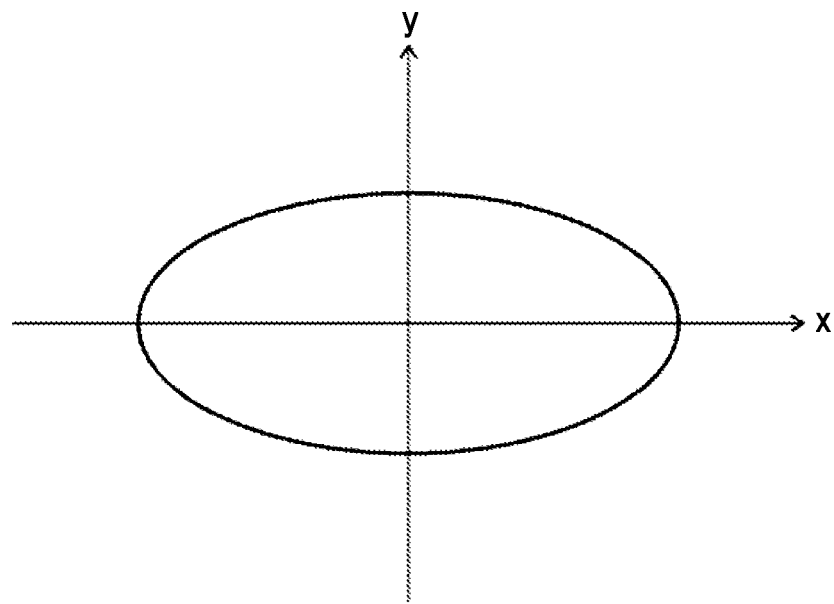
FIG. 10 is a diagram conceptually showing an existence probability of the liquid crystal compound seen from the helical axis direction in the cholesteric liquid crystal layer.

On the other hand, as described above, with the rotation angle per unit length decreases in order from the liquid crystal compound C1 side to the liquid crystal compound C7 side in the ¼ pitch from the liquid crystal compound C1 to the liquid crystal compound C7, the existence probability of the liquid crystal compound in case of being seen from the helical axis direction in the x direction is higher than that in the y direction as conceptually shown in FIG. 10. By making the existence probability of the liquid crystal compound to vary between the x direction and the y direction, the refractive index varies between the x direction and the y direction such that refractive index anisotropy occurs. In other words, refractive index anisotropy in a plane perpendicular to the helical axis occurs.

The refractive index nx in the x direction in which the existence probability of the liquid crystal compound is higher than the refractive index ny in the y direction in which the existence probability of the liquid crystal compound is lower. Accordingly, the refractive index nx and the refractive index ny satisfy nx>ny.

The x direction in which the existence probability of the liquid crystal compound is higher is the in-plane slow axis direction of the cholesteric liquid crystal layer 26, and the y direction in which the existence probability of the liquid crystal compound is lower is the in-plane fast axis direction of the cholesteric liquid crystal layer 26.

This way, the configuration (the configuration having the refractive index ellipsoid) in which the rotation angle per unit length in the ¼ pitch change in the twisted alignment of the liquid crystal compound can be formed by applying a composition for forming the cholesteric liquid crystal layer and irradiating the cholesteric liquid crystalline phase (composition layer) with polarized light in a direction perpendicular to the helical axis.

The cholesteric liquid crystalline phase can be distorted by polarized light irradiation to cause in-plane retardation to occur. That is, refractive index nx>refractive index ny can be satisfied.

Specifically, the polymerization of the liquid crystal compound having a molecular axis in a direction that matches a polarization direction of irradiated polarized light progresses. At this time, only a part of the liquid crystal compound is polymerized. Therefore, a chiral agent present at this position is excluded and moves to another position.

Accordingly, at a position where the direction of the molecular axis of the liquid crystal compound is close to the polarization direction, the amount of the chiral agent decreases, and the rotation angle of the twisted alignment decreases. On the other hand, at a position where the direction of the molecular axis of the liquid crystal compound is perpendicular to the polarization direction, the amount of the chiral agent increases, and the rotation angle of the twisted alignment increases.

As a result, as shown in FIG. 9, the liquid crystal compound that is twisted and aligned along the helical axis can be configured such that, in the ¼ pitch from the liquid crystal compound having the molecular axis parallel to the polarization direction to the liquid crystal compound having the molecular axis perpendicular to the polarization direction, the angle between the molecular axes of the liquid crystal compounds adjacent to each other decreases in order from the liquid crystal compound side parallel to the polarization direction to the liquid crystal compound side perpendicular to the polarization direction. That is, by irradiating the cholesteric liquid crystalline phase with polarized light, the existence probability of the liquid crystal compound varies between the x direction and the y direction, the refractive index varies between the x direction and the y direction such that refractive index anisotropy occurs. As a result, the refractive index nx and the refractive index ny of the optical element 10 can satisfy nx>ny. That is, the cholesteric liquid crystal layer can adopt the configuration having the refractive index ellipsoid.

This polarized light irradiation may be performed at the same time as the immobilization of the cholesteric liquid crystalline phase, the immobilization may be further performed by non-polarized light irradiation after the polarized light irradiation, and photo alignment may be performed by polarized light irradiation after performing the immobilization by non-polarized light irradiation. In order to obtain high retardation, it is preferable that only polarized light irradiation is performed or polarized light irradiation is performed in advance. It is preferable to perform the polarized light irradiation in an inert gas atmosphere where the oxygen concentration is 0.5% or less. The irradiation energy is preferably 20 mJ/cm$^2$ to 10 J/cm$^2$ and more preferably 100 to 800 mJ/cm$^2$. The illuminance is preferably 20 to 1000 mW/cm$^2$, more preferably 50 to 500 mW/cm$^2$, and still more preferably 100 to 350 mW/cm$^2$. The kind of the liquid crystal compound to be cured by polarized light irradiation is not particularly limited, and a liquid crystal compound having an ethylenically unsaturated group as a reactive group is preferable.

In addition, examples of a method of distorting the cholesteric liquid crystalline phase by polarized light irradiation to cause in-plane retardation to occur include a method using a dichroic liquid crystalline polymerization initiator (WO03/054111A1) and a method using a rod-like liquid crystal compound having a photo-alignable functional group such as a cinnamoyl group in the molecule (JP2002-006138A).

The light to be irradiated may be ultraviolet light, visible light, or infrared light. That is, the light with which the liquid crystal compound is polymerizable may be appropriately selected depending on the liquid crystal compound including a coating film, the polymerization initiator, and the like.

In a case where the composition layer is irradiated with polarized light by using the dichroic radical polymerization initiator as the polymerization initiator, the polymerization of the liquid crystal compound having a molecular axis in a direction that matches the polarization direction can be more suitably made to progress.

The in-plane slow axis direction, the in-plane fast axis direction, the refractive index nx, and the refractive index ny can be measured using M-2000 UI (manufactured by J. A. Woollam Co., Ltd.) as a spectroscopic ellipsometer. The refractive index nx and the refractive index ny can be obtained from a measured value of a retardation Δn×d using measured values of an average birefringence $n_{ave}$ and a thickness d. Here, Δn=nx−ny, and the average refractive index $n_{ave}$=(nx+ny)/2. In general, since the average refractive index of liquid crystal is about 1.5, nx and ny can be obtained using this value. In addition, in-plane slow axis direction, the in-plane fast axis direction, the refractive index nx, and the refractive index ny of the cholesteric liquid crystal layer used in the present invention are measured, a wavelength (for example, a wavelength 100 nm longer than a longer wavelength side end of the selective wavelength) longer than the selective reflection wavelength (in the case of the present invention, the selective reflection wavelength of the primary light) is set as a measurement wavelength. As a result, the influence of retardation derived from the cholesteric selective reflection on a rotary polarization component is reduced as far as possible. Therefore, the measurement can be performed with high accuracy.

In addition, the cholesteric liquid crystal layer having the refractive index ellipsoid can be formed by stretching the cholesteric liquid crystal layer after applying the composition for forming the cholesteric liquid crystal layer, after immobilizing the cholesteric liquid crystalline phase, or in a state where the cholesteric liquid crystalline phase is semi-immobilized.

In a case where the cholesteric liquid crystal layer having the refractive index ellipsoid is formed by stretching, the stretching may be monoaxial stretching or biaxial stretching. In addition, stretching conditions may be appropriately set depending on the material, the thickness, the desired refractive index nx, and the desired refractive index ny of the cholesteric liquid crystal layer. In the case of monoaxial stretching, the stretching ratio is preferably 1.1 to 4. In the case of biaxial stretching, a ratio between the stretching ratio of one stretching direction and the stretching ratio of another stretching direction is preferably 1.1 to 2.

Action of Cholesteric Liquid Crystal Layer

An action of the cholesteric liquid crystal layer 26 having the above-described configuration will be described below in detail.

In a case where the light (primary light) having the selective reflection wavelength is incident into the cholesteric liquid crystal layer 26, the incident light is reflected from the cholesteric liquid crystalline phase.

Here, in a case where the cholesteric liquid crystal layer 26 has the above-described refractive index ellipsoid, not only the primary light but also the secondary light are reflected.

The center wavelength of the secondary light has a length that is about half of the length of the selective reflection center wavelength λ of the primary light. In addition, the bandwidth (half-width) of the secondary reflected light is less than the bandwidth of the primary reflected light. In addition, although the primary light is any of right circularly polarized light or left circularly polarized light depending on the turning direction of the cholesteric liquid crystalline phase, the secondary light includes both components of right circularly polarized light and left circularly polarized light.

Figure 11:
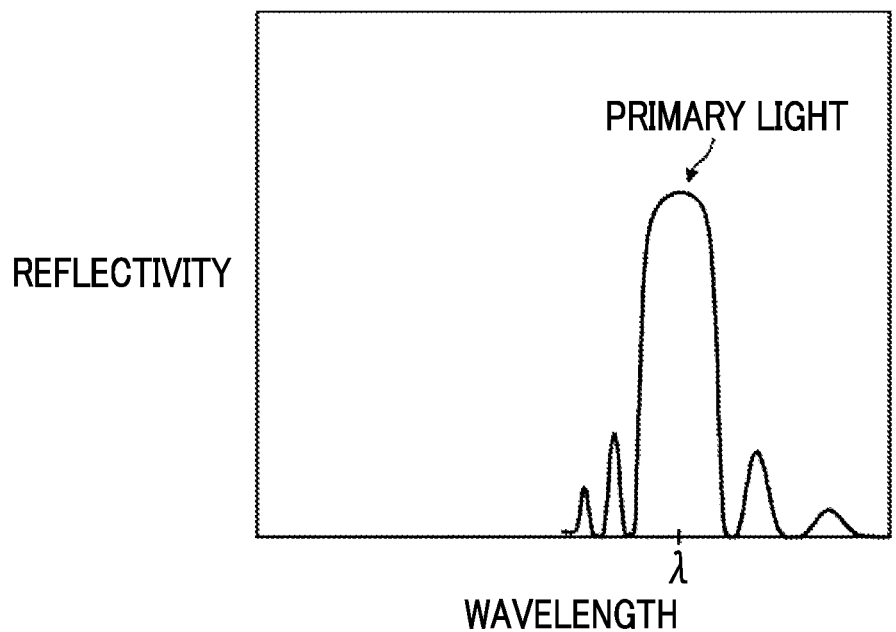
FIG. 11 is a graph conceptually showing an example of light reflectivity of a typical cholesteric liquid crystal layer.
Figure 12:
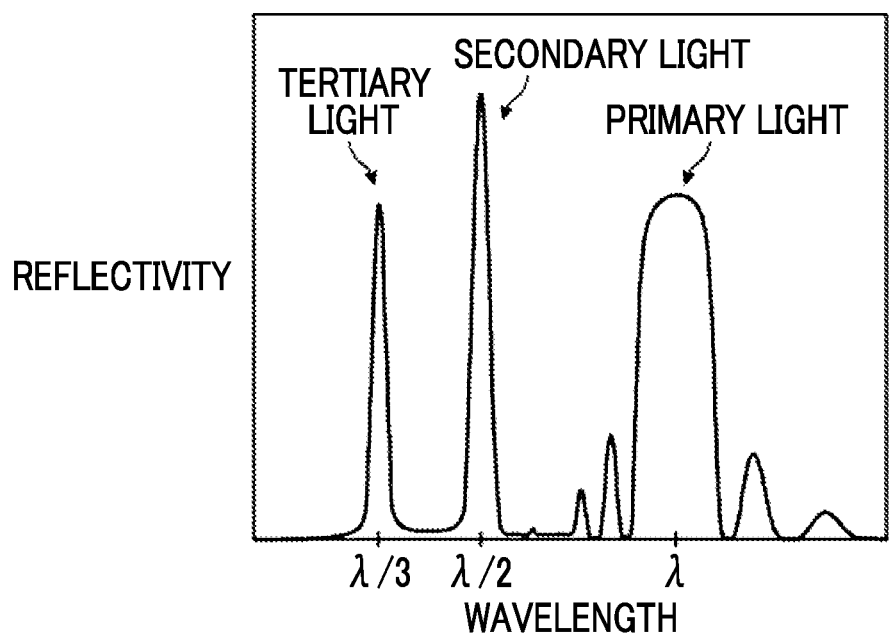
FIG. 12 is a graph conceptually showing an example of light reflectivity of the band pass filter in the sensor according to the present invention.

FIG. 11 conceptually shows reflection characteristics of a general cholesteric liquid crystal layer not having a refractive index ellipsoid. FIG. 11 and FIG. 12 shown below are graphs conceptually showing reflection characteristics in which the horizontal axis represents a wavelength and the vertical axis represents a reflectivity.

The general cholesteric liquid crystal layer has wavelength selectivity in reflection, and thus reflects light in a wavelength range near the selective reflection center wavelength λ at a substantially uniformly high reflectivity as shown in FIG. 11. The reflected light having the selective reflection peak in a wavelength range including the selective reflection center wavelength λ is the primary light. In addition, the reflectivity with respect to light in a wavelength range other than the vicinity of the selective reflection center wavelength λ is low.

On the other hand, as shown in FIG. 12, the cholesteric liquid crystal layer having the refractive index ellipsoid reflects not only light (primary light) in a wavelength range in the vicinity of the selective reflection center wavelength λ but also light (secondary light) in a wavelength range in the vicinity of the wavelength λ/2 at a high reflectivity. As shown in FIG. 12, the half-width of the second selective reflection peak at the wavelength λ/2 is narrower than the half-width of the first selective reflection peak at the wavelength λ and is 30 nm or less.

Accordingly, in the sensor according to the embodiment of the present invention, the band pass filter that includes the cholesteric liquid crystal layer 26 having the refractive index ellipsoid is used. As a result, in a case where the measurement light reflected from the object O is reflected from the band pass filter and is incident into the light-receiving element, the light incident into the light-receiving element can be made to be only the light in a narrow wavelength range reflected from the band pass filter.

Therefore, the external light component reflected from the band pass filter can be reduced, and only the predetermined light in the narrow wavelength range can be made to be incident into the light-receiving element 14. Therefore, noise generated from external light can be significantly reduced, and high-accuracy measurement can be performed at a high SN ratio.

In the sensor, in the configuration where the measurement light is reflected to be incident into the light-receiving element using the second selective reflection peak of the cholesteric liquid crystal layer 26 appearing at the wavelength $\lambda/2$, a light source that emits the light at the wavelength $\lambda/2$ may be used as the light source.

On the other hand, as shown in FIG. 12, the cholesteric liquid crystal layer 26 having the refractive index ellipsoid reflects not only light (primary light) in a wavelength range in the vicinity of the selective reflection center wavelength $\lambda$ and light (secondary light) in a wavelength range in the vicinity of the wavelength $\lambda/2$ but also light (tertiary light) in a wavelength range in the vicinity of the wavelength $\lambda/3$ at a high reflectivity. The half-width of the tertiary light is narrower than the half-width of the primary light and is 30 nm or less. Accordingly, the sensor 10 may use a third selective reflection peak of the cholesteric liquid crystal layer 26 appearing at the wavelength $\lambda/3$. Specifically, the light source may emit the measurement light having the wavelength $\lambda/3$ and may cause the measurement light having the wavelength $\lambda/3$ reflected from the object O to be reflected from the band pass filter (cholesteric liquid crystal layer 26) and to be incident into the light-receiving element.

Further, the cholesteric liquid crystal layer 26 having the refractive index ellipsoid has a high-order selective reflection peak such as a fourth selective reflection peak appearing at a wavelength $\lambda/4$ or a fifth selective reflection peak appearing at a wavelength $\lambda/5$. Accordingly, the sensor may use the high-order selective reflection peak of the cholesteric liquid crystal layer 26. However, as the order increases, the reflectivity at the selective reflection peak decreases. Therefore, it is preferable to use the second selective reflection peak or the third selective reflection peak, and it is more preferable to use the second selective reflection peak.

Here, from the viewpoint of further reducing the bandwidth (half-width) of the secondary light, it is preferable that an absolute value of an in-plane retardation Re=(nx−ny)×d of the cholesteric liquid crystal layer 26 is 10 nm or more.

As described above, the thickness of the cholesteric liquid crystal layer 26 in the band pass filter is not particularly limited. Accordingly, the thickness of the cholesteric liquid crystal layer 26 may be appropriately set depending on the selective reflection wavelength range of the band pass filter, the reflectivity required for the band pass filter, and the like.

In the sensor according to the embodiment of the present invention, for example, even in a case where the object O is measured using the wavelength of the second selective reflection peak, the band pass filter reflects not only the light in the wavelength range of the second selective reflection peak of the cholesteric liquid crystal layer but also the light in the selective reflection wavelength range (the wavelength range of the first selective reflection peak) and the light in the wavelength range of the third selective reflection peak.

Therefore, in a case where the light in the selective reflection wavelength range and the light in the wavelength range of the third selective reflection peak are incident into the band pass filter, the incident light is reflected from the band pass filter and measured by the light-receiving element such that noise is generated and the SN ratio decreases.

Figure 13:
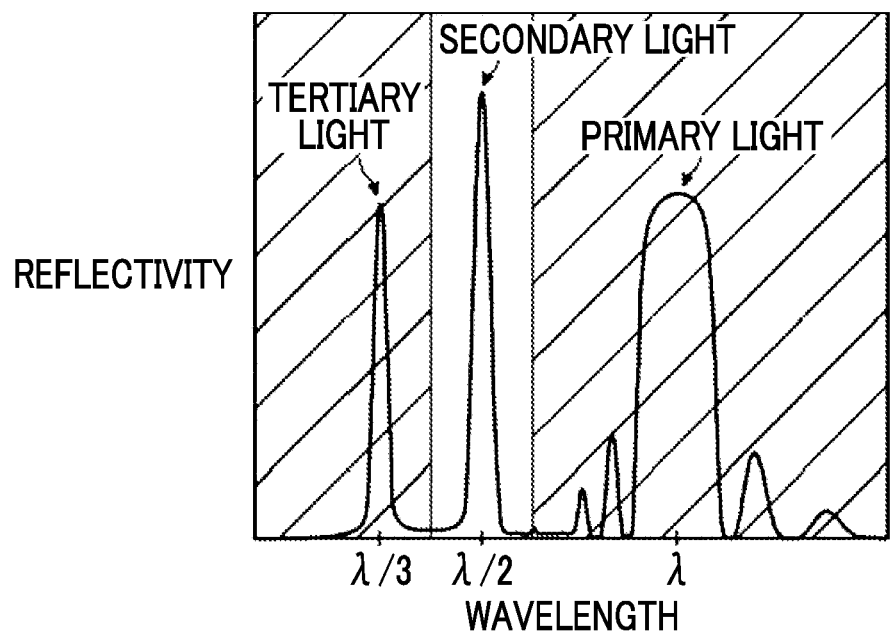
FIG. 13 is a conceptual diagram showing an example of a light shielding member used in the sensor according to the present invention.

In order to prevent the problem, in the present invention, as conceptually indicated by an oblique line in FIG. 13, it is preferable to provide at least one of a light shielding member that shields light in a wavelength range of a wavelength $\lambda$-100 nm or more of the first selective reflection peak of the band pass filter or a light shielding member that shields light in a wavelength range of a wavelength $\lambda/2$-50 nm or less of the second selective reflection peak, and it is more preferable to provide both of the light shielding members.

As a result, light in a wavelength range other than the wavelength range of the second selective reflection peak is prevented from being incident into the light-receiving element such that the SN ratio can be prevented from decreasing.

As the light shielding member, various well-known filters can be used. Accordingly, light shielding from the light shielding member may be absorption or reflection.

The disposition position of the light shielding member is not particularly limited as long as light emitted from the light source 12 is reflected from the object O, is reflected from the band pass filter, and is on the optical path until the light is incident into the light-receiving element. It is preferable that the disposition position of the light shielding member is near the light-receiving element.

In the present invention, even in a case where the cholesteric liquid crystal layer 26 having the refractive index ellipsoid is used as the band pass layer, the thermal expansion coefficient $\alpha_1$ and the elastic modulus E1 of the band pass layer and the thermal expansion coefficient $\alpha_2$ and the elastic modulus E2 of the support satisfy the above-described relationship. As a result, the wavelength of the light source that changes depending on a change in environmental temperature and the wavelength of the second selective reflection peak (high-order selective reflection peak) of the band pass filter can be made to match.

Figure 14:
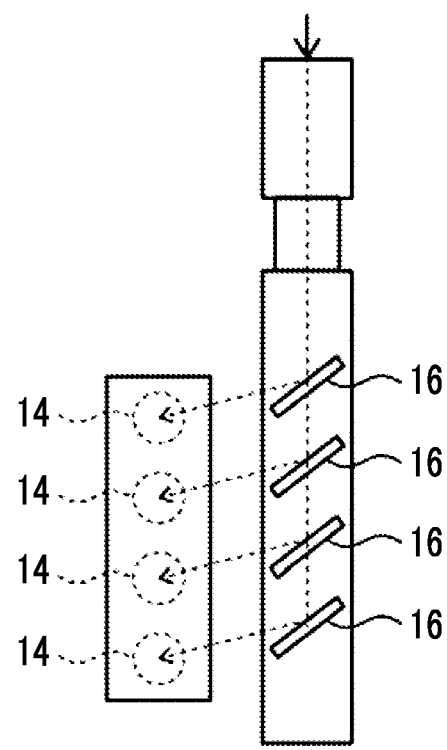
FIG. 14 is a diagram conceptually showing an example of a wavelength selective element including the sensor according to the present invention.

The sensor according to the embodiment of the present invention can be used for various applications such as a sensor that selects only a wavelength included in required information. For example, the sensor can be used as a wavelength selective element for optical communication used in a communication field described in WO2018/010675A. For example, as in the example shown in FIG. 14, with the configuration including a plurality of band pass filters 16 having different selective reflection peak wavelengths and a plurality of light-receiving elements 14, the sensor can be used as a wavelength selective element that selectively acquires light having a plurality of given wavelengths.

Band Pass Filter

The band pass filter according to the embodiment of the present invention comprises:
a band pass layer; and
a support that supports the band pass layer,
in which a thermal expansion coefficient $\alpha_2$ of the support is less than 0 ppm/° C.

In the band pass filter according to the embodiment, the support has a negative thermal expansion coefficient.

As described above, in a case where the support has a negative thermal expansion coefficient and the environmental temperature is high, the support contracts, whereas the band pass layer expands. In this case, the band pass layer is restricted in the plane direction by the support, the elongation thereof is suppressed, and contraction occurs. Therefore, the band pass layer extends in the thickness direction (refer to FIG. 4). As a result, the dimension of the structure formed in the thickness direction of the band pass layer, for example, the helical pitch in the case of the cholesteric liquid crystal layer extends. Accordingly, the transmission wavelength of the band pass filter increases.

This way, by using the support having a negative thermal expansion coefficient as the support that supports the band pass layer, the band pass filter where the transmission wavelength changes depending on a change in environmental temperature can be realized.

Hereinabove, the sensor and the band pass filter according to the embodiment of the present invention have been described in detail. However, the present invention is not limited to the above-described examples, and various improvements and modifications can be made within a range not departing from the scope of the present invention.

The following coating liquid for forming an alignment film was applied to the support by spin coating. The support on which the coating film of the coating liquid for forming an alignment film was formed was dried using a hot plate at 60° C. for 60 seconds. As a result, an alignment film P-1 was formed.

Coating Liquid for Forming Alignment Film

| | |
|---|---|
| The following material for photo-alignment | 1.00 part by mass |
| Water | 16.00 parts by mass |
| Butoxyethanol | 42.00 parts by mass |
| Propylene glycol monomethyl ether | 42.00 parts by mass |

Material for Photo-Alignment

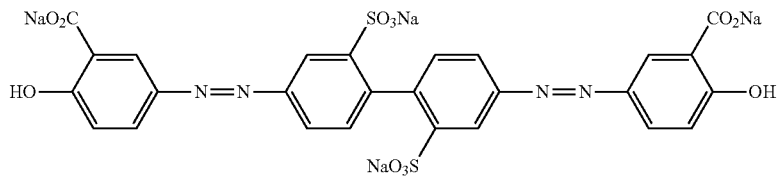

EXAMPLES

Hereinafter, the characteristics of the present invention will be described in detail using examples. Materials, chemicals, used amounts, material amounts, ratios, treatment details, treatment procedures, and the like shown in the following examples can be appropriately changed within a range not departing from the scope of the present invention. Accordingly, the scope of the present invention is not limited to the following specific examples.

Example 1

By using a glass substrate as the support and forming a cholesteric liquid crystal layer as the band pass layer, a band pass filter was prepared.

Formation of Alignment Film

A glass substrate was used as the support. In a case where the thermal expansion coefficient $\alpha 2$ of the support was measured using a laser thermal expansion measurement device (LIX-2, manufactured by ULVAC), the thermal expansion coefficient $\alpha 2$ was −4 ppm/° C. (measurement temperature range of 100 K to 700 K). In addition, in a case where the elastic modulus E2 was measured using the above-described method, the elastic modulus E2 was 75 GPa. The thickness of the support was 1100 μm.

Exposure of Alignment Film

By irradiating the obtained alignment film P-1 with polarized ultraviolet light (50 mJ/cm$^2$, using an extra high pressure mercury lamp), the alignment film was exposed.

Formation of Cholesteric Liquid Crystal Layer

As the liquid crystal composition, the following composition A-1 was prepared. This composition A-1 is a liquid crystal composition forming a cholesteric liquid crystal layer (cholesteric liquid crystalline phase) that has a selective reflection center wavelength of 1280 nm and reflects right circularly polarized light.

Composition A-1

| | |
|---|---|
| Rod-like liquid crystal compound L-1 | 100.00 parts by mass |
| Polymerization initiator LC-1-1 | 4.00 parts by mass |
| Chiral agent Ch-1 | 2.30 parts by mass |
| Leveling agent T-1 | 0.08 parts by mass |
| Methyl ethyl ketone | 159.00 parts by mass |

Rod-Like Liquid Crystal Compound L-1

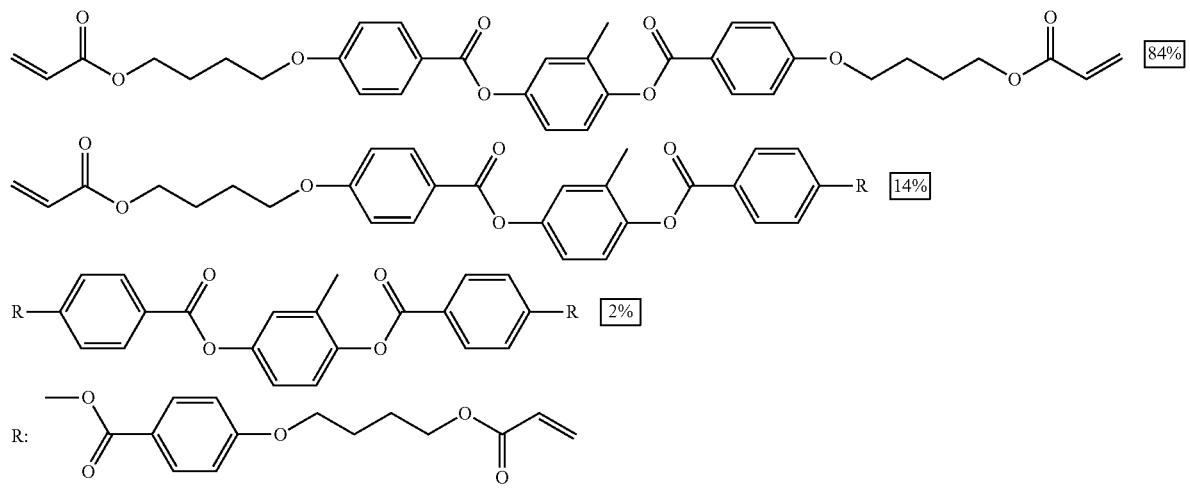

Polymerization Initiator

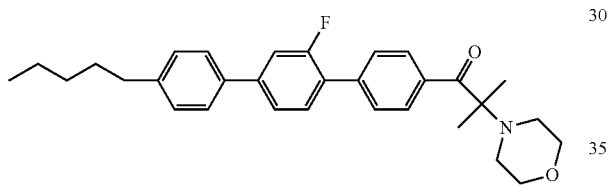
(LC-1-1)

Chiral Agent Ch-1

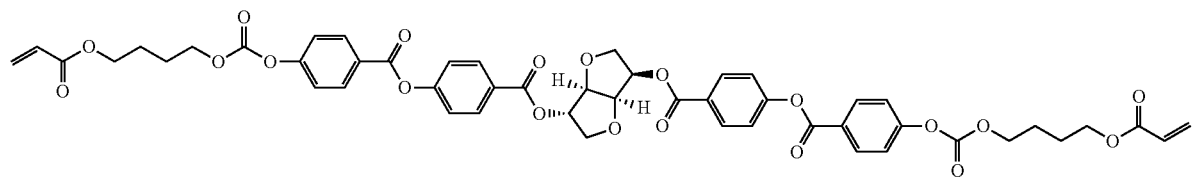 [SMILES: C=CC(=O)OCCCCOC(=O)Oc1ccc(C(=O)Oc2ccc(C(=O)O[C@H]3CO[C@H]4[C@@H]3OC[C@H]4OC(=O)c3ccc(OC(=O)c4ccc(OC(=O)OCCCCOC(=O)C=C)cc4)cc3)cc2)cc1]

Leveling Agent T-1

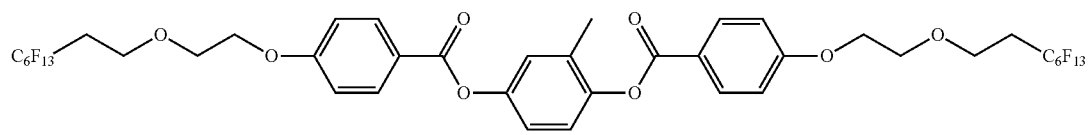

Polarized UV Irradiation Device

By using, as an ultraviolet (UV) light source, a microwave-powered ultraviolet irradiation device (Light Hammer 10, 240 W/cm, Fusion UV systems GmbH) on which D-bulb having a strong emission spectrum in 350 to 400 nm was mounted, a wire grid polarization filter (ProFlux PPL 02 (high transmittance type), manufactured by Moxtek, Inc) was provided at a position 10 cm distant from the irradiation surface to prepare the polarized UV irradiation device. The maximum illuminance of the device was 400 mW/cm$^2$.

The following composition A-1 was applied to the alignment film P-1 to form a coating film, and the applied coating film was heated using a hot plate at 95° C. Next, after being cooled to 80° C., the coating film was irradiated with ultraviolet light having a wavelength of 365 nm at an illuminance of 200 mW/cm² and an irradiation dose of 300 mJ/cm² using the polarized UV irradiation device in a nitrogen atmosphere. As a result, the alignment of the liquid crystal compound was immobilized, and a cholesteric liquid crystal layer was formed.

In a case where a cross-section of the cholesteric liquid crystal layer was observed with a SEM, the cholesteric liquid crystalline phase had 6 pitches. In addition, the thickness of the cholesteric liquid crystal layer was 5 μm.

In addition, in a case where the thermal expansion coefficient $\alpha 1$ of the cholesteric liquid crystal layer was measured using the above-described method, the thermal expansion coefficient $\alpha 1$ was 50 ppm/° C. In addition, in a case where the elastic modulus E1 was measured using the above-described method, the elastic modulus E1 was 5 GPa.

Evaluation of Band Pass Filter

Reflection (transmission) characteristics of the band pass filter prepared in Example 1 were measured using a spectrophotometer (UV-3150, manufactured by Shimadzu Corporation). In this case, the measurement was performed after leaving the band pass filter at each of environmental temperatures 25° C., 45° C., and 65° C. for 1 hour. At the environmental temperature of 25° C., it was verified that the band pass filter had the reflection center wavelength of 1268 nm, the first selective reflection peak having a half-width of 110 nm, the reflection center wavelength of 634 nm, and the second selective reflection peak having a half-width of 12 nm. At the environmental temperature of 45° C., it was verified that the reflection center wavelength of the second selective reflection peak was 639 nm and the half-width was 12 nm. At the environmental temperature of 65° C., it was verified that the reflection center wavelength of the second selective reflection peak was 644 nm and the half-width was 12 nm.

Preparation of Sensor: Reflective Type

A laser light source that emitted light having a center wavelength of 633 nm, a LED light source (where a yellow phosphor is formed on a blue LED), and a light-receiving element were prepared. The laser light source corresponds to a light source that emits the measurement light according to the embodiment of the present invention, and the LED light source emitted light corresponding to external light.

The sensor was prepared such that light was emitted from each of the light sources to a white plate as the object and the light reflected from the white plate is caused to be reflected from the band pass filter and to be incident into the light-receiving element. The band pass filter was disposed such that the light emitted from the laser light source and reflected from the white plate was incident from a direction tilted by 5° with respect to the perpendicular line of the surface of the band pass filter. The light-receiving element was disposed such that reflected light from the band pass filter was vertically incident into the light-receiving surface.

In addition, in a case where the environmental temperature was high, the center wavelength of the laser light source was 641 nm at 45° C. and was 648 nm at 65° C.

Example 2

A band pass filter was prepared using the same method as that of Example 1, except that a support prepared as described below was used as the support. Using this band pass filter, a sensor was prepared.

Formation of Support

A polycrystalline sintered compact (ceramic) sample of $\beta\text{-}Cu_{1.8}Zn_{0.2}V_2O_7$ was prepared using a solid phase reaction method. Specifically, CuO, ZnO, and $V_2O_5$ weighed at the stoichiometric ratio were mixed with each other in a mortar, and the mixture was heated in air at a temperature of 873 to 953 K for 10 hours. The obtained powder was sintered using a spark plasma sintering (SPS) furnace (manufactured by SPS SYNTEX) to obtain an oxide sintered compact. The sintering was performed in a vacuum ($<10^{-1}$ Pa) using a graphite die at 723 K for 5 minutes. The support was formed using this sample.

In a case where the thermal expansion coefficient $\alpha 2$ of the formed support was measured, $\alpha$ was −14 ppm/° C. In addition, in a case where the elastic modulus E2 was measured, the elastic modulus E2 was 75 GPa. The thickness of the support was 1000 μm.

Formation of Alignment Film

The alignment film P-1 was formed on the support using the same method as that of Example 1.

Exposure of Alignment Film

The alignment film P-1 was exposed with the polarized UV irradiation device using the same method as that of Example 1.

In addition, in a case where the thermal expansion coefficient $\alpha 1$ of the formed cholesteric liquid crystal layer was measured, the thermal expansion coefficient $\alpha 1$ was 50 ppm/° C. In addition, in a case where the elastic modulus E1 was measured, the elastic modulus E1 was 5 GPa. In addition, the thickness of the cholesteric liquid crystal layer was 5 μm.

While changing the environmental temperature as in Example 1, the reflection center wavelength and the half-width of the band pass filter were measured. At the environmental temperature of 25° C., it was verified that the reflection center wavelength of the second selective reflection peak was 635 nm and the half-width was 12 nm. At the environmental temperature of 45° C., it was verified that the reflection center wavelength of the second selective reflection peak was 642 nm and the half-width was 12 nm. At the environmental temperature of 65° C., it was verified that the reflection center wavelength of the second selective reflection peak was 650 nm and the half-width was 12 nm.

Example 3

An organic dielectric multi-layer film was formed on the glass substrate with reference to IDW/AD, 12, p. 985 to 988 (2012), and a band pass filter was prepared. A sensor was prepared using the same method as that of Example 1, except that the above-described band pass filter was used. As the glass substrate, the same glass substrate as that of Example 1 was used.

In addition, in a case where the thermal expansion coefficient $\alpha 1$ of the organic dielectric multi-layer film was measured, the thermal expansion coefficient $\alpha 1$ was 60 ppm/° C. In addition, in a case where the elastic modulus E1 was measured, the elastic modulus E1 was 4 GPa. In addition, the thickness of the organic dielectric multi-layer film was 10 µm.

While changing the environmental temperature as in Example 1, the reflection center wavelength and the half-width of the band pass filter were measured. At the environmental temperature of 25° C., it was verified that the reflection center wavelength of the selective reflection peak was 634 nm and the half-width was 20 nm. At the environmental temperature of 45° C., it was verified that the reflection center wavelength of the selective reflection peak was 638 nm and the half-width was 20 nm. At the environmental temperature of 65° C., it was verified that the reflection center wavelength of the selective reflection peak was 642 nm and the half-width was 20 nm.

Comparative Example 1

A band pass filter was prepared using the same method as that of Example 1, except that an acrylic plate (CLAREX, manufactured by Nitto Jushi Kogyo Co., Ltd.) was used as the support. Using this band pass filter, a sensor was prepared. In a case where the thermal expansion coefficient α2 of the support was measured, the thermal expansion coefficient α2 was 70 ppm/° C. In addition, in a case where the elastic modulus E2 was measured, the elastic modulus E2 was 3 GPa. The thickness of the support was 700 µm.

While changing the environmental temperature as in Example 1, the reflection center wavelength and the half-width of the band pass filter were measured. At the environmental temperature of 25° C., it was verified that the reflection center wavelength of the second selective reflection peak was 634 nm and the half-width was 12 nm. At the environmental temperature of 45° C., it was verified that the reflection center wavelength of the second selective reflection peak was 634 nm and the half-width was 12 nm. At the environmental temperature of 65° C., it was verified that the reflection center wavelength of the second selective reflection peak was 635 nm and the half-width was 12 nm.

Reference Example 1

A configuration not including the band pass filter in Example 1 was adopted as a sensor according to Reference Example 1.

Evaluation of Sensor

Light was emitted from the laser light source and the LED light source to the white plate, and the light reflected from the white plate was measured with the light-receiving element. In this case, the measurement was performed after leaving the band pass filter at each of environmental temperatures 25° C., 45° C., and 65° C., and the results were evaluated based on the following standards.

A: noise generated by the LED light source was reduced as compared to the sensor according to Reference Example, the SN ratio was high, and even in a case where the environmental temperature was high, the SN ratio did not substantially change as compared to the case where the environmental temperature was 25° C.

B: noise generated by the LED light source was reduced as compared to the sensor according to Reference Example, and the SN ratio was high; however in a case where the environmental temperature was high, the SN ratio decreased as compared to the case where the environmental temperature was 25° C.

C: noise generated by the LED light source was reduced as compared to the sensor according to Reference Example, and the SN ratio was high; however in a case where the environmental temperature was high, the amount of noise was more than that of B and the SN ratio was the same as that of the sensor according to Reference Example.

The results are shown in Table 1.

TABLE 1

| | | Example 1 | Example 2 | Example 3 | Comparative Example 1 |
|---|---|---|---|---|---|
| Band Pass Layer | Kind | Cholesteric Liquid Crystal Layer | Cholesteric Liquid Crystal Layer | Organic Dielectric Multi-Layer Film | Cholesteric Liquid Crystal Layer |
| | Thermal Expansion Coefficient ppm/° C. | 50 | 50 | 60 | 50 |
| | Elastic Modulus GPa | 5 | 5 | 4 | 5 |
| | Thickness µm | 5 | 5 | 10 | 5 |
| | Half-Width nm | 12 | 12 | 20 | 12 |
| Support | Kind | Glass | $\beta\text{-}Cu_{1.8}Zn_{0.2}V_2O_7$ | Glass | Acrylic Plate |
| | Thermal Expansion Coefficient ppm/° C. | 4 | −14 | 4 | 70 |
| | Elastic Modulus GPa | 75 | 75 | 75 | 3 |
| | Thickness µm | 1100 | 1000 | 1100 | 700 |
| Reflection/Transmission Center Wavelength | 25° C. | 634 nm | 635 nm | 634 nm | 634 nm |
| | 45° C. | 639 nm | 642 nm | 638 nm | 634 nm |
| | 65° C. | 644 nm | 650 nm | 642 nm | 635 nm |
| Evaluation | | B | A | B | C |

It can be seen from Table 1 that in Examples of the present invention, even in a case where the environmental temperature is high, a decrease in SN ratio can be suppressed as compared to Comparative Examples.

It can be seen from Examples 1 and 2 that a difference between the thermal expansion coefficient of the band pass layer and the thermal expansion coefficient of the support is preferably 30 ppm/° C. or more.

Example 4

A band pass filter was prepared using the same method as that of Example 1, except that a cholesteric liquid crystal layer prepared as described below was used as the cholesteric liquid crystal layer. Using this band pass filter, a sensor was prepared. As the glass substrate, the same glass substrate as that of Example 1 was used.

Formation of Cholesteric Liquid Crystal Layer

As the liquid crystal composition, the following composition A-4 was prepared. This composition A-4 is a liquid crystal composition forming a cholesteric liquid crystal layer (cholesteric liquid crystalline phase) that has a selective reflection center wavelength of 905 nm and reflects right circularly polarized light.

Composition A-4

| | |
|---|---|
| Rod-like liquid crystal compound L-2 | 50.00 parts by mass |
| Rod-like liquid crystal compound L-3 | 50.00 parts by mass |
| Polymerization initiator Omnirad 819 IGM Resins B.V. | 3.00 parts by mass |
| Chiral agent Ch-1 | 1.63 parts by mass |
| Leveling agent T-1 | 0.08 parts by mass |
| Chloroform | 244.32 parts by mass |

Rod-Like Liquid Crystal Compound L-2

Polarized UV Irradiation Device

The following composition A-4 was applied to the alignment film P-1 to form a coating film, and the applied coating film was heated using a hot plate at 100° C. for 1 minute. Next, using an ultraviolet irradiation device (EXECURE 3000-W, manufactured by Hoya SCHOTT Co.) in a nitrogen atmosphere of 100° C., the coating film was irradiated with ultraviolet light at a wavelength of 365 nm, an illuminance of 25 mW/cm$^2$, and an irradiation dose of 500 mJ/cm$^2$. As a result, the alignment of the liquid crystal compound was immobilized, and a cholesteric liquid crystal layer was formed.

In a case where a cross-section of the cholesteric liquid crystal layer was observed with a SEM, the cholesteric liquid crystalline phase had about 10 pitches. In addition, the thickness of the cholesteric liquid crystal layer was 6 μm.

In addition, in a case where the thermal expansion coefficient α1 of the formed cholesteric liquid crystal layer was measured, the thermal expansion coefficient α1 was 69 ppm/° C. In addition, in a case where the elastic modulus E1 was measured, the elastic modulus E1 was 4.5 GPa.

Evaluation of Band Pass Filter

While changing the environmental temperature as in Example 1, the reflection center wavelength and the half-width of the band pass filter were measured. At the environmental temperature of 25° C., it was verified that the reflection center wavelength of the first selective reflection peak was 905 nm and the half-width was 34 nm. At the environmental temperature of 45° C., it was verified that the reflection center wavelength of the first selective reflection peak was 911 nm and the half-width was 34 nm. At the environmental temperature of 65° C., it was verified that the reflection center wavelength of the first selective reflection peak was 916 nm and the half-width was 34 nm.

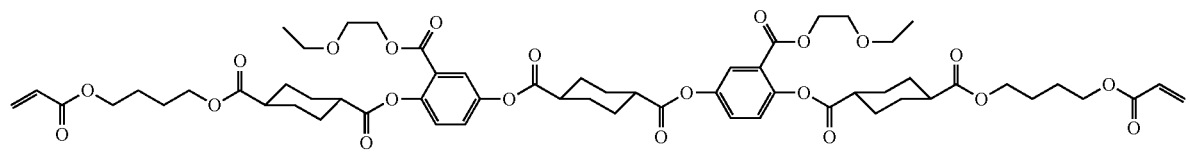 [SMILES: C=CC(=O)OCCCCOC(=O)C1CCC(C(=O)Oc2ccc(OC(=O)C3CCC(C(=O)Oc4ccc(OC(=O)C5CCC(C(=O)OCCCCOC(=O)C=C)CC5)c(C(=O)OCCOCC)c4)CC3)cc2C(=O)OCCOCC)CC1]

Rod-like liquid crystal compound L-3

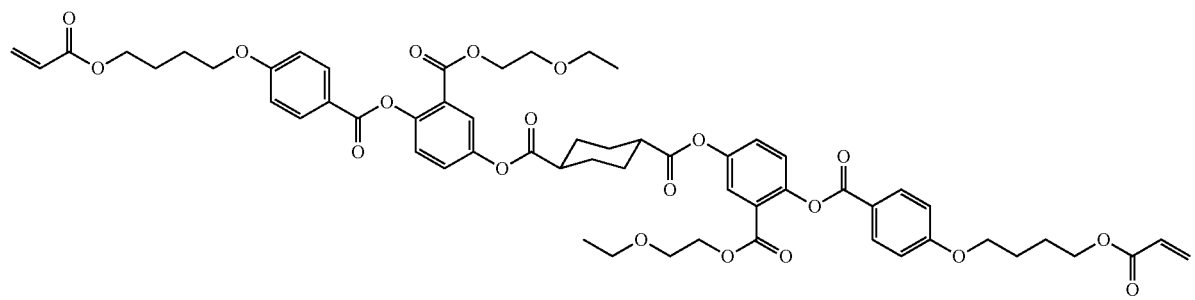 [SMILES: C=CC(=O)OCCCCOc1ccc(C(=O)Oc2ccc(OC(=O)C3CCC(C(=O)Oc4ccc(OC(=O)c5ccc(OCCCCOC(=O)C=C)cc5)c(C(=O)OCCOCC)c4)CC3)cc2C(=O)OCCOCC)cc1]

Preparation of Sensor: Reflective Type (2)

A laser light source that emitted light having a center wavelength of 905 nm at 25° C., a LED light source (where a yellow phosphor is formed on a blue LED), and a light-receiving element were prepared. The laser light source corresponds to a light source that emits the measurement light according to the embodiment of the present invention, and the LED light source emitted light corresponding to external light.

The sensor was prepared such that light was emitted from each of the light sources to a white plate as the object and the light reflected from the white plate is caused to be reflected from the band pass filter and to be incident into the light-receiving element. The band pass filter was disposed such that the light emitted from the laser light source and reflected from the white plate was incident from a direction tilted by 5° with respect to the perpendicular line of the surface of the band pass filter. The light-receiving element was disposed such that reflected light from the band pass filter was vertically incident into the light-receiving surface.

In addition, in a case where the environmental temperature was high, the center wavelength of the laser light source was 911 nm at 45° C. and was 916 nm at 65° C.

Example 5

A band pass filter was prepared using the same method as that of Example 1, except that a cholesteric liquid crystal layer prepared as described below was used as the cholesteric liquid crystal layer. Using this band pass filter, a sensor was prepared using the same method as that of Example 4. As the glass substrate, the same glass substrate as that of Example 1 was used.

Formation of Cholesteric Liquid Crystal Layer

As the liquid crystal composition, the following composition A-5 was prepared. This composition A-5 is a liquid crystal composition forming a cholesteric liquid crystal layer (cholesteric liquid crystalline phase) that has a selective reflection center wavelength of 905 nm and reflects left circularly polarized light.

Composition A-5

| | |
|---|---|
| Rod-like liquid crystal compound L-2 | 50.00 parts by mass |
| Rod-like liquid crystal compound L-3 | 50.00 parts by mass |
| Polymerization initiator Omnirad 819 IGM Resins B.V. | 3.00 parts by mass |
| Chiral agent Ch-2 | 2.22 parts by mass |
| Leveling agent T-1 | 0.08 parts by mass |
| Chloroform | 244.32 parts by mass |

Chiral agent Ch-2

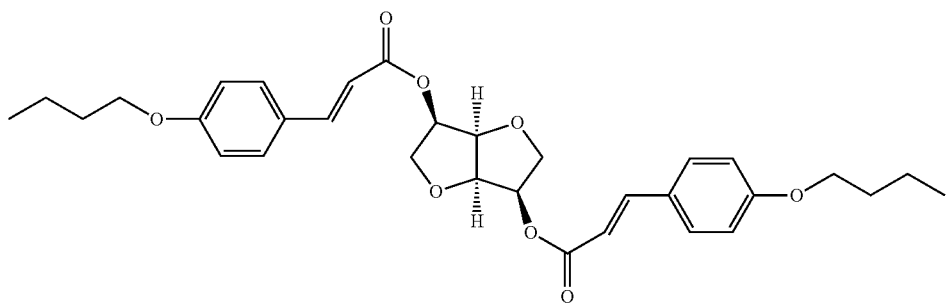 [SMILES: CCCCOc1ccc(/C=C/C(=O)O[C@@H]2CO[C@H]3[C@@H]2OC[C@H]3OC(=O)/C=C/c2ccc(OCCCC)cc2)cc1]

The following composition A-5 was applied to the alignment film P-1 to form a coating film, and the applied coating film was heated using a hot plate at 100° C. for 1 minute. Next, using an ultraviolet irradiation device (EXECURE 3000-W, manufactured by Hoya SCHOTT Co.) in a nitrogen atmosphere of 100° C., the coating film was irradiated with ultraviolet light at a wavelength of 365 nm, an illuminance of 25 mW/cm$^2$, and an irradiation dose of 500 mJ/cm$^2$. As a result, the alignment of the liquid crystal compound was immobilized, and a cholesteric liquid crystal layer was formed.

In a case where a cross-section of the cholesteric liquid crystal layer was observed with a SEM, the cholesteric liquid crystalline phase had about 10 pitches. In addition, the thickness of the cholesteric liquid crystal layer was 6 μm.

In addition, in a case where the thermal expansion coefficient α1 of the formed cholesteric liquid crystal layer was measured, the thermal expansion coefficient α1 was 66 ppm/° C. In addition, in a case where the elastic modulus E1 was measured, the elastic modulus E1 was 4.7 GPa.

Evaluation of Band Pass Filter

While changing the environmental temperature as in Example 1, the reflection center wavelength and the half-width of the band pass filter were measured. At the environmental temperature of 25° C., it was verified that the reflection center wavelength of the first selective reflection peak was 905 nm and the half-width was 34 nm. At the environmental temperature of 45° C., it was verified that the reflection center wavelength of the first selective reflection peak was 911 nm and the half-width was 34 nm. At the environmental temperature of 65° C., it was verified that the reflection center wavelength of the first selective reflection peak was 916 nm and the half-width was 34 nm.

Example 6

A band pass filter was prepared using the same method as that of Example 1, except that a cholesteric liquid crystal layer prepared as described below was used as the cholesteric liquid crystal layer. Using this band pass filter, a sensor was prepared using the same method as that of Example 4. As the glass substrate, the same glass substrate as that of Example 1 was used.

Formation of Cholesteric Liquid Crystal Layer

The composition A-4 was applied to the cholesteric liquid crystal layer according to Example 4, and was heated and irradiated with UV using the same method as that of Example 4. As a result, the alignment of the liquid crystal compound was immobilized, and a cholesteric liquid crystal layer was formed. By repeating this operation once more, a cholesteric liquid crystal layer where three cholesteric liquid crystal layers formed of the composition A-4 were laminated on the alignment film P-1 was formed.

Next, the composition A-5 was applied to the cholesteric liquid crystal layer, and was heated and irradiated with UV using the same method as that of Example 5. As a result, the alignment of the liquid crystal compound was immobilized, and a cholesteric liquid crystal layer was formed. By repeating this operation twice more, a cholesteric liquid crystal layer where three cholesteric liquid crystal layers formed of the composition A-4 were laminated on the alignment film P-1 and three cholesteric liquid crystal layers formed of the composition A-5 were laminated thereon was formed.

In a case where a cross-section of the cholesteric liquid crystal layer was observed with a SEM, the cholesteric liquid crystalline phase had about 62 pitches. In addition, the thickness of the cholesteric liquid crystal layer was 36 μm.

In addition, in a case where the thermal expansion coefficient α1 of the formed cholesteric liquid crystal layer was measured, the thermal expansion coefficient α1 was 68 ppm/° C. In addition, in a case where the elastic modulus E1 was measured, the elastic modulus E1 was 4.6 GPa.

Evaluation of Band Pass Filter

While changing the environmental temperature as in Example 1, the reflection center wavelength and the half-width of the band pass filter were measured. At the environmental temperature of 25° C., it was verified that the reflection center wavelength of the first selective reflection peak was 905 nm and the half-width was 34 nm. At the environmental temperature of 45° C., it was verified that the reflection center wavelength of the first selective reflection peak was 911 nm and the half-width was 34 nm. At the environmental temperature of 65° C., it was verified that the reflection center wavelength of the first selective reflection peak was 916 nm and the half-width was 34 nm. In addition, in a case where the reflectivity of the band pass filter with respect to natural light was measured, the reflectivity was 98%.

Reference Example 2

A configuration not including the band pass filter in Example 4 was adopted as a sensor according to Reference Example 2.

Evaluation of Sensor

In the sensor prepared in each of Examples 4 to 6, light was emitted from the laser light source and the LED light source to the white plate, and the light reflected from the white plate was measured with the light-receiving element. In this case, the measurement was performed after leaving the band pass filter at each of environmental temperatures 25° C., 45° C., and 65° C., and the results were evaluated based on the following standards.

AA: noise generated by the LED light source was reduced as compared to the sensor according to Reference Example 2, the SN ratio was very high, and even in a case where the environmental temperature was high, the SN ratio did not substantially change as compared to the case where the environmental temperature was 25° C.

A: noise generated by the LED light source was reduced as compared to the sensor according to Reference Example 2, the SN ratio was high, and even in a case where the environmental temperature was high, the SN ratio did not substantially change as compared to the case where the environmental temperature was 25° C.

B: noise generated by the LED light source was reduced as compared to the sensor according to Reference Example 2, and the SN ratio was high; however in a case where the environmental temperature was high, the SN ratio decreased as compared to the case where the environmental temperature was 25° C.

C: noise generated by the LED light source was reduced as compared to the sensor according to Reference Example 2, and the SN ratio was high; however in a case where the environmental temperature was high, the amount of noise was more than that of B and the SN ratio was the same as that of the sensor according to Reference Example 2.

The results are shown in Table 2.

TABLE 2

|  |  | Example 4 | Example 5 | Example 6 |
| --- | --- | --- | --- | --- |
| Band Pass Layer | Kind | Cholesteric Liquid Crystal Layer | Cholesteric Liquid Crystal Layer | Cholesteric Liquid Crystal Layer |
|  | Thermal Expansion Coefficient ppm/° C. | 69 | 66 | 68 |
|  | Elastic Modulus GPa | 4.5 | 4.7 | 4.6 |
|  | Thickness μm | 6 | 6 | 36 |
|  | Half-Width nm | 34 | 34 | 34 |
| Support | Kind | Glass | Glass | Glass |
|  | Thermal Expansion Coefficient ppm/° C. | 4 | 4 | 4 |

TABLE 2-continued

|  |  | Example 4 | Example 5 | Example 6 |
|---|---|---|---|---|
|  | Elastic Modulus GPa | 75 | 75 | 75 |
|  | Thickness μm | 1100 | 1100 | 1100 |
| Reflection/Transmission Center Wavelength | 25° C. | 905 nm | 905 nm | 905 nm |
|  | 45° C. | 911 nm | 911 nm | 911 nm |
|  | 65° C. | 916 nm | 916 nm | 916 nm |
| Evaluation |  | A | A | AA |

It can be seen from Table 2 that in Examples of the present invention, even in a case where the environmental temperature is high, a decrease in SN ratio can be suppressed.

As can be seen from the above results, the effects of the present invention are obvious.

The present invention is suitably applicable to various sensors that perform optical measurement, for example, a distance-measuring sensor.

EXPLANATION OF REFERENCES 10a, 10b: sensor
12: light source
14: light-receiving element
16, 16a, 16b, 116: band pass filter
20: support
24: alignment film
26: cholesteric liquid crystal layer
32: liquid crystal compound
40, 40a, 40b, 140: support
42: band pass layer
O: object
P: helical pitch
$I_1$ to $I_3$: measurement light
$I_z$: external light

What is claimed is:

1. A sensor comprising:
a light source;
a band pass filter that extracts light having a luminescence peak wavelength of the light source; and
a light-receiving element that receives the light extracted by the band pass filter,
wherein the band pass filter includes a band pass layer and a support that supports the band pass layer, and
in a case where a thermal expansion coefficient of the band pass layer is represented by $\alpha 1$, an elastic modulus of the band pass layer is represented by E1, a thermal expansion coefficient of the support is represented by $\alpha 2$, and an elastic modulus of the support is represented by E2,
$\alpha 1 > \alpha 2$ and
E1<E2
are satisfied,
the thermal expansion coefficient $\alpha 2$ of the support is less than 0 ppm/°C.,
the material of the support is any one of cubic zirconium tungstate, a rubbery elastomer, quartz, zeolite, high-purity silicon, cubic scandium fluoride, high-strength polyethylene fiber, and bismuth-nickel-iron oxide,
the band pass layer includes a cholesteric liquid crystal layer that is a layer obtained by immobilizing a cholesteric liquid crystalline phase, and
a half-width of a selective reflection peak of the cholesteric liquid crystal layer is 45 nm or less.

2. The sensor according to claim 1,
wherein a half-width of the luminescence peak of the light source is 30 nm or less.

3. The sensor according to claim 1,
wherein the light source is a laser or a light emitting diode.

4. The sensor according to claim 1,
wherein the band pass layer includes an organic material.

5. The sensor according to claim 1,
wherein the band pass filter reflects the light having the luminescence peak wavelength of the light source to extract the light having the luminescence peak wavelength of the light source, and
a half-width of a reflection peak of the band pass layer is 20 nm or less.

6. The sensor according to claim 1,
wherein a difference between the thermal expansion coefficient $\alpha 1$ of the band pass layer and the thermal expansion coefficient $\alpha 2$ of the support is 30 (ppm/° C.) or more.

7. The sensor according to claim 1,
wherein the elastic modulus E1 of the band pass layer is less than 10 GPa.

8. The sensor according to claim 1,
wherein the band pass layer is an organic dielectric multi-layer film.

9. The sensor according to claim 1,
wherein the band pass layer includes a cholesteric liquid crystal layer that is a layer obtained by immobilizing a cholesteric liquid crystalline phase,
the cholesteric liquid crystal layer has a region where a refractive index nx in an in-plane slow axis direction and a refractive index ny in an in-plane fast axis direction satisfy nx>ny, and
in a case where a selective reflection center wavelength of the cholesteric liquid crystal layer is represented by $\lambda$, the cholesteric liquid crystal layer has a second selective reflection peak at a wavelength $\lambda/2$ and a half-width of the second selective reflection peak at $\lambda/2$ is 20 nm or less.

10. The sensor according to claim 1,
wherein the band pass layer includes a cholesteric liquid crystal layer that is a layer obtained by immobilizing a cholesteric liquid crystalline phase, and
the cholesteric liquid crystal layer is obtained by immobilizing a cholesteric liquid crystalline phase having $\Delta n$ of 0.06 or less.

11. The sensor according to claim 1,
wherein the band pass layer includes a cholesteric liquid crystal layer that is a layer obtained by immobilizing a cholesteric liquid crystalline phase, and
a film thickness of the cholesteric liquid crystal layer is 10 μm or more.

12. The sensor according to claim 1,
wherein the band pass layer includes a cholesteric liquid crystal layer that is a layer obtained by immobilizing a cholesteric liquid crystalline phase, and in the cholesteric liquid crystal layer, a cholesteric liquid crystal layer having a right-handed helical structure and a cholesteric liquid crystal layer having a left-handed helical structure are laminated.

13. The sensor according to claim 2,
wherein the light source is a laser or a light emitting diode.

14. The sensor according to claim 2,
wherein the band pass layer includes an organic material.

15. The sensor according to claim 2,
wherein the band pass filter reflects the light having the luminescence peak wavelength of the light source to extract the light having the luminescence peak wavelength of the light source, and
a half-width of a reflection peak of the band pass layer is 20 nm or less.

16. The sensor according to claim 1,
wherein the band pass filter and the light-receiving element are separated from each other via an air layer.

\* \* \* \* \*